US012086857B2

(12) United States Patent
Kharbanda et al.

(10) Patent No.: US 12,086,857 B2
(45) Date of Patent: Sep. 10, 2024

(54) SEARCH WITH MACHINE-LEARNED MODEL-GENERATED QUERIES

(71) Applicant: Google LLC, Mountain View, CA (US)

(72) Inventors: Harshit Kharbanda, Pleasanton, CA (US); Arash Sadr, Belmont, CA (US); Alice Au Quan, San Francisco, CA (US); Belinda Luna Zeng, Cupertino, CA (US); Christopher James Kelley, Orinda, CA (US); Jieming Yu, Jersey City, NJ (US); Minsang Choi, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/193,890

(22) Filed: Mar. 31, 2023

(65) Prior Publication Data

US 2024/0202795 A1 Jun. 20, 2024

Related U.S. Application Data

(63) Continuation of application No. 18/173,449, filed on Feb. 23, 2023, now Pat. No. 11,941,678.

(60) Provisional application No. 63/433,559, filed on Dec. 19, 2022.

(51) Int. Cl.
*G06Q 30/00* (2023.01)
*G06Q 30/0601* (2023.01)

(52) U.S. Cl.
CPC ..... *G06Q 30/0627* (2013.01); *G06Q 30/0621* (2013.01); *G06Q 30/0643* (2013.01)

(58) Field of Classification Search
CPC .......... G06Q 30/0601; G06Q 30/0613; G06Q 30/0623; G06Q 30/0629; G06Q 30/0631
See application file for complete search history.

(56) References Cited

U.S. PATENT DOCUMENTS

| | | | | |
|---|---|---|---|---|
| 7,987,188 | B2* | 7/2011 | Neylon | G06F 16/313 706/45 |
| 8,386,336 | B1* | 2/2013 | Fox | G06Q 30/0631 705/26.7 |
| 8,417,713 | B1* | 4/2013 | Blair-Goldensohn | G06F 16/9535 705/347 |
| 8,458,054 | B1* | 6/2013 | Thakur | G06Q 30/0643 705/27.1 |

(Continued)

OTHER PUBLICATIONS

Ramesh, Aditya, et al. "Hierarchical text-conditional image generation with clip latents." arXiv preprint arXiv:2204.06125 1.2 (2022) (Year: 2022).*

(Continued)

*Primary Examiner* — Christopher B Seibert
(74) *Attorney, Agent, or Firm* — DORITY & MANNING P.A.

(57) ABSTRACT

Systems and methods for searching using machine-learned model-generated outputs can provide a user with a medium for generating a theoretical dataset that can then be matched to a real world example. The systems and methods can include selecting a plurality of terms, which can be utilized to generate a prompt input that can be processed by a dataset generation model to generate a plurality of model-generated datasets. A selection can then be received that selects a particular model-generated database to utilize to query a database.

20 Claims, 51 Drawing Sheets

(56) References Cited

U.S. PATENT DOCUMENTS

| | | | | |
|---|---|---|---|---|
| 2001/0021914 | A1* | 9/2001 | Jacobi | G06Q 30/02 705/26.1 |
| 2005/0162670 | A1* | 7/2005 | Shuler | H04N 1/00408 358/1.2 |
| 2006/0155684 | A1* | 7/2006 | Liu | G06F 16/954 |
| 2007/0046675 | A1* | 3/2007 | Iguchi | G06T 11/206 345/441 |
| 2009/0110089 | A1* | 4/2009 | Green | H04L 5/0037 370/329 |
| 2009/0125371 | A1* | 5/2009 | Neylon | G06F 16/313 707/739 |
| 2010/0114933 | A1* | 5/2010 | Murdock | G06F 16/58 707/765 |
| 2010/0268661 | A1* | 10/2010 | Levy | G06Q 30/02 705/347 |
| 2014/0195931 | A1* | 7/2014 | Kwon | G06Q 30/02 715/753 |
| 2014/0321761 | A1* | 10/2014 | Wang | G06F 16/583 382/218 |
| 2014/0351079 | A1* | 11/2014 | Dong | G06Q 30/0282 705/26.7 |
| 2015/0379732 | A1* | 12/2015 | Sayre, III | G06T 11/001 382/164 |
| 2016/0155173 | A1* | 6/2016 | Isaacson | G06Q 30/0617 705/26.43 |
| 2016/0292148 | A1* | 10/2016 | Aley | G06F 40/274 |
| 2017/0193011 | A1* | 7/2017 | Kale | G06N 20/00 |
| 2017/0193997 | A1* | 7/2017 | Chen | G10L 15/1815 |
| 2019/0019016 | A1* | 1/2019 | Ikeda | H04N 23/611 |
| 2019/0244270 | A1* | 8/2019 | Kim | G06F 16/735 |
| 2021/0263963 | A1 | 8/2021 | Cho et al. | |
| 2021/0382935 | A1* | 12/2021 | Huang | G06F 16/583 |

OTHER PUBLICATIONS

Lee, Dongwook, et al. "CollaGAN: Collaborative GAN for missing image data imputation." Proceedings of the IEEE/CVF conference on computer vision and pattern recognition. 2019. (Year: 2019).*

Google Research, "DALL-E 2", Apr. 6, 2022, https://openai.com/dall-e-2/, retrieved on Feb. 23, 2023, 16 pages.

Google Research, "Imagen: Text-to-Image Diffusion Models". Nov. 25, 2022, https://imagen.research.google/, retrieved on Feb. 23, 2023, 18 pages.

Google Research, "MUM: A New AI Milestone for Understanding Information", May 18, 2021, https://blog.google/products/search/introducing-mum/, retrieved on Feb. 23, 2023, 4 pages.

Huang et al., "Content-Based Image Retrieval Using Generated Textual Meta-Data." Second International Conference on Advances in Artificial Intelligence, Barcelona, Spain, Oct. 6-8, 2018, pp. 16-19.

International Search Report and Written Opinion for Application No. PCT/US2023/080345, mailed Mar. 21, 2024, 16 pages.

Kang et al., "Investigating the Potential of GAN-Based Interactive Image Editing for Novel Image Search", Mar. 21, 2022, https://ssrn.com/abstract=4062469, retrieved on Apr. 4, 2024, 15 pages.

Taukute et al., "I Want This Product but Different: Multimodal Retrieval with Synthetic Query Expansion", arXiv:2102.08871v1, dated Feb. 17, 2021, 10 pages.

* cited by examiner

306 Fashion Dreamer

Pick 1:
- glasses
- kimono
- handbag
- baseball cap
- sunglasses
- gloves
- suit
- jeans
- fancy hat
- blouse
- dress shoes
- high heels
- flip flops
- dress
- sneakers
- purse
- jewelry
- coat
- backpack
- type your own

310

Pick 1 or 2:
- made of plants
- baroque
- renaissance style
- cyborg
- made of cake
- made of junkyard parts
- fully transparent
- covered in feathers
- covered in sequins
- made of noodles
- made of ice
- avant garde
- ancient themed
- type your own
- made of fur
- made of feathers
- camouflage
- made of chains
- futuristic

312

↪ Choose some things and see your creation visualized here

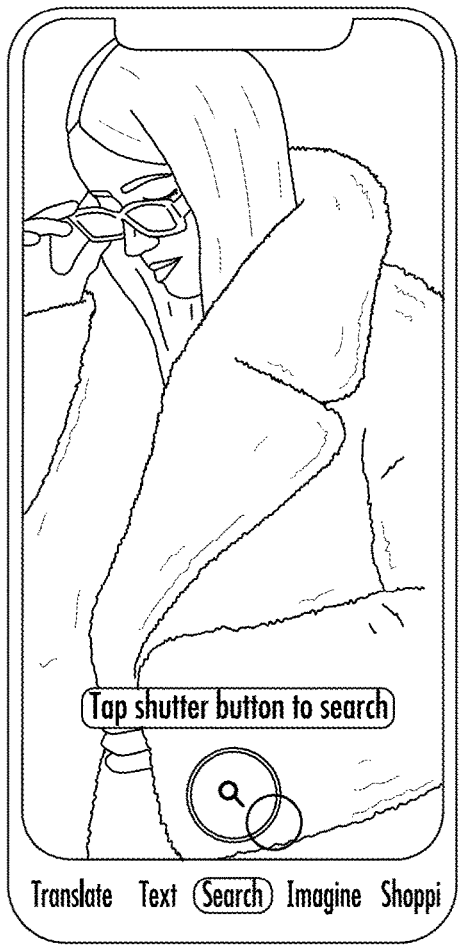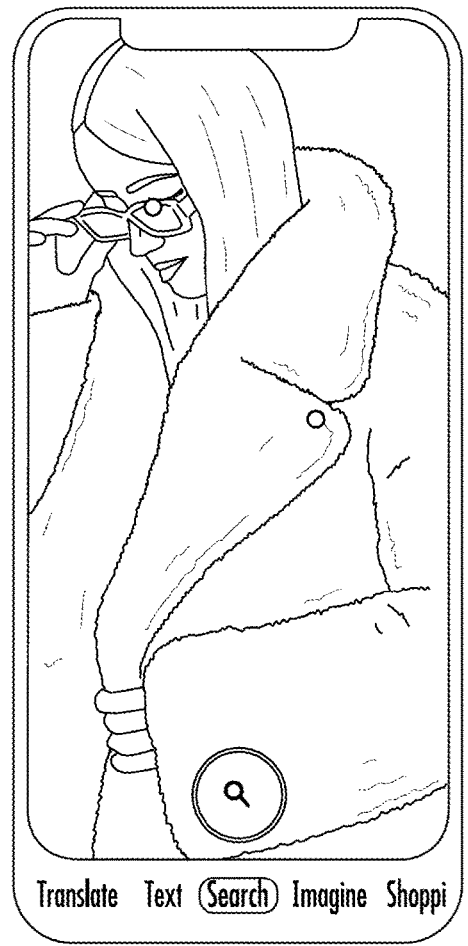
FIG. 6A

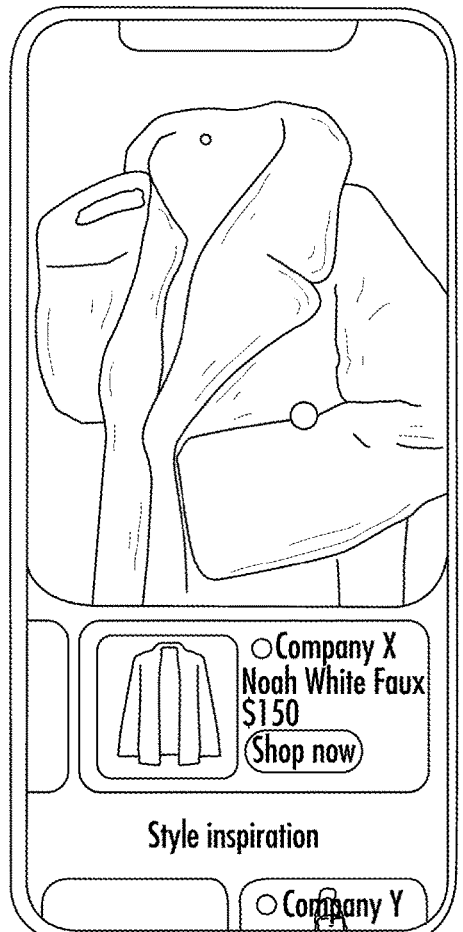
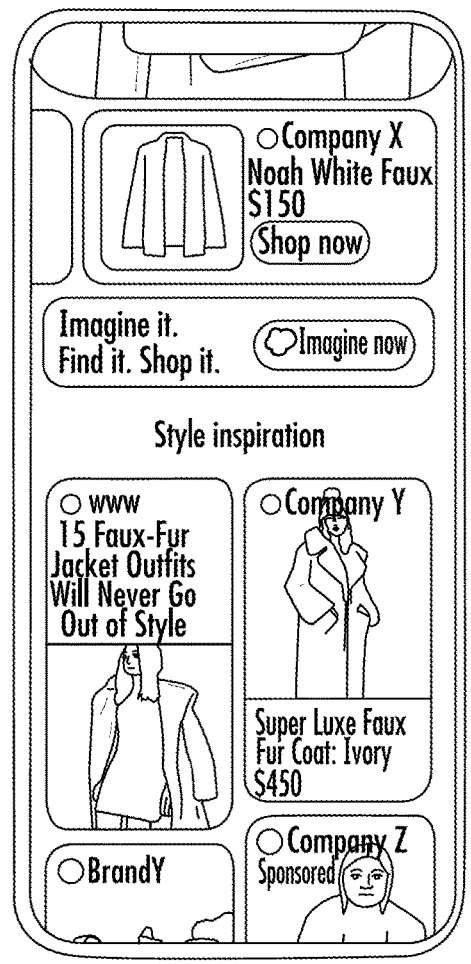
FIG. 6C

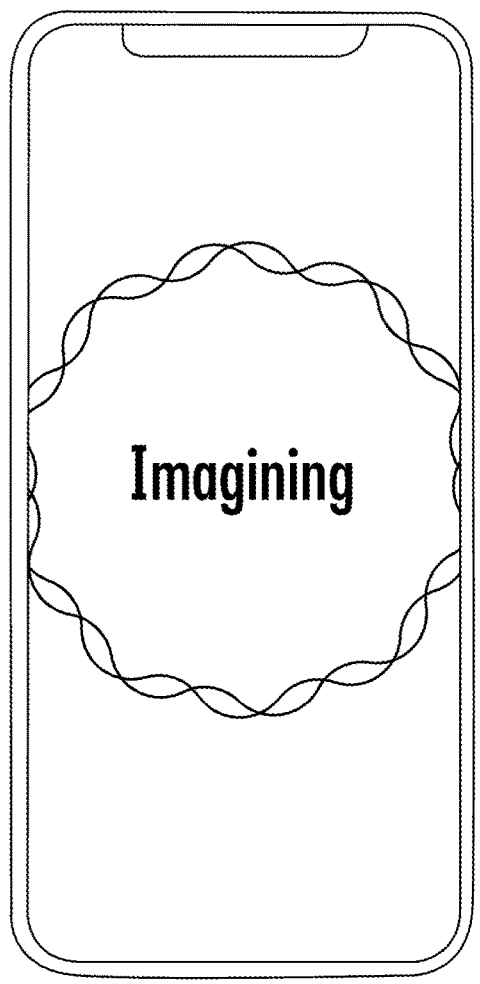
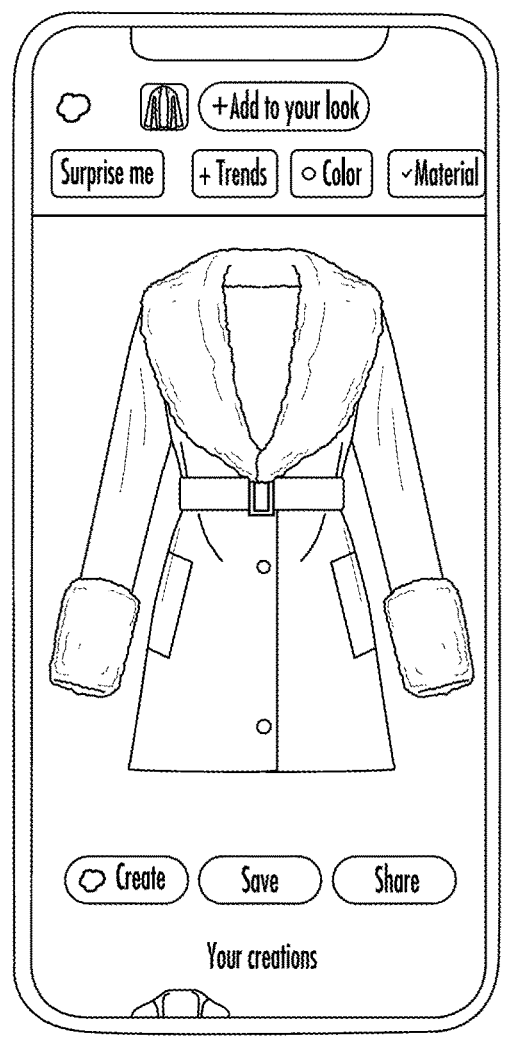
FIG. 7C

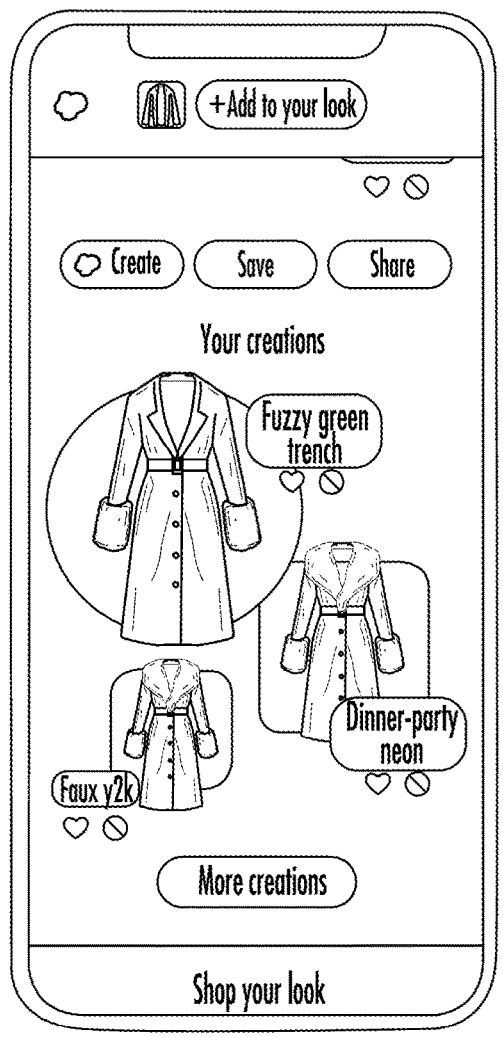
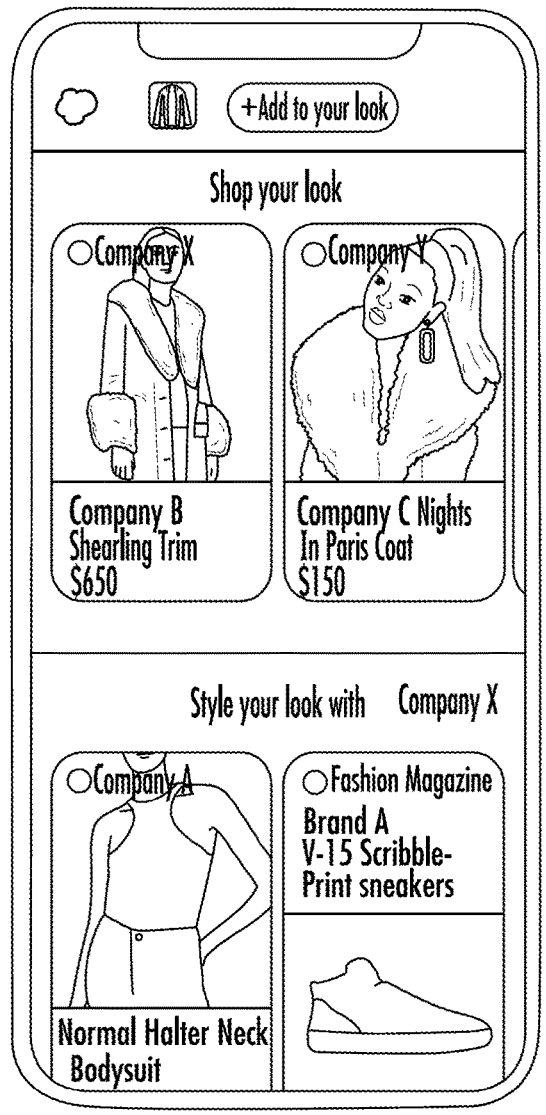
FIG. 7D

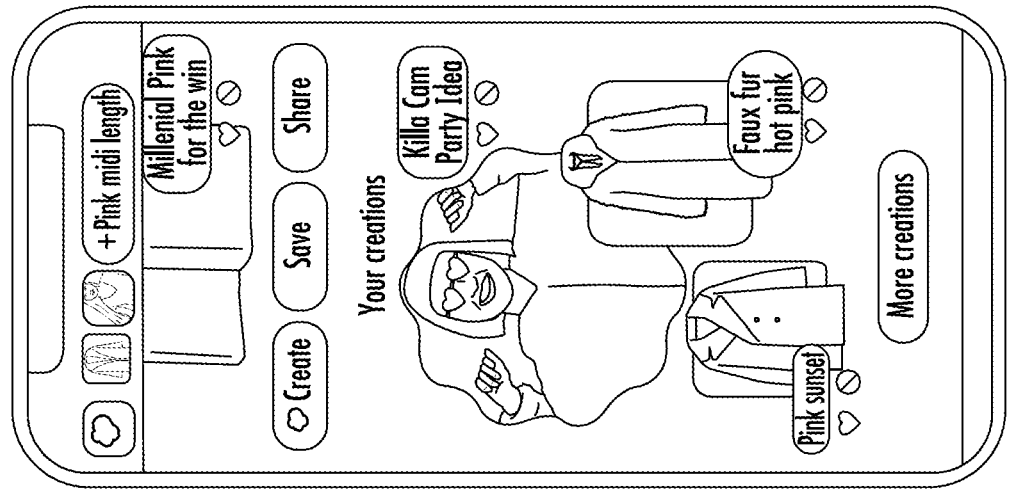
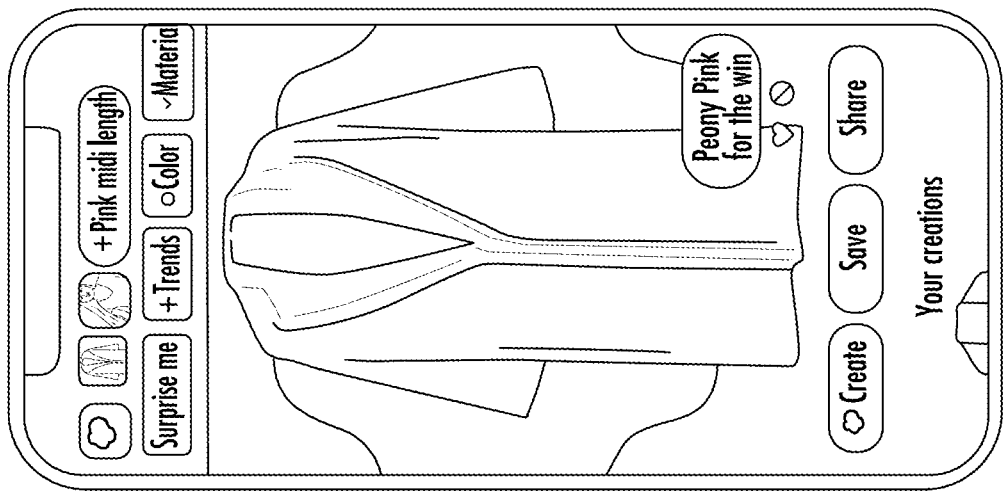
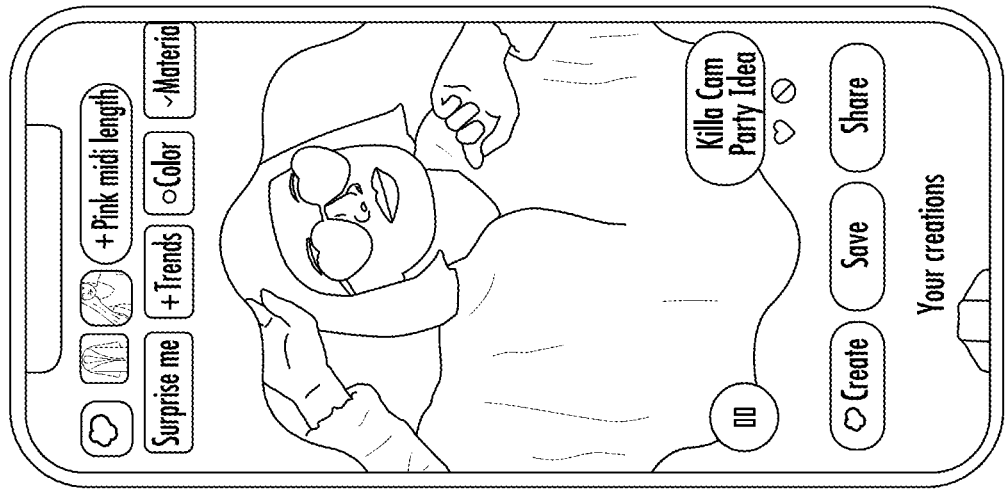
FIG. 8C

FIG. 9D

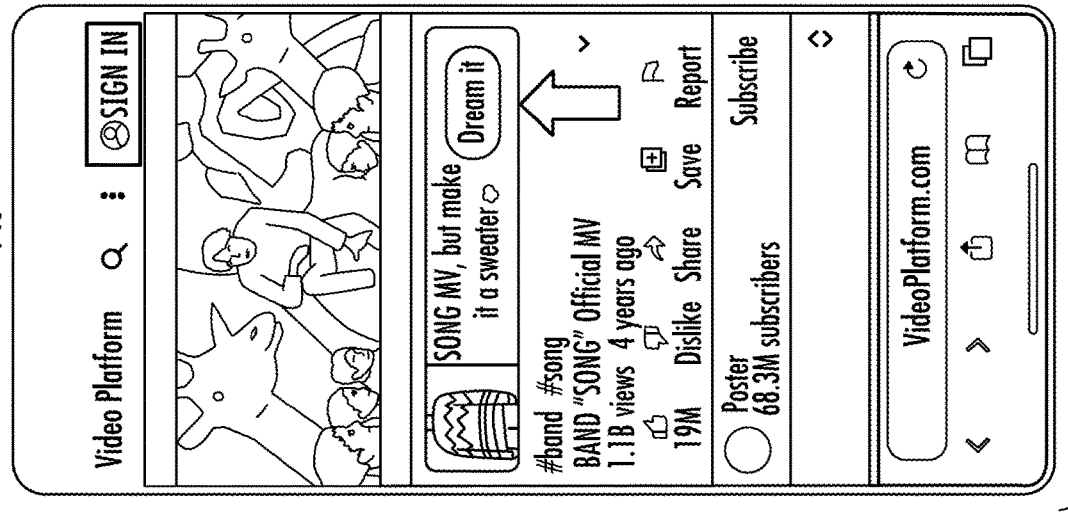
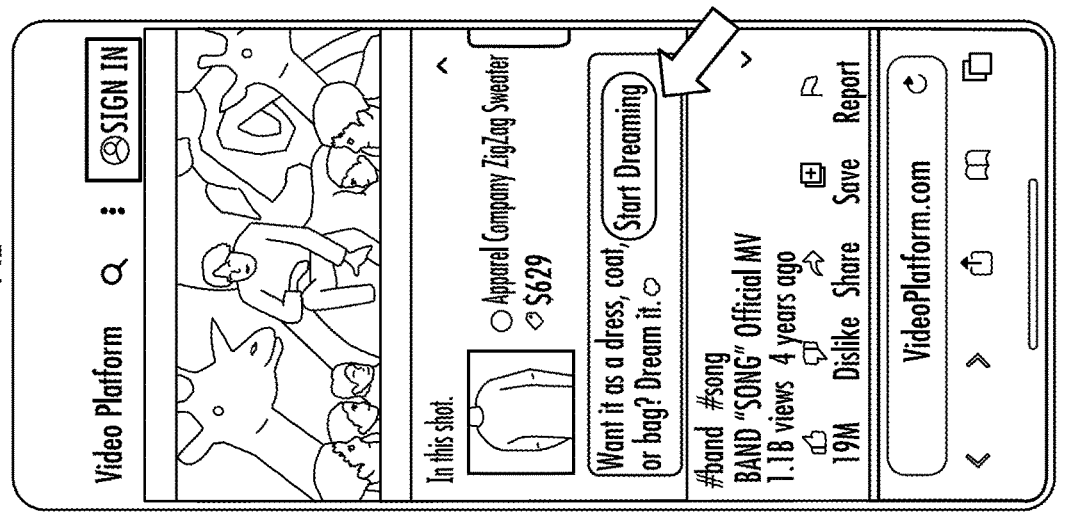
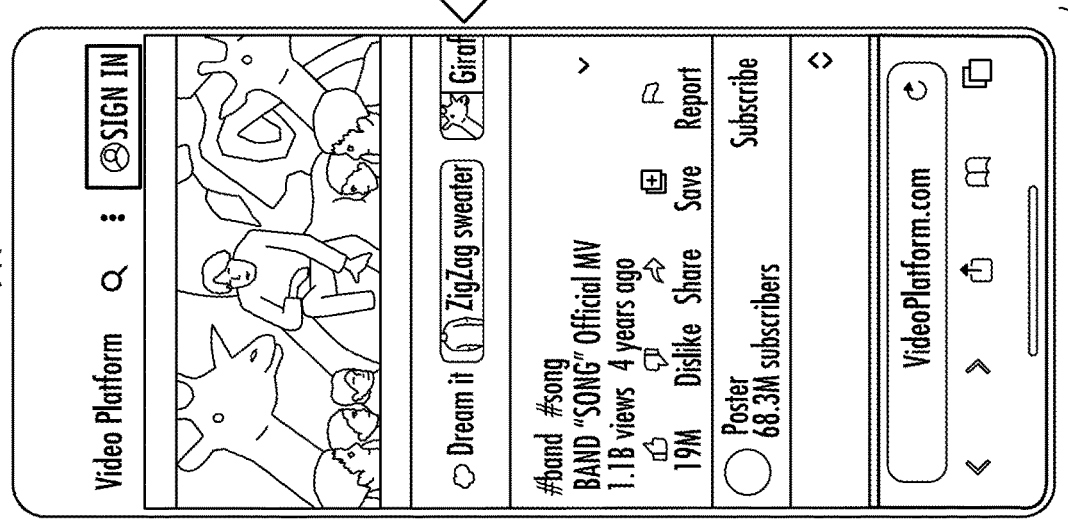
FIG. 9E

FIG. 10

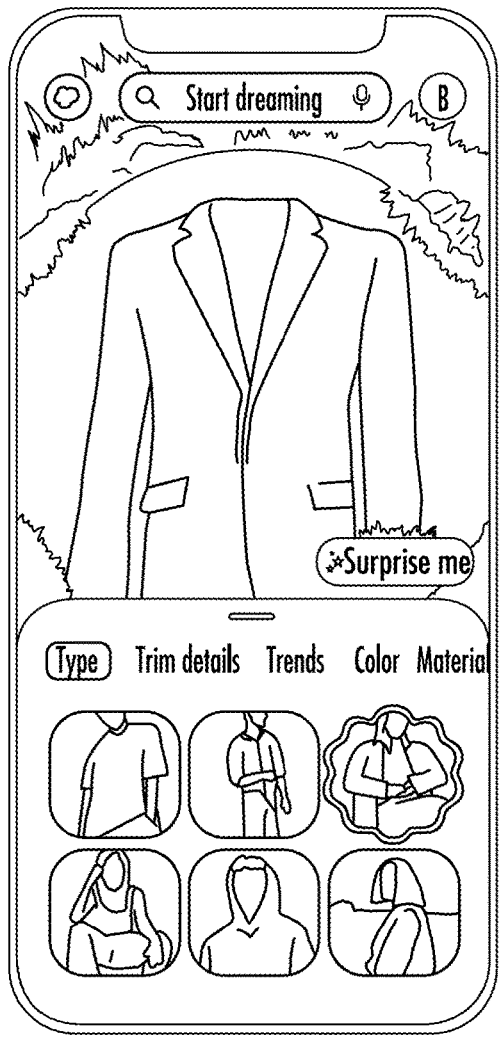
FIG. 17A

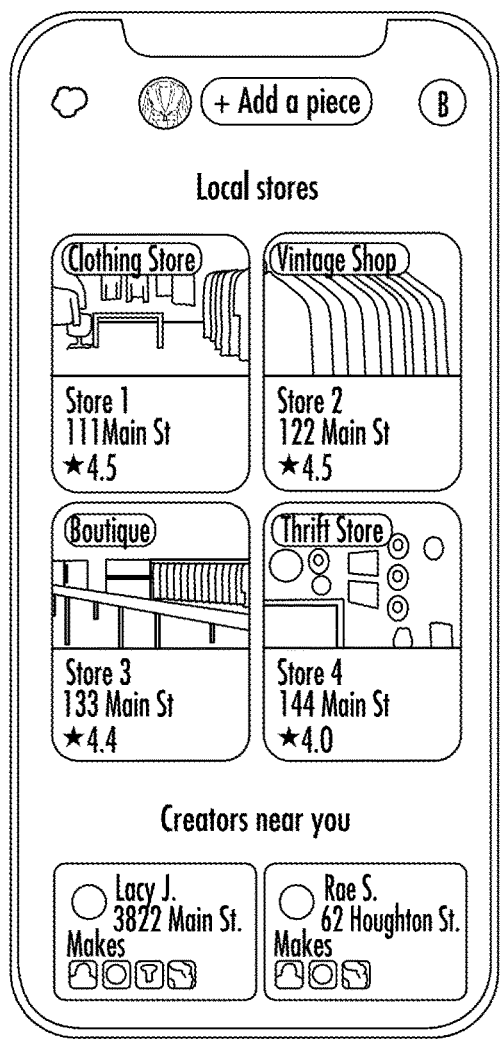
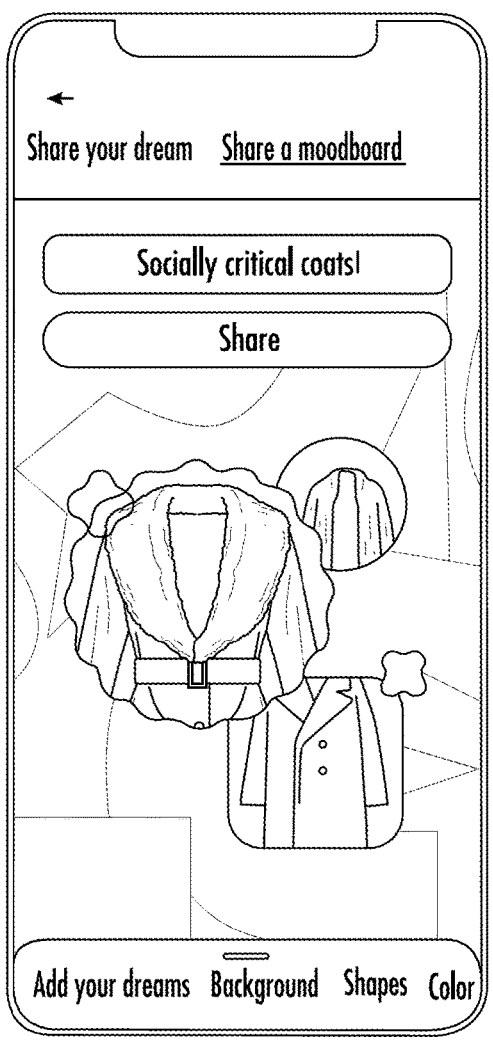
FIG. 17C

SEARCH WITH MACHINE-LEARNED MODEL-GENERATED QUERIES

RELATED APPLICATIONS

This application is a continuation of U.S. patent application Ser. No. 18/173,449 filed on Feb. 23, 2023, which claims priority to and the benefit of U.S. Provisional Patent Application No. 63/433,559, filed Dec. 19, 2022. U.S. patent application Ser. No. 18/173,449 and U.S. Provisional Patent Application No. 63/433,559 are hereby incorporated by reference in their entirety.

FIELD

The present disclosure relates generally to machine-learned model output-leveraged search. More particularly, the present disclosure relates to obtaining user interface selections to generate a prompt input that can be processed by a machine-learned model to generate outputs that can be reviewed by a user and selected to be input into a search engine to receive search results associated with the selected output.

BACKGROUND

Searching for clothing, art, movies, and/or music can be difficult if a user does not have an example to provide to a search engine. Freeform text and/or Boolean strings provided as a text query to a search engine may provide mixed and/or unaligned search results that may be off topic and/or may include only parts of the search query. Refining those searches and/or reviewing those search results can be time intensive and may be non-intuitive. Image queries may provide more tailored results as images may include features that cannot be descriptively described via text in brevity. However, a user may not have access to an image of what they are looking for during the search, and/or the user may be basing their search on a real world example that they know of based on real world experience (e.g., a user may be searching for a real world example of what they imagined).

Additionally, the utilization of artificial intelligence techniques to generate images and/or other datasets can be non-intuitive, may be open-ended, and may be time consuming. Current image generation systems utilize a prompt input box for receiving freeform text to be processed to generate one or more images. However, as a user utilizes the prompt input box, the user may struggle with which words to utilize and/or may be dissatisfied with the generated image as one or more of the input words may not be utilized in the direction the user desired (e.g., "houndstooth" may be entered by the user in association with the pattern; however, the model may generate an image with a dog's teeth).

SUMMARY

Aspects and advantages of embodiments of the present disclosure will be set forth in part in the following description, or can be learned from the description, or can be learned through practice of the embodiments.

One example aspect of the present disclosure is directed to a computing system for searching with a machine-learned model-generated data query. The system can include one or more processors and one or more non-transitory computer-readable media that collectively store instructions that, when executed by the one or more processors, cause the computing system to perform operations. The operations can include obtaining a prompt input. The prompt input can include one or more terms. The operations can include processing the prompt input with an image generation model to generate one or more model-generated images. The one or more model-generated images can be generated based at least in part on the one or more terms. The operations can include determining one or more search results based on the one or more model-generated images. The one or more search results can be associated with one or more objects. The operations can include providing a search results interface. The search results interface can provide the one or more search results for display.

Another example aspect of the present disclosure is directed to a computer-implemented method for searching with a machine-learned model-generated data query. The method can include obtaining, by a computing system including one or more processors, a prompt input. The prompt input can include one or more terms. The method can include processing, by the computing system, the prompt input with a data generation model to generate a plurality of model-generated datasets. The plurality of model-generated datasets can be generated based at least in part on the one or more terms. The method can include providing, by the computing system, the plurality of model-generated datasets via a user interface. The method can include obtaining, by the computing system, a selection input. The selection input can be descriptive of a selection of a particular model-generated dataset of the plurality of model-generated datasets. The method can include determining, by the computing system, one or more search results based on the particular model-generated dataset. The method can include providing, by the computing system, the one or more search results as an output.

Another example aspect of the present disclosure is directed to one or more non-transitory computer-readable media that collectively store instructions that, when executed by one or more computing devices, cause the one or more computing devices to perform operations. The operations can include providing an image-generation interface for display. The image-generation interface can include a plurality of category user-interface elements. In some implementations, each category user-interface element can be associated with a different generation category. The operations can include obtaining first input data. The first input data can be associated with a selection of a particular category user-interface element of the plurality of category user-interface elements. In some implementations, the particular category user-interface element can be associated with a particular category. The operations can include providing a plurality of descriptor user-interface elements for display in the image-generation interface. Each descriptor user-interface element can be associated with a different descriptor. The operations can include obtaining second input data. The second input data can be associated with a selection of one or more particular descriptor user-interface elements of the plurality of descriptor user-interface elements. In some implementations, the one or more particular descriptor user-interface elements can be associated with one or more particular descriptors. The operations can include processing data associated with the one or more particular descriptors with a machine-learned image-generation model to generate one or more model-generated images. The operations can include providing the one or more model-generated images for display in the image-generation interface.

Another example aspect of the present disclosure is directed to a computing system. The system can include one or more processors and one or more non-transitory computer-readable media that collectively store instructions that, when executed by the one or more processors, cause the computing system to perform operations. The operations can include obtaining a prompt input. The prompt input can include one or more terms descriptive of an absence of a particular detail. The operations can include processing the prompt input with an image generation model to generate one or more model-generated images. The one or more model-generated images can be generated based at least in part on the one or more terms. In some implementations, the one or more model-generated images can be descriptive of a generated object without the particular detail. The operations can include determining one or more search results based on the one or more model-generated images. The one or more search results can be associated with one or more objects without the particular detail. The operations can include providing a search results interface. The search results interface can provide the one or more search results for display.

Another example aspect of the present disclosure is directed to a computer-implemented method. The method can include obtaining, by a computing system including one or more processors, a multi-modal prompt input. The multi-modal prompt input can include a prompt image and prompt text. The prompt image can be descriptive of a particular object. In some implementations, the prompt text can be descriptive of one or more particular details of the prompt image to augment. The method can include processing, by the computing system, the prompt image and the prompt text with an image generation model to generate a model-generated image. The model-generated image can be descriptive of a model-generated object. In some implementations, the model-generated object can be descriptive of the particular object augmented based on the prompt text. The method can include providing, by the computing system, the model-generated-image to a search engine as a search query based on one or more user inputs and receiving, by the computing system, one or more search results from the search engine based on the model-generated image.

Another example aspect of the present disclosure is directed to one or more non-transitory computer-readable media that collectively store instructions that, when executed by one or more computing devices, cause the one or more computing devices to perform operations. The operations can include obtaining a first search query, processing the first search query to determine a plurality of first search results responsive to the first search query, and providing the plurality of first search results for display. The operations can include obtaining a text input and a selection of an image search result of the plurality of first search results. The image search result can be descriptive of a particular object with one or more particular details. The operations can include generating a multi-modal prompt input. The multi-modal prompt input can include a prompt image and prompt text. The prompt image can be associated with the image search result. The prompt text can be descriptive of a request to render the particular object without the one or more particular details. The operations can include processing the prompt image and the prompt text with an image-generation model to generate a model-generated image. The model-generated image can be descriptive of a model-generated object. In some implementations, the model-generated object can be descriptive of the particular object without the one or more particular details. The operations can include processing the model-generated-image to determine one or more second search results and providing the one or more second search results for display.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIGS. 3A-3M depict illustrations of an example search interface according to example embodiments of the present disclosure.

FIGS. 6A-6C depict illustrations of an example viewfinder entry point according to example embodiments of the present disclosure.

FIGS. 7A-7D depict illustrations of an example image generation and search interface according to example embodiments of the present disclosure.

FIGS. 8A-8C depict illustrations of an example refined image generation and search interface according to example embodiments of the present disclosure.

FIGS. 9A-9E depict illustrations of example search interface entry points according to example embodiments of the present disclosure.

FIG. 10 depicts an illustration of an example user collection interface according to example embodiments of the present disclosure.

FIGS. 17A-17C depict illustrations of an example product suggestion interface according to example embodiments of the present disclosure.

Figure 1:
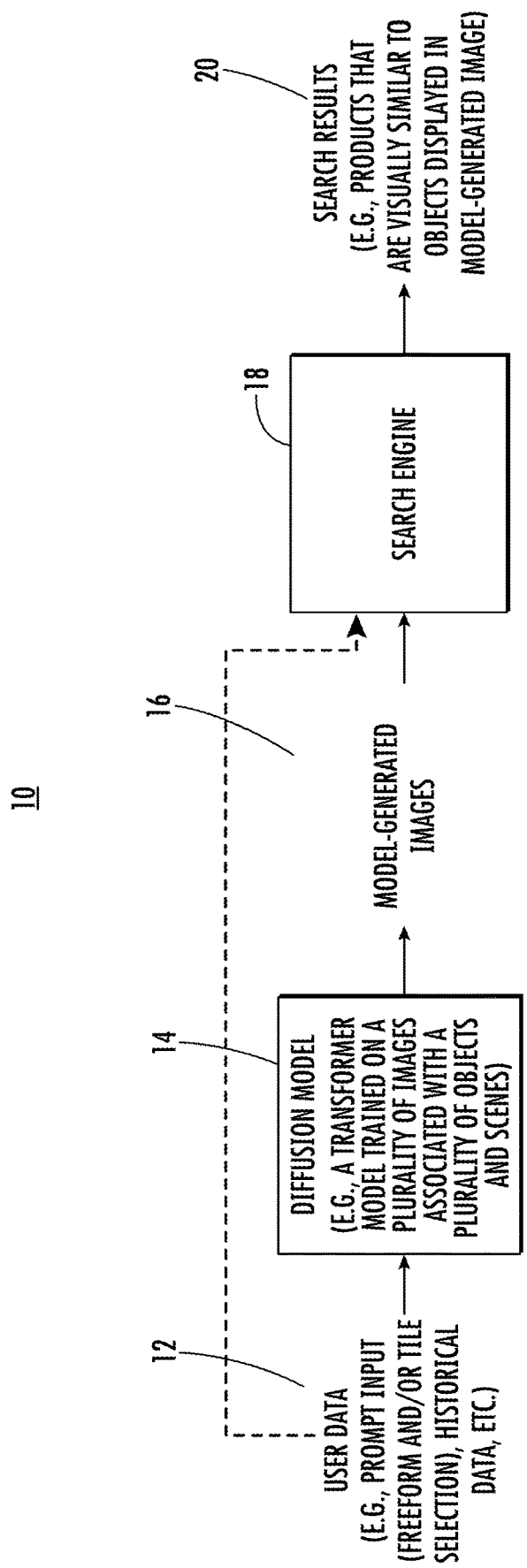
FIG. 1 depicts a block diagram of an example model-generated image search system according to example embodiments of the present disclosure.

Reference numerals that are repeated across plural figures are intended to identify the same features in various implementations.

DETAILED DESCRIPTION

Generally, the present disclosure is directed to generating content (e.g., images) based on a user request (e.g., a prompt input) to provide a visualization of a requested item that can then be searched to provide a visually informed and directed search. The systems and methods disclosed herein can leverage one or more dataset generation models to generate datasets that can then be utilized for querying a search engine to obtain search results. For example, a user may have an idea or concept that the user desires to find one or more real world examples of the idea or concept. Therefore, a user may generate a prompt input that can be provided to a dataset generation model to generate one or more datasets. A user may then select a particular dataset that can then be utilized to search one or more databases to obtain search results. For example, the dataset generation model (e.g., an image generation model) may generate a plurality of datasets in response to the prompt input. The plurality of model-generated datasets can be provided to a user interface, which can include a displayed list, a carousel, and/or one or more other presentation methods. A user can then review the plurality of model-generated datasets (e.g., a plurality of model-generated images) to determine one or more particular model-generated datasets that may be utilized for searching one or more databases. The one or more particular model-generated datasets can be utilized for querying one or more databases to obtain one or more search results.

Querying the one or more databases with the one or more particular model-generated datasets can include processing the one or more particular model-generated datasets with one or more machine-learned models (e.g., one or more classification models and/or one or more embedding models). For example, the one or more particular model-generated datasets can be processed by one or more embedding models to generate one or more features, which can then be utilized to query for a database for associated embeddings (e.g., one or more embedding neighbors) which may be associated with one or more candidate search results. Alternatively and/or additionally, the one or more particular model-generated datasets can be processed by one or more classification models to determine one or more classification tags that can be utilized to generate a query to query one or more databases.

In particular, articulating concepts and ideas for search can be difficult and some concepts cannot be specifically articulated, which can lead to issues in search result scope. Additional problems can include not knowing what terms to use, wanting unique content, vocabulary boundaries between user and an industry, only partial results, and/or off-topic search results.

The systems and methods disclosed herein can leverage one or more machine-learned diffusion models to generate images that can encapsulate a user request and can then be utilized as an image query to determine real world objects that are similar to the "imagined" objects of the model-generated image. Artificial intelligence (AI) generation models can be utilized to generate images that can be reviewed and selected to be utilized as a search query. In particular, images can provide a more detailed context of what a user is requesting during the search, which can allow for a more tailored search than text alone.

The present disclosure is directed to systems and methods for searching with a machine-learned model-generated data query. In particular, the systems and methods disclosed herein can leverage one or more machine-learned models and one or more user-interface elements to provide an interactive graphical user interface for suggesting, generating, and/or refining search queries based on model-generated datasets. Generated images can therefore be utilized to provide accurate search results as the generated dataset can provide a more detailed jumping off point for search. For example, the systems and methods can include obtaining a prompt input. The prompt input can include one or more terms. The prompt input can be processed with an image generation model to generate one or more model-generated images. The one or more model-generated images can be generated based at least in part on the one or more terms. A selection input can then be obtained. The selection input can be descriptive of a selection of the one or more model-generated images. The systems and methods can include determining one or more search results based on the one or more model-generated images. The one or more search results can be associated with one or more objects (e.g., a product such as an article of clothing). A search results interface can be provided for display (e.g., a search results page). The search results interface can provide the one or more search results for display and may include a viewport for viewing a search results list and at least a portion of a resource associated with one or more search results.

The systems and methods disclosed herein can be utilized to provide an interface for generating suggested datasets, that can then be utilized to query the web for pre-existing datasets that may be similar to and/or are associated with the model-generated dataset. For example, the model-generated dataset can include a model-generated image that is descriptive of instance interpolation of an object. The model-generated object can then be utilized to query one or more databases to identify a resource associated with an object that is similar to the object depicted in the model-generated image.

The systems and methods can obtain a prompt input (e.g., selection data descriptive of one or more selections received from a user computing device). The prompt input can include one or more terms (e.g., one or more words that can be descriptive of a requested instance interpolation (e.g., "jacket, feathered, brown, regal" to request a view rendering of a brown feathered jacket with a regal aesthetic). In some implementations, the prompt input can include selection data descriptive of one or more selection inputs associated with one or more selectable user-interface elements and/or one or more textual inputs including text input into a text entry box.

In some implementations, obtaining the prompt input can include providing a plurality of selectable user-interface elements for display in graphical user interface. The plurality of selectable user-interface elements can be associated with a plurality of candidate prompt terms (e.g., object types, categories, descriptors for a scene or object, and/or an aesthetic). Selection data can then be obtained. The selection data can be descriptive of a first selectable user-interface element (e.g., a first interactive chip) and a second selectable user-interface element (e.g., a second interactive chip). The first selectable user-interface element can be associated with a first prompt term (e.g., a noun, a verb, an adjective, and/or an adverb associated with a requested concept), and wherein the second selectable user-interface element is associated with a second prompt term (e.g., a noun, a verb, an adjective, and/or an adverb associated with a requested concept). For example, the prompt input can include the first prompt term and the second prompt term associated with the selected first user-interface element and the selected second user-interface element. The prompt terms can be descriptive of a topic (e.g., landscape, amusement park, dress, and/or purse), a quality (e.g., Tron-like, sci-fi, made of plants, a specific video game aesthetic, baroque, cyborg, and/or covered in sequins), and/or an action (e.g., dancing, running, playing football, and/or cheering).

In some implementations, the plurality of selectable user-interface elements can be provided for display in response to obtaining a prompt selection request. The prompt selection request can be descriptive of an input to receive the graphical user interface of selectable user-interface chips. The prompt selection request may be received by a user computing system during the display of an entry point interface that includes a text input box for receiving user input data to generate machine-learned model outputs based on a user provided text prompt. The plurality of candidate prompt terms associated with the plurality of selectable user-interface chips may be predetermined. The first prompt term can be associated with a type of object. The second prompt term can be associated with a particular descriptive feature, and the one or more model-generated images may be descriptive of a particular object of the type of object with the particular descriptive feature.

The prompt input can be processed with an image generation model to generate one or more model-generated images. The one or more model-generated images can be generated based at least in part on the one or more terms. The image generation model can be trained on a plurality of training images. The image generation model may be trained on a particular topic and/or a particular object type (e.g., a particular article of clothing). Alternatively and/or additionally, the image generation model can be trained generally. The training may include label training, and the labels can be utilized to determine and/or to generate the selectable user interface elements. For example, a particular label can be associated with a plurality of images (e.g., a "shirt" label can be associated with images for a plurality of different shirts and/or a "furry" label can be associated with a plurality of images associated with a plurality of fur for articles of clothing and/or interiors). The descriptor of the label can then be utilized to generate a selectable user interface element for the descriptor to be utilized as a prompt term.

In some implementations, the one or more model-generated images can be provided for display with the one or more terms in a graphical user interface. For example, a plurality of model-generated images can be generated and provided for display in an image carousel. The one or more model-generated images can be provided for display for interaction. A user may select a portion of a particular model-generated image to augment. For example, a user may be able to remove features (e.g., remove an object from a scene, remove an accessory, and/or tailor an article of clothing), change features (e.g., change a texture and/or change a color), and/or add features (e.g., add an object, add an ascent, and/or add an accessory) by providing one or more augmentation inputs.

A selection input can then be obtained. The selection input can be descriptive of a selection of the one or more model-generated images. The selection input can be descriptive of a request to query one or more databases for content and/or an item that is similar to the content in and/or an item in the selected model-generated image. The selection input may include one or more selections of one or more portions of the selected model-generated image that are of interest. The one or more portions may be segmented (or cropped) to then be input into a search engine.

The systems and methods can determine one or more search results based on the one or more model-generated images. The one or more search results can be associated with one or more objects. In some implementations, the one or more search results can be associated with one or more products. Additionally and/or alternatively, the one or more search results can include one or more action links associated with the one or more products. The one or more action links can be associated with a purchase interface for the one or more products. The one or more search results can be determined based on one or more labels associated with the model-generated image. Alternatively and/or additionally, the model-generated image can be processed with an embedding model to generate an embedding. The embedding can then be utilized to determine similar embeddings, which can be associated with the one or more search results. The one or more prompt terms may be utilized to determine the one or more search results. For example, the one or more search results can be obtained by generating a combined query with the prompt terms and the model-generated image.

In some implementations, determining the one or more search results based on the one or more model-generated images can include providing the one or more model-generated images to a search engine and receiving the one or more search results from the search engine. The search engine can be a general search engine and/or may be a database-specific search engine (e.g., a shopping search engine).

A search results interface can then be provided for display. The search results interface may include the one or more search results provided for display. The search results interface can be a search results page. The search results interface can include a list of search results, an augmented-reality try-on interface, and/or a viewport for viewing previews of resources associated with one or more search results.

The systems and methods can be utilized for finding images and products similar to request. Additionally and/or alternatively, the systems and methods disclosed herein can be utilized to find other data types (e.g., a song that fits an aesthetic and/or theme). For example, a machine-learned model can be trained to generate audio data based on one or more prompt inputs (e.g., "jazz, upbeat, saxophone solo" can be input to the machine-learned model to generate synthetic song, which can be presented to a user for selection then search.). For example, the systems and methods can include obtaining a prompt input. The prompt input can include one or more terms. The prompt input can be processed with a data generation model to generate a plurality of model-generated datasets. The plurality of model-generated datasets can be generated based at least in part on the one or more terms. The systems and methods can include providing the plurality of model-generated datasets via a user interface and obtaining a selection input. The selection input can be descriptive of a selection of a particular model-generated dataset of the plurality of model-generated datasets. The systems and methods can include determining one or more search results based on the particular model-generated dataset and providing the one or more search results as an output.

The systems and methods can obtain a prompt input. The prompt input can include one or more terms. The prompt input can be generated based on one or more selections of one or more user interface chips that can include text characters and/or icons associated with terms to utilize to prompt a data generation model. In some implementations, the prompt input can include one or more images, one or more audio clips, and/or latent encoding data.

The prompt input can be processed with a data generation model to generate a plurality of model-generated datasets. The plurality of model-generated datasets can be generated based at least in part on the one or more terms. In some implementations, each of the plurality of model-generated datasets may differ. The data generation model can be trained to generate one or more datasets based on a plurality of learned parameters and conditioned based on the prompt input. The model-generated dataset can include image data, audio data, multimodal data, text data, latent encoding data, and/or sensor data. For example, the plurality of model-generated datasets can include a plurality of images (e.g., a plurality of predicted depictions descriptive of the prompt input), a plurality of audio clips (e.g., a plurality of generated song clips predicted to be descriptive of the prompt input), and/or a plurality of video datasets (e.g., a plurality of predicted video clips generated based on the prompt input).

The plurality of model-generated datasets can then be provided for display via a user interface. Providing the plurality of model-generated datasets via the user interface can include providing a plurality of model-generated images in an image carousel. The plurality of model-generated datasets can be provided as a list of links to preview the model-generated datasets. Alternatively and/or additionally, the plurality of model-generated datasets can be transmitted for local download.

The systems and methods can then obtain a selection input. The selection input can be descriptive of a selection of a particular model-generated dataset of the plurality of model-generated datasets. For example, the user may navigate through a carousel of model-generated datasets, can determine a specific model-generated dataset of interest, and the user can then select the specific model-generated dataset to be utilized to query a database.

In some implementations, obtaining the selection input can include obtaining the selection of the particular model-generated dataset of the plurality of model-generated datasets and obtaining a cropping input. The cropping input can be descriptive of a portion of the particular model-generated dataset. The portion of the particular model-generated dataset can be segmented to generate a cropped model-generated dataset. In some implementations, the one or more search results can be determined based on the cropped model-generated dataset.

The systems and methods can determine one or more search results based on the particular model-generated dataset. The one or more search results can be determined based on an association with a resource dataset that is determined to be similar to the selected model-generated dataset. For example, a resource dataset can be a song determined to be similar to the model-generated audio clip.

The one or more search results can then be provided as an output. The one or more search results can be provided in a search results page. In some implementations, the one or more search results can be provided adjacent to one or more model-generated datasets. For example, the one or more search results can be provided in a panel of the user interface, and the one or more model-generated datasets can be provided in a same panel and/or a different panel.

The systems and methods disclosed herein can utilize a selection interface to generate the prompt input to be processed for generation. The selection interface can include a plurality of user-interface elements (e.g., chips or tiles) that can include words, symbols, and/or icons that are associated with a plurality of potential prompt terms. For example, the systems and methods can include providing an image-generation interface for display. The image-generation interface can include a plurality of category user-interface elements. Each category user-interface element can be associated with a different generation category. The systems and methods can include obtaining first input data. The first input data can be associated with a selection of a particular category user-interface element of the plurality of category user-interface elements. The particular category user-interface element can be associated with a particular category. The systems and methods can include providing a plurality of descriptor user-interface elements for display in the image-generation interface. Each descriptor user-interface element can be associated with a different descriptor. The systems and methods can include obtaining second input data. The second input data can be associated with a selection of one or more particular descriptor user-interface elements of the plurality of descriptor user-interface elements. In some implementations, the one or more particular descriptor user-interface elements can be associated with one or more particular descriptors. The systems and methods can include processing data associated with the one or more particular descriptors with a machine-learned image-generation model to generate one or more model-generated images and providing the one or more model-generated images for display in the image-generation interface.

The systems and methods can obtain an image-generation interface for display. The image-generation interface can include a plurality of category user-interface elements. In some implementations, each category user-interface element (e.g., a chip, tile, and/or a drop-down element) can be associated with a different generation category (e.g., a scene, a mural, an article of clothing, and/or a video game).

First input data can then be obtained. The first input data can be associated with a selection of a particular category user-interface element of the plurality of category user-interface elements. The particular category user-interface element can be associated with a particular category. In some implementations, the particular category can be associated with clothing. Additionally and/or alternatively, the one or more particular descriptors can be associated with one or more clothing terms descriptive of a clothing item.

A plurality of descriptor user-interface elements (e.g., a chip, a tile, and/or drop-down elements) can be provided for display in the image-generation interface. Each descriptor user-interface element can be associated with a different descriptor (e.g., an adjective and/or a complementary noun or verb associated with the particular category). The descriptors may be general descriptors for a plurality of different categories. Alternatively and/or additionally the plurality of descriptors may be determined and/or provided based on the selected category (e.g., a clothing material and/or a brand may be provided based on a clothing category being selected).

Second input data can then be obtained. The second input data can be associated with a selection of one or more particular descriptor user-interface elements of the plurality of descriptor user-interface elements. The one or more particular descriptor user-interface elements can be associated with one or more particular descriptors. Additionally and/or alternatively, a freeform text input can be obtained. For example, a text input box may be provided for display and can be utilized to receive freeform text associated with one or more additional descriptors.

Data associated with the one or more particular descriptors can be processed with a machine-learned image-generation model to generate one or more model-generated images. In some implementations, a prompt can be generated based on the category selection and the descriptor selection(s). Additionally and/or alternatively, a specific machine-learned image-generation model can be obtained based on the selected category. The prompt may be a structured prompt based on a selection hierarchy (e.g., a category the descriptors and/or based on the time of selection).

The one or more model-generated images can be provided for display in the image-generation interface. The one or more model-generated images can be provided in a carousel interface, in a list, in a grid, and/or a slideshow interface.

In some implementations, the systems and methods can obtain third input data. The third input data can be descriptive of a selection of the one or more model-generated images. The systems and methods can then determine one or more search results based on the one or more model-generated images. The one or more search results can be associated with one or more objects. A search results interface can then be provided for display. The search results interface can provide the one or more search results for display.

Additionally and/or alternatively, edit input data can be obtained. The edit input data can be descriptive of a request to replace one or more first features of the one or more model-generated images with one or more second features. One or more updated model-generated images can then be generated based on the edit input data. The edit input data can be associated with a color change. In some implementations, the edit input data can be associated with a texture change.

The prompt generation interface and/or the dataset generation and search interface may be provided in a search application, a browser application, a shopping application, a viewfinder application, an image recognition application, an augmented-reality application, a virtual-reality application, a discover application (e.g., a suggestion application), an image generation application, and/or in a web application or platform.

The systems and methods can include rerendering options. For example, the user may deselect one or more prompt interface elements and may select additional interface elements, then render a new dataset and/or a new portion of the generated dataset. A user may select a portion of the generated dataset to replace with a portion of another dataset. Additionally and/or alternatively, a user may select a replacement color, a replacement material, a replacement texture, and/or a replacement design.

The generated dataset (e.g., a model-generated image) and/or the one or more search results can be saved. For example, the model-generated image and/or a product associated with a search result may be added to a user-specific library, gallery, virtual closet, and/or collection. Sub-groups and/or sub-collections may be generated based on a color, determined aesthetic, and/or a determined association. The sub-collections and/or sub-groups can include data from other applications (e.g., social media applications). In some implementations, prompts may be suggested based on data from other applications and/or based on the generated collections. For example, media content and/or web content can be saved and/or interacted with, which can then be utilized to generate a suggested prompt.

In some implementations, the systems and methods can be utilized to find real world clothing, preexisting art, and/or potential travel locations. For example, A category can be selected (e.g., clothing, art, and/or a location). A plurality of suggested prompt term user interface elements (or a plurality of descriptor user interface elements) associated with the category can be provided for display. The user can select multiple suggested prompt terms to generate a prompt that can be provided to the image generation model to generate a model-generated image. A user can determine the model-generated image is in line with a desired search. The model-generated image can then be searched to find an article of clothing, an art piece, and/or a travel location that matches the depicted features of the model-generated image.

The systems and methods may be performed based on cloud processing. Alternatively and/or additionally, the processing may be performed locally on a user device and/or via a device at a retailer. The systems and methods may be embedded in a search interface.

The prompts may include a vibe and/or an aesthetic associated with a content item, a time period, a genre, and/or a location. The image generation model may include a text-to-image diffusion model (e.g., the text-to-image diffusion model of Imagen, GOOGLE RESEARCH (Nov. 25, 2022, 3:40 PM), https://imagen.research.google/.). The image generation model can include a transformer model (e.g., a T5-XXL encoder).

The systems and methods can utilize the model-generated image as a query, the prompt input as a query, and/or metadata associated with the user and/or the inputs as a query. For example, the selected model-generated image and the prompt input may be processed by a search engine to determine the one or more search results. The multi-modal search query can include multi-modal embedding, feature recognition and text query generation, image based searching with text based ranking, text based searching and image based ranking, and/or conditioned processing.

Articulating concepts and ideas for search can be difficult and some concepts cannot be specifically articulated, which can lead to issues in search result scope. Additional problems can include not knowing what terms to use, wanting unique content, vocabulary boundaries between user and an industry, only partial results, and/or off-topic search results.

The systems and methods disclosed herein can leverage AI generation models to generate images that can be reviewed and selected to be utilized as a search query. In particular, the images can provide a more detailed context of what a user is requesting during the search, which can allow for a more tailored search than text alone.

Traditional searching for clothing, art, movies, and/or music can be difficult if a user does not have an example to provide to a search engine. Freeform text and/or Boolean strings provided as a text query to a search engine may provide mixed and/or unaligned search results that may be off topic and/or may include only parts of the search query. Refining those searches and/or reviewing those search results can be time intensive and may be non-intuitive. Image queries may provide more tailored results as images may include features that cannot be descriptively described via text in brevity. However, a user may not have access to an image of what they are looking for during the search, and/or the user may be basing their search on a real world example that they know of based on real world experience (e.g., a user may searching for a real world example of what they imagined).

In addition, the utilization of artificial intelligence techniques to generate images and/or other datasets can be non-intuitive, may be open-ended, and may be time consuming. Image generation systems such as DALLE ("DALL-E 2," OPENAI (Apr. 6, 2022), https://openai.com/dall-e-2/.) utilize a prompt input box for receiving freeform text to be processed to generate one or more images. However, as a user utilizes the prompt input box, the user may struggle with which words to utilize and/or may be dissatisfied with the generated image as one or more of the input words may not be utilized in the direction the user desired (e.g., "fisheye" may be entered by the user in association with the image capture lens to be descriptive of a desired distortion; however, the model may generate an image with a fish).

The systems and methods of the present disclosure provide a number of technical effects and benefits. As one example, the system and methods can provide an interactive user interface that can be utilized machine-learned model output leveraged search. In particular, the systems and methods disclosed herein can leverage a machine-learned model to generate an output that can then be utilized as a query to query a search engine. For example, the systems and methods can provide a prompt input to an image generation model, which can generate a plurality of model-generated images. A user can then select one or more model-generated images that are in line with a desired product or object. The selected model generated image(s) can then be input into a search engine, which can output one or more search results associated with products and/or objects that are determined to be similar to the provided image. The present disclosure can enable search and retrieval of search results in a more efficient and/or faster manner. In particular, the present disclosure can enable more versatile search and retrieval of search results based on different kinds of input. In the present disclosure, a selection of one or more images may be used to determine search results. Moreover, in the present disclosure, the one or more images may be model-generated by an image generation model. This can inherently expand the versatility of search and retrieval through expanding the range of inputs that can be provided as part of a search and retrieval process. The systems and methods can enable search and retrieval of search results based on images that may not previously have been in existence, but which may have been newly generated for this purpose. This can provide a mechanism for inputting a search query which would not be possible without the implementation of the image generation model to the overall process as described herein. The present disclosure thereby can leverage an image generation model in combination with determination of search results to provide improved search and retrieval operations.

Another technical benefit of the systems and methods of the present disclosure is the ability to leverage one or more user interface elements to provide suggested inputs for the machine-learned model. For example, a plurality of category user interface elements can be provided with each user interface element being associated with a different category for dataset generation. A plurality of descriptor user interface elements can be provided to allow for more detailed prompt generation. The plurality of descriptor user interface elements may be provided for display and/or refined based on the selection of a particular category. The different user interface elements may lead to more directed prompt generation based on terms the model may be trained on specifically. Moreover, the increased versatility of the search and retrieval process according to the present disclosure can enable faster and/or more accurate determination of requested search results. Text queries to a search engine may provide mixed and/or unaligned search results that may be off topic and/or may include only parts of the search query. Repeated iterations of updating text queries and searching may lead to high use of processor power, high use of available bandwidth, and high consumption of battery of a user device. The present disclosure can enable more versatile input to a search engine based on model-generated images. This can provide improved accuracy, tailoring or targeting of the input search query, which further enables more efficient use of processor power, available bandwidth and battery in a search and retrieval operation.

Another example of technical effect and benefit relates to improved computational efficiency and improvements in the functioning of a computing system. For example, the systems and methods disclosed herein can leverage cloud computing to provide an immersive artificial intelligence leveraged capability to user devices with limited computational capabilities.

With reference now to the Figures, example embodiments of the present disclosure will be discussed in further detail.

FIG. 1 depicts a block diagram of an example model-generated image search system 10 according to example embodiments of the present disclosure. In particular, the model-generated image search system 10 can include obtaining user data 12, generating one or more model-generated images 16, and determining one or more search results 20 based on the one or more model-generated images 16.

For example, user data 12 can be obtained from a user computing system. The user data can include a prompt input, historical data (e.g., data descriptive of user search history, user purchase history, user browsing history, etc.), profile data, user-selected data, and/or preference data. The prompt input can include a freeform prompt input and/or a generated prompt input generated based on one or more tile selections of a user interface. The prompt input can be descriptive of one or more attributes a user is requesting to be rendered in a generated image. The prompt input can include a subject of the image (e.g., an environment and/or one or more objects) and one or more details for the subject (e.g., a color, a style, a material, etc.).

The user data 12 can be processed with a diffusion model 14 to generate one or more model-generated images 16. The diffusion model 14 can be a machine-learned image generation model and may be trained to process text data and/or image data to generate one or more images. The one or more model-generated images 16 can include a subject with one or more attributes and may be associated with the subject and one or more details of the prompt input.

The one or more model-generated images 16 can then be provided to a search engine 18 to determine one or more search results 20. The one or more model-generated images 16 may be provided to the search engine 18 automatically upon generation and/or may be provided in response to one or more user inputs (e.g., a selection of a search option and/or a selection of a particular image). In some implementations, the search engine 18 may additionally process the user data 12 with the one or more model-generated images 16 to determine the one or more search results 20. The one or more search results 20 may be determined based on one or more visual similarities between the one or more model-generated images 16 and one or more images associated with the one or more search results 20. The search results 20 can include image search results, website search results, and/or marketplace search results. For example, the search results 20 may include products determined to be visually similar to one or more objects depicted in the one or more model-generated images 16.

In particular, the model-generated image search system 10 can obtain user data 12 descriptive of an item that may be of interest to a user (e.g., based on explicit inputs, learned preferences, and/or availability). The model-generated image search system 10 may generate a visualization of the item (e.g., the one or more model-generated images 16). A user may select a specific image that is of interest to them. The model-generated image can then be provided to a search engine 18 to determine real world products that are visually similar to the "imagined" item.

Figure 2:
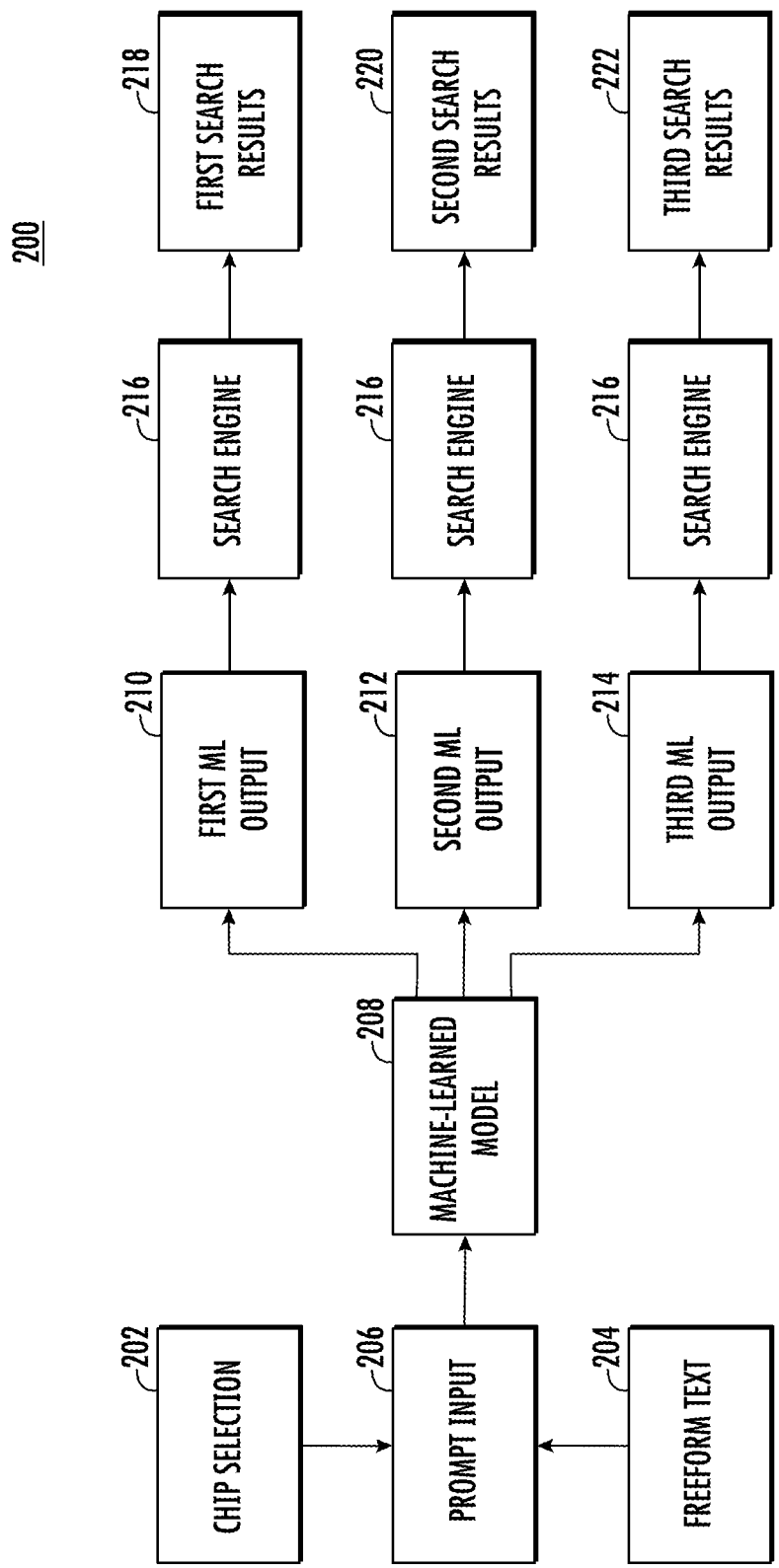
FIG. 2 depicts a block diagram of an example machine-learned model processing and search system according to example embodiments of the present disclosure.

FIG. 2 depicts a block diagram of an example machine-learned model processing and search system 200 according to example embodiments of the present disclosure. In particular, the machine-learned model processing and search system 200 includes generating a prompt input 206, providing the prompt input 206 to a machine-learned model 208 (e.g., a dataset generation model) to receive a plurality of machine-learned model outputs (e.g., a plurality of model-generated datasets), obtaining a selection input, providing the selected machine-learned model output to a search engine 216, and receiving one or more search results.

The prompt input 206 can be generated and/or determined based on one or more chip selections 202, one or more freeform text inputs 204, and/or one or more media file inputs. For example, a plurality of user interface chips associated with different candidate prompt terms can be provided for display. A user can then select a subset of the plurality of user interface chips, which can then be utilized to generate a prompt input 206 that is descriptive of the plurality of selected prompt terms. In some implementations, the prompt input 206 can include prompt terms input via freeform text 204.

The prompt input 206 can then be processed with a machine-learned model 208 (e.g., a dataset generation model (e.g., an image generation model)) to generate plurality of machine-learned model outputs (e.g., a plurality of images). The plurality of machine-learned model outputs can include a first machine-learned model output 210 (e.g., a first model-generated image), a second machine-learned model output 212 (e.g., a second model-generated image), and a third machine-learned model output 214 (e.g., a third model-generated image).

A user may then select a particular machine-learned model output to utilize for searching for resources (e.g., for searching for art, for searching for a clothing product, and/or for searching for another type of product). For example, the first machine-learned model output 210 may be input into a search engine 216 to obtain one or more first search results 218, the second machine-learned model output 212 may be input into a search engine 216 to obtain one or more second search results 220, and the third machine-learned model output 214 may be input into a search engine 216 to obtain one or more third search results 222. The search results can be determined based on a determined similarity score.

Figure 3A:
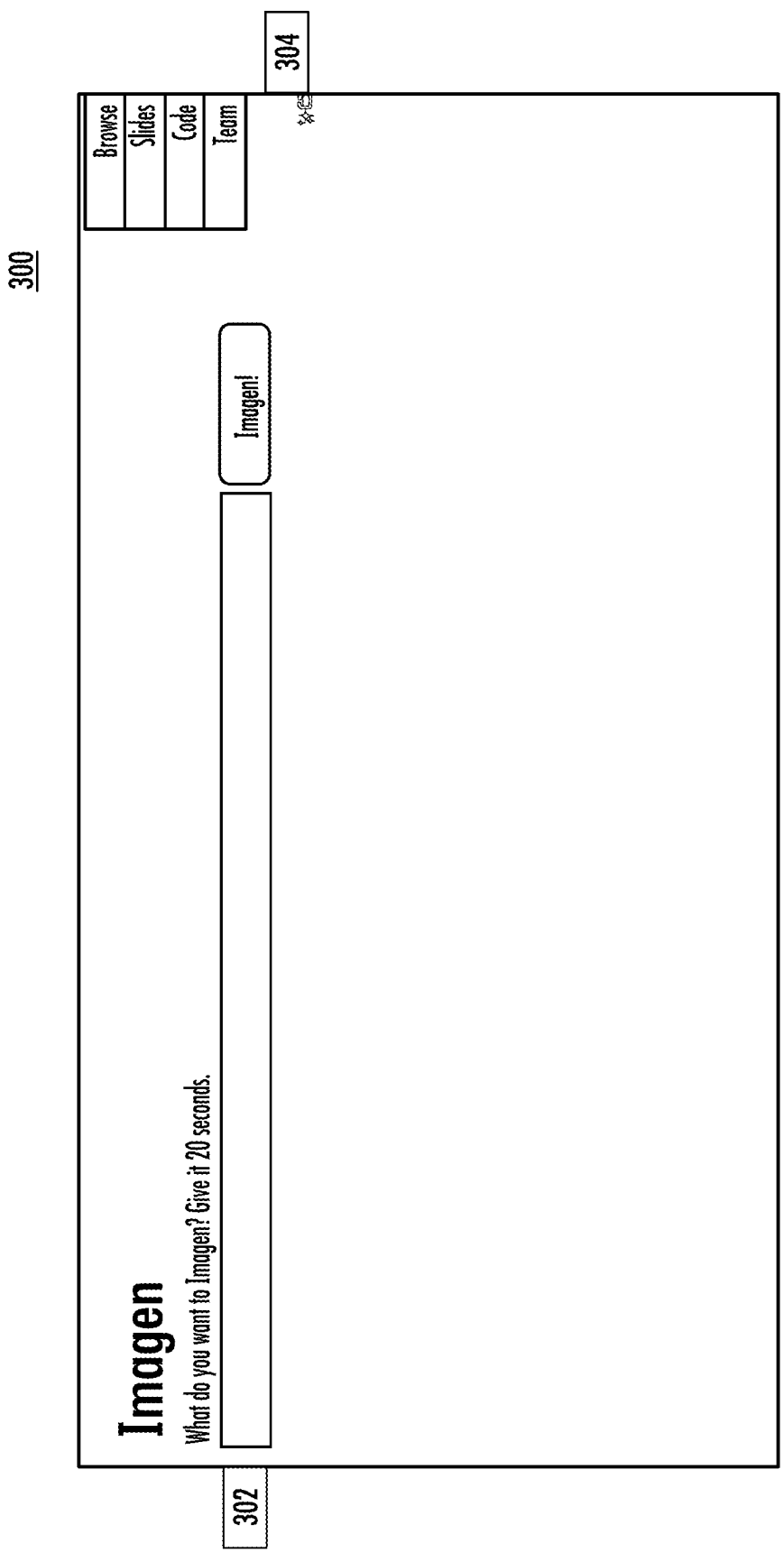

FIGS. 3A-3M depict illustrations of an example search interface 300 according to example embodiments of the present disclosure. In particular, FIG. 3A can depict an example initial interface appearance with a freeform text input box 302 and an interactive prompt generation element 304. The interactive prompt generation element 304 can be selected to update the search interface 300 to include a plurality of interactive user interface elements for generating a prompt input.

Figure 3B:
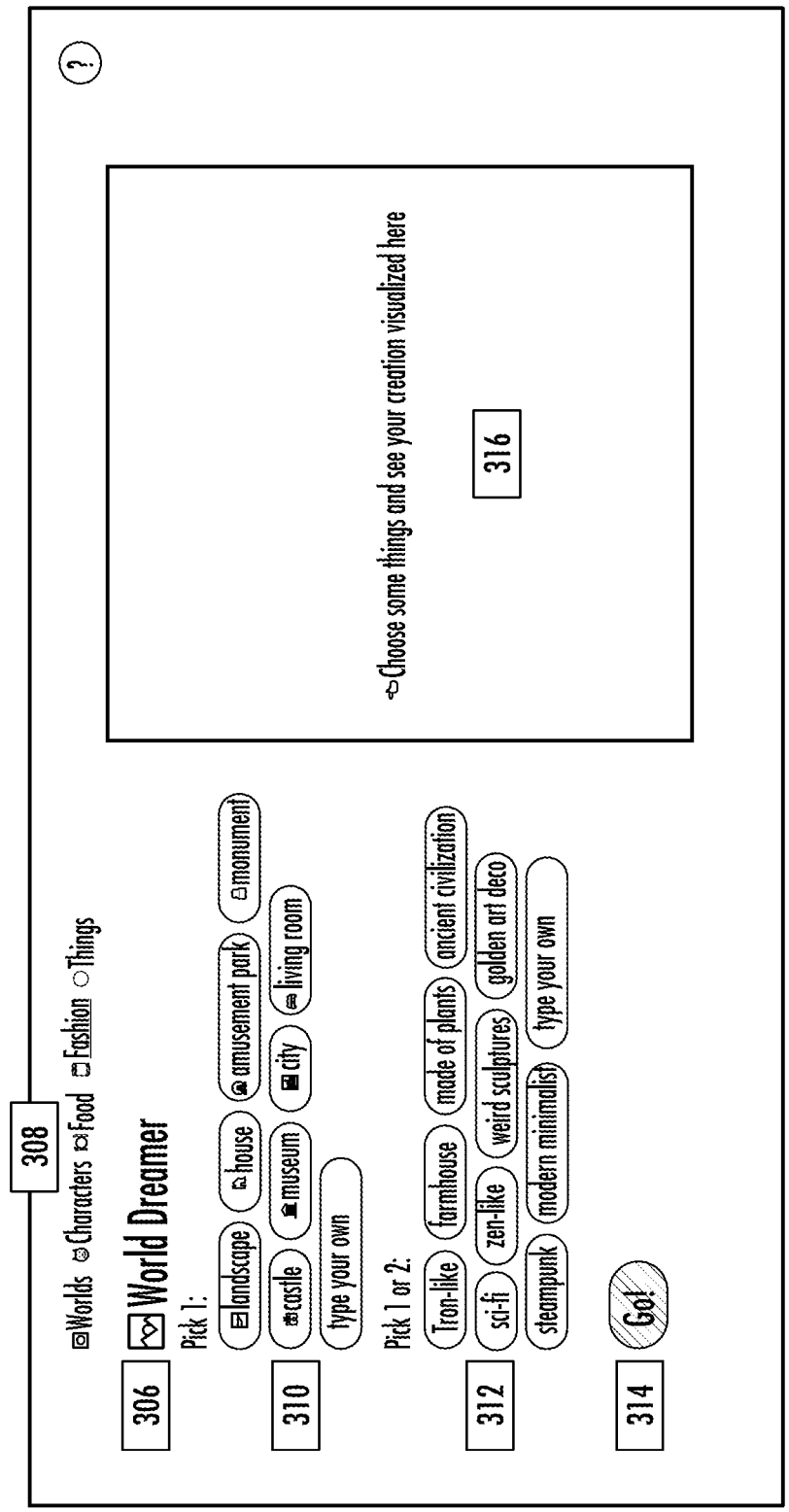

FIG. 3B depicts the updated interface with a category indicator 306 indicating the selected category for creation, a plurality of category user interface elements 308 for selection to select the particular category for generation, a plurality of first descriptor user interface elements 310, a plurality of second descriptor user interface elements 312, a generate user interface element 314 to initiate the dataset generation, and a preview window 316 for previewing the model-generated datasets.

Figure 3C:

In response to a selection of a different category user interface element of the plurality of category user interface elements 308, the search interface 300 can be updated again to update the category indicator 306 to indicate the updated selected category (e.g., as shown in FIG. 3C). Additionally and/or alternatively, the plurality of first descriptor user interface elements 310 and the plurality of second user interface elements 312 can be updated. The descriptor user interface elements can be updated based on the particular selected category to include object types and/or adjectives associated with that particular selected category.

In FIG. 3D, the category is "Fashion Designer", which is associated with "imagining" clothing items. FIG. 3D depicts a first descriptor (i.e., a dress descriptor) of the plurality of first descriptors 310 being selected. Therefore, the user is generating a request to generate an image with a dress.

Figure 3E:
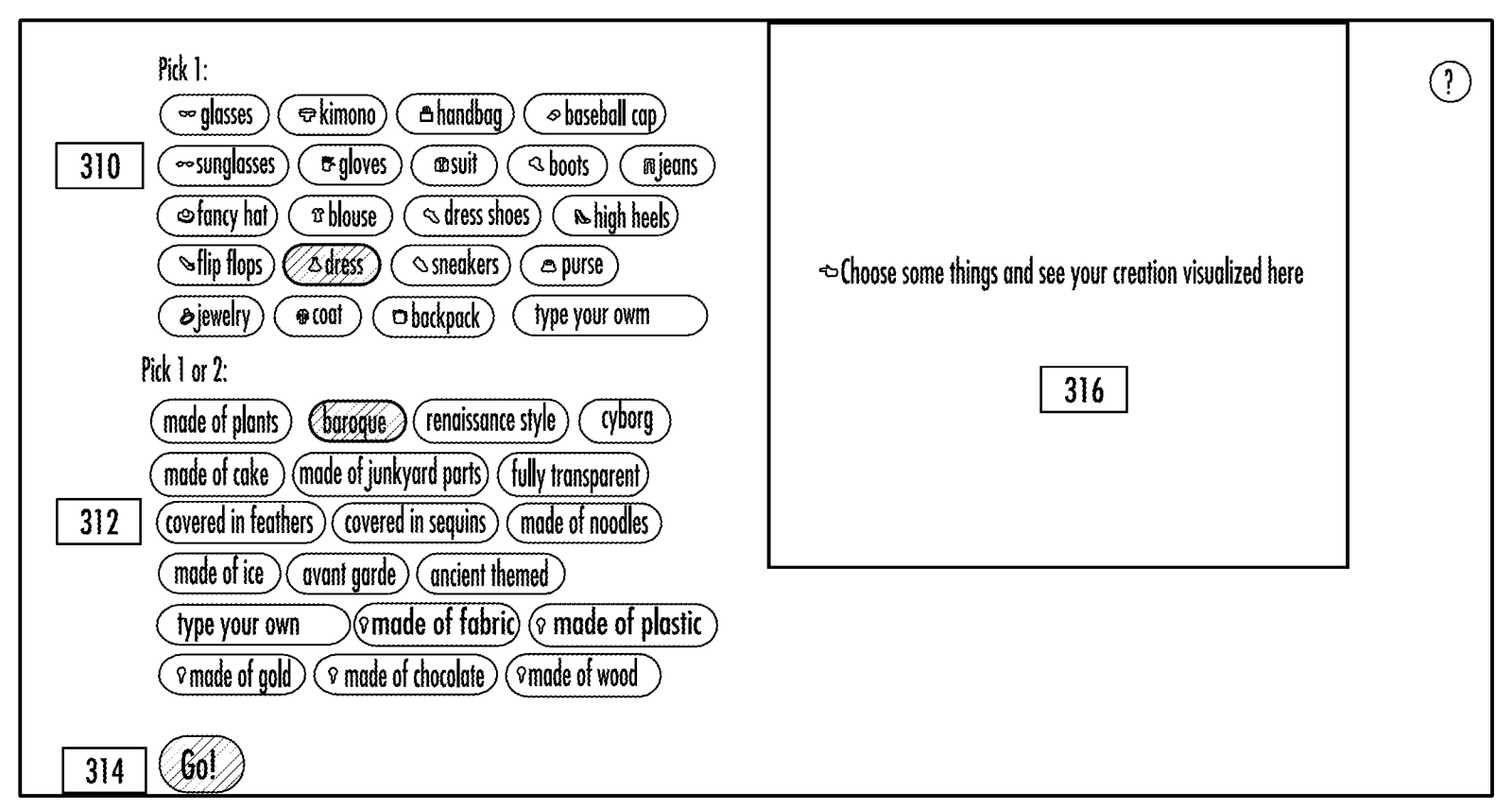

In FIG. 3E, the selected first descriptor is provided with an indication of selection. Additionally, a particular second descriptor user interface element (i.e., a user interface element with the text "baroque") of the plurality of second descriptor user interface elements 312 is depicted as being selected.

Figure 3F:
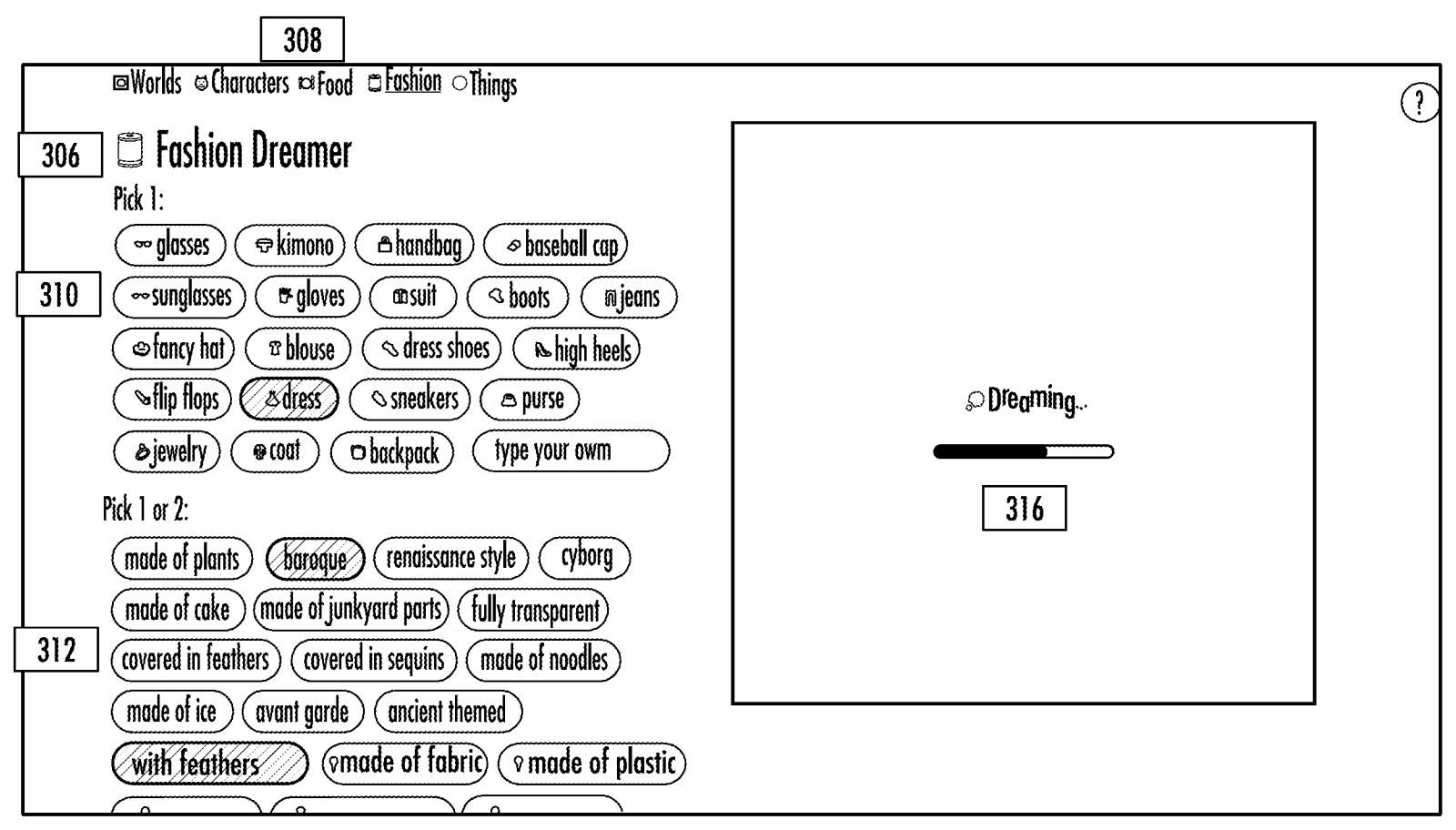

In FIG. 3F, freeform text (i.e., "with feathers") is added in an input box, and the generated user interface element 314 is selected, which initiates the generation and a buffer indicator is provided for display in the preview window 316. The buffer indicator can indicate the prompt input is being generated and/or processed with an image generation model to generate a plurality of model-generated images.

Figure 3G:
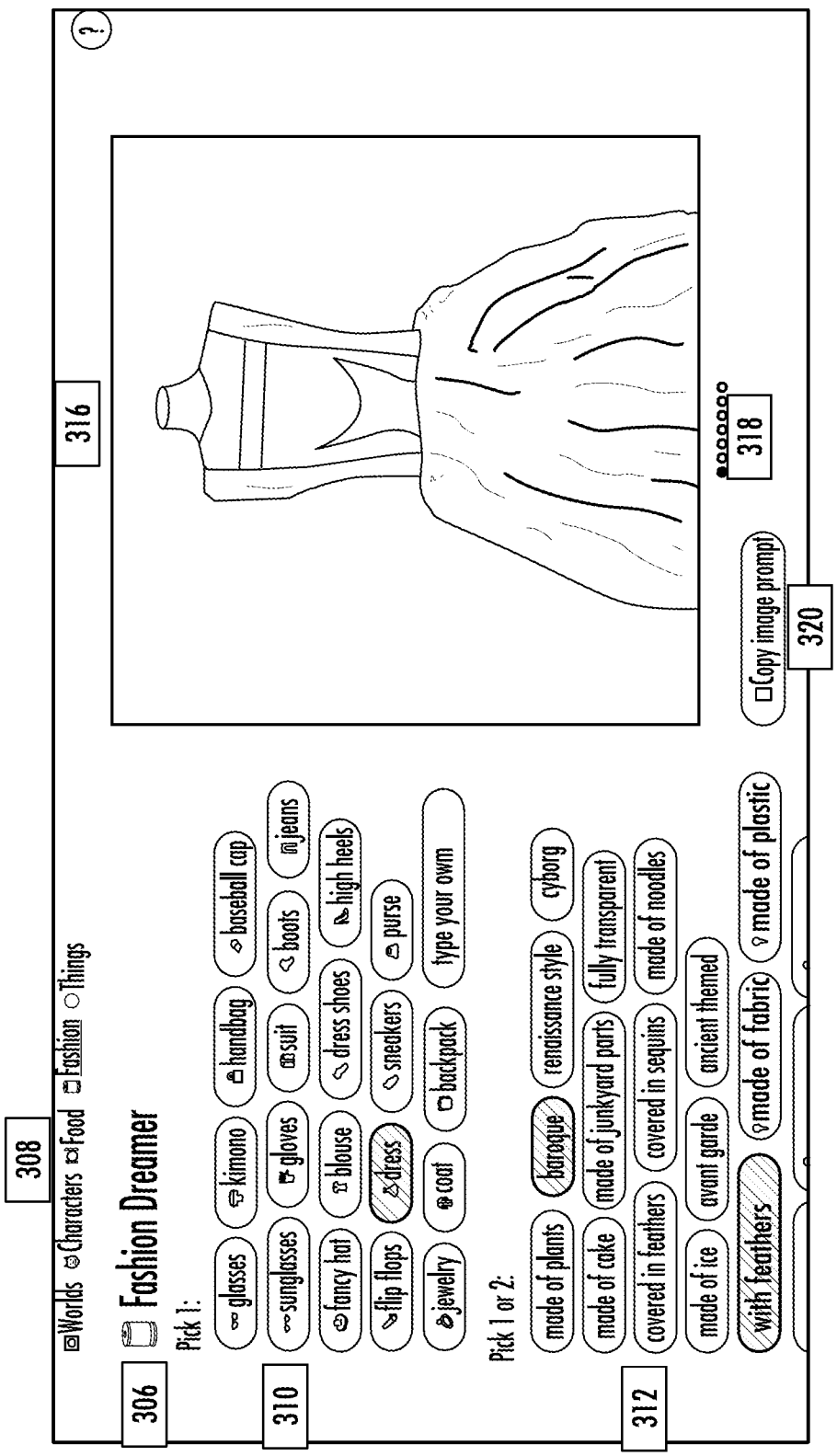

In FIG. 3G, the search interface 300 is updated to provide a model-generated image carousel 318 with a first model-generated image provided for display in the preview window 316. The updated search interface can include a copy image prompt interface element 320 that can be selected to utilize the currently previewed image as a query image for a search. The first model-generated image can be descriptive of an image generated based on the category "Fashion Designer", the first descriptor "dress", the second descriptor "baroque", and the freeform text input "with feathers". A user can then navigate through the model-generated image carousel 318 to view the different model-generated images in the preview window 316. When a user decides a particular model-generated image to utilize as a query, the user can select the copy image prompt interface element 320.

Figure 3H:
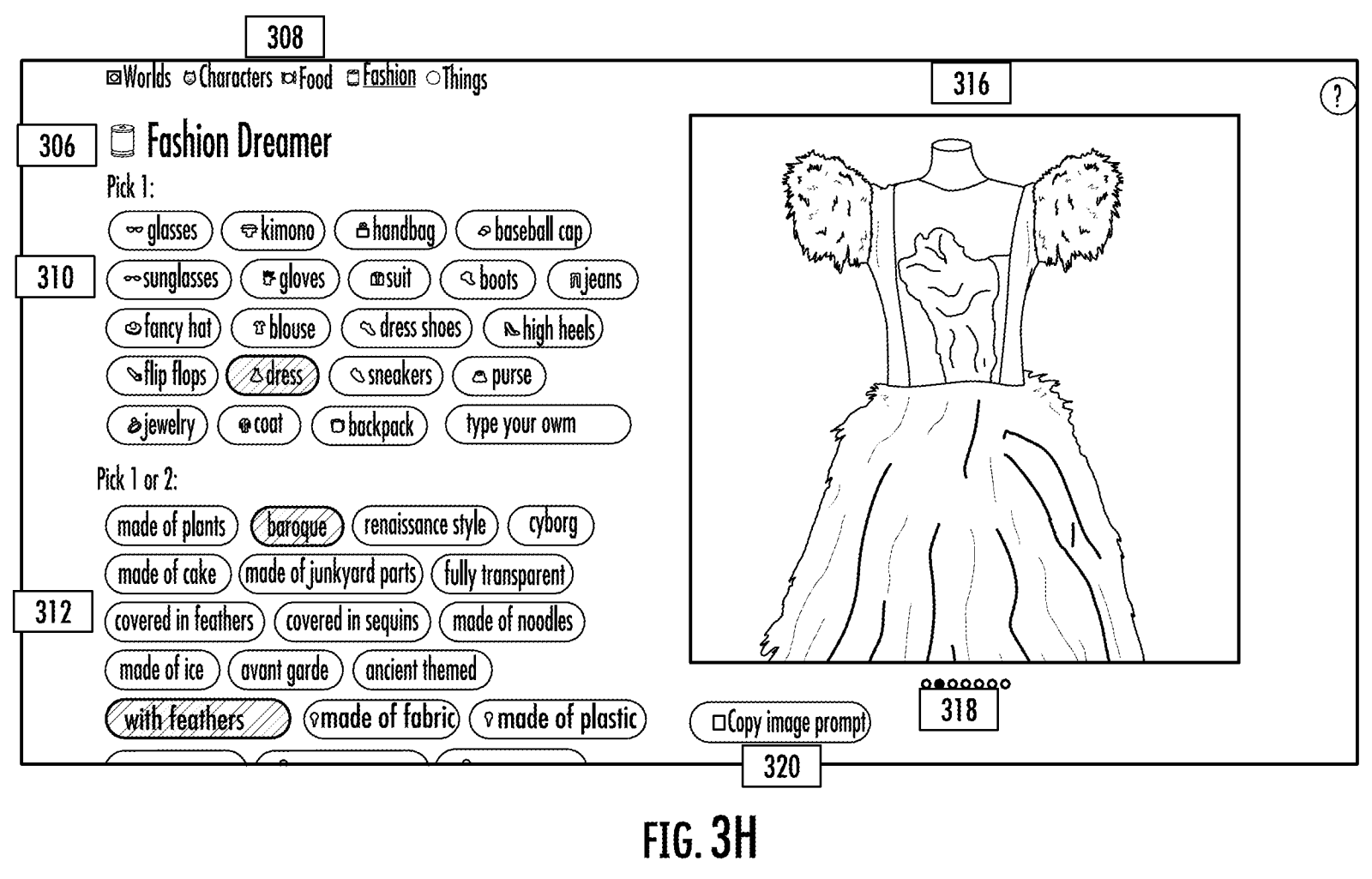
Figure 3I:
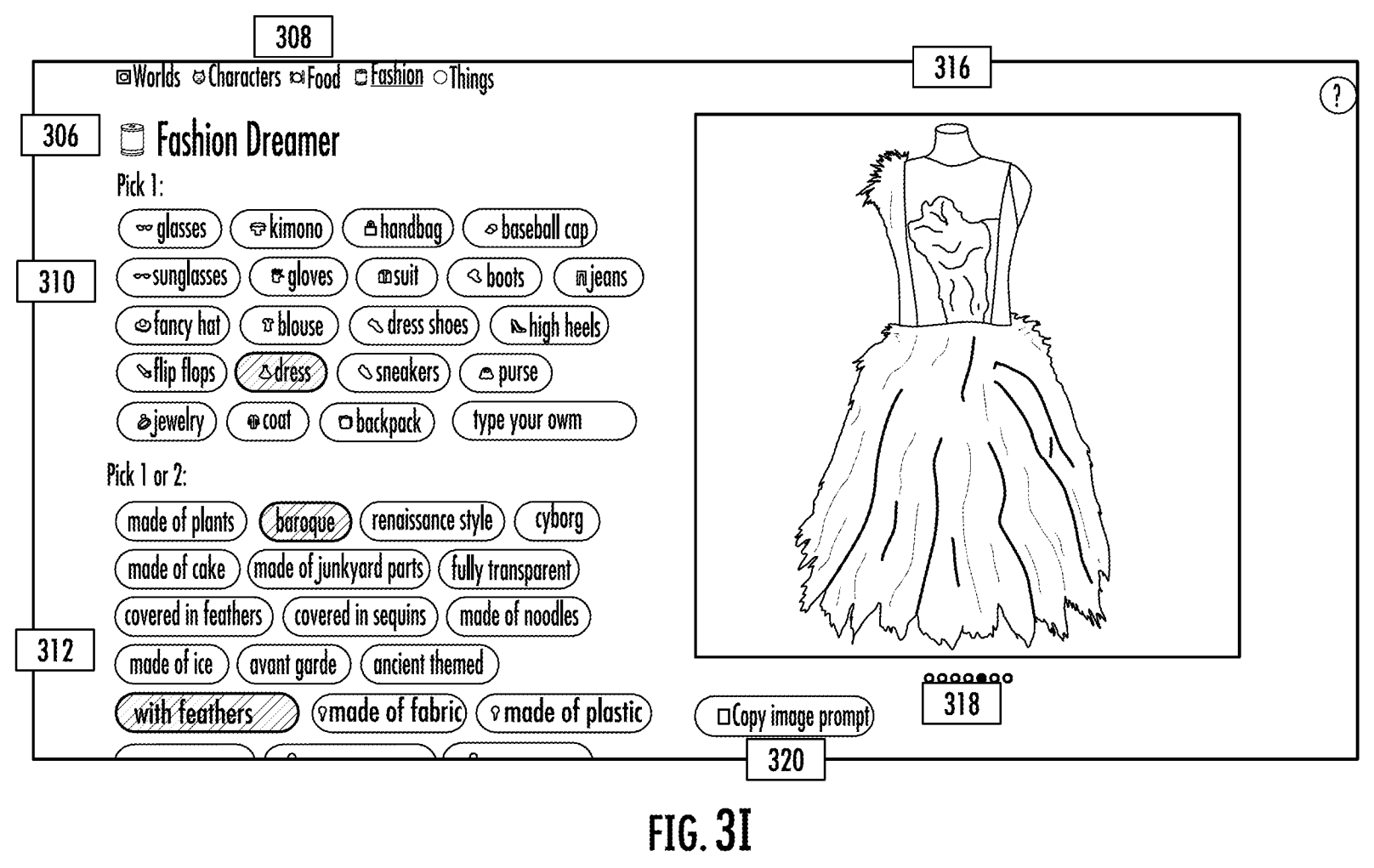

In FIG. 3H, a second model-generated image is provided for display in the preview window 316. In FIG. 3I, a fourth model-generated image is provided for display in the preview window 316. The user can then select the copy image prompt interface element 320. The selection input can be received, and the selected model-generated image can be utilized as an image query to query one or more databases.

Figure 3J:
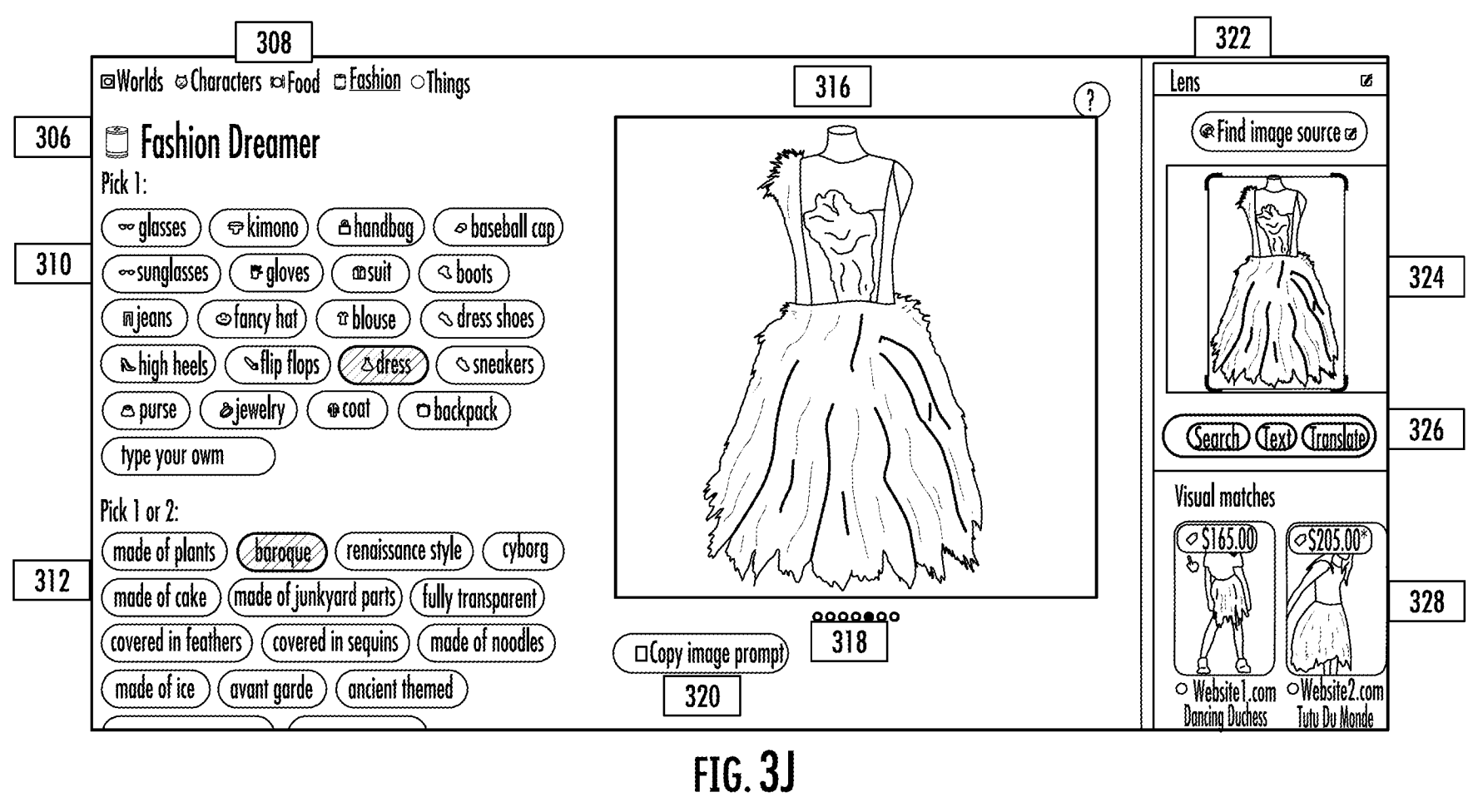

In FIG. 3J, a search results panel 322 can be provided for display in response to the receiving the selection input. In some implementations, a cropping interface 324 can be provided to enable the cropping of the selected model-generated image to refine the search results and/or to augment the search query. Other interface options 326 may be provided to navigate between a search option, an optical character recognition option, and a translate option. The search results panel 322 can include a plurality of search results 328 provided for display in response to the model-generated image query. The plurality of search results 328 can be determined based on an association with an image that is determined to be above a similarity threshold.

Figure 3K:
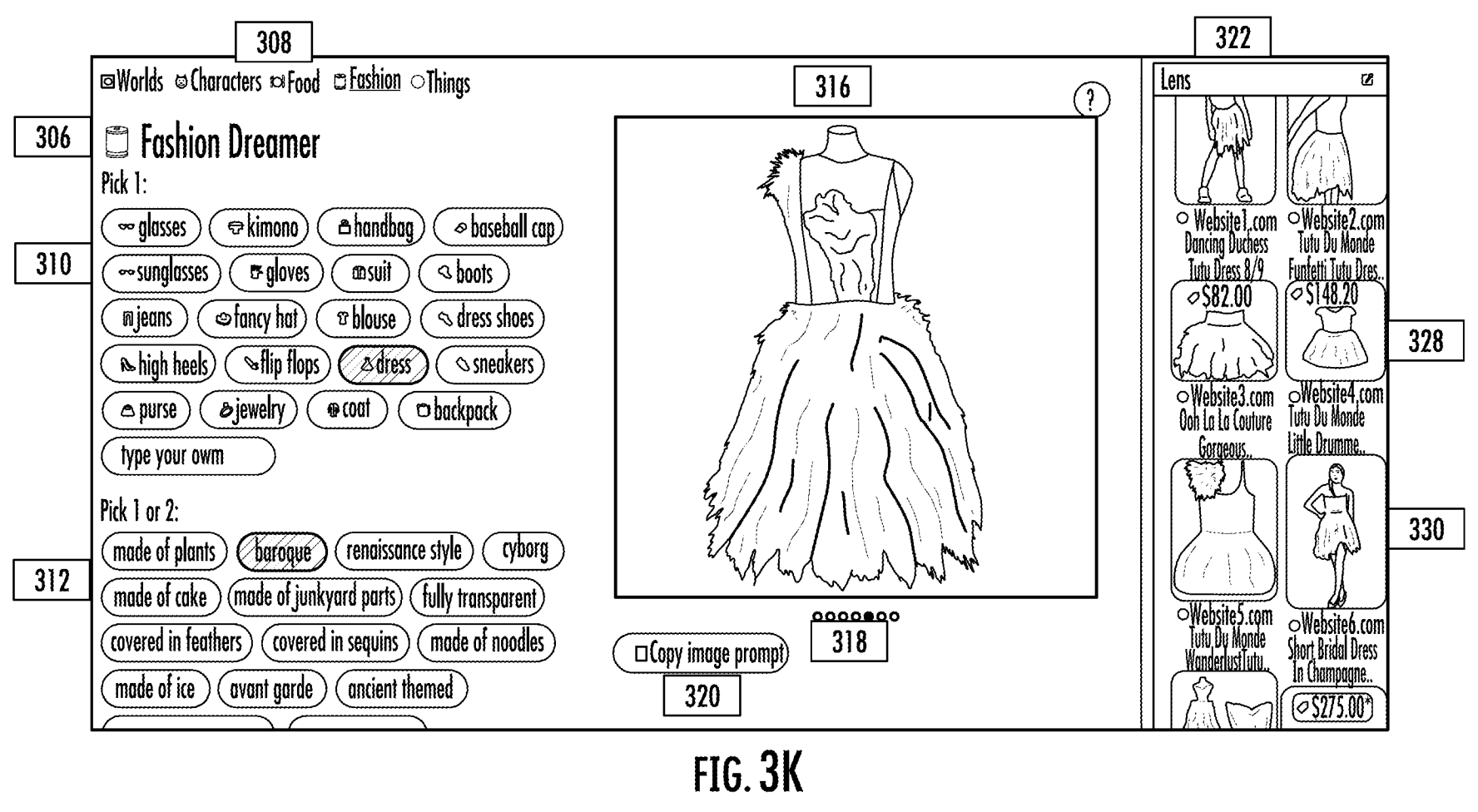
Figure 3L:
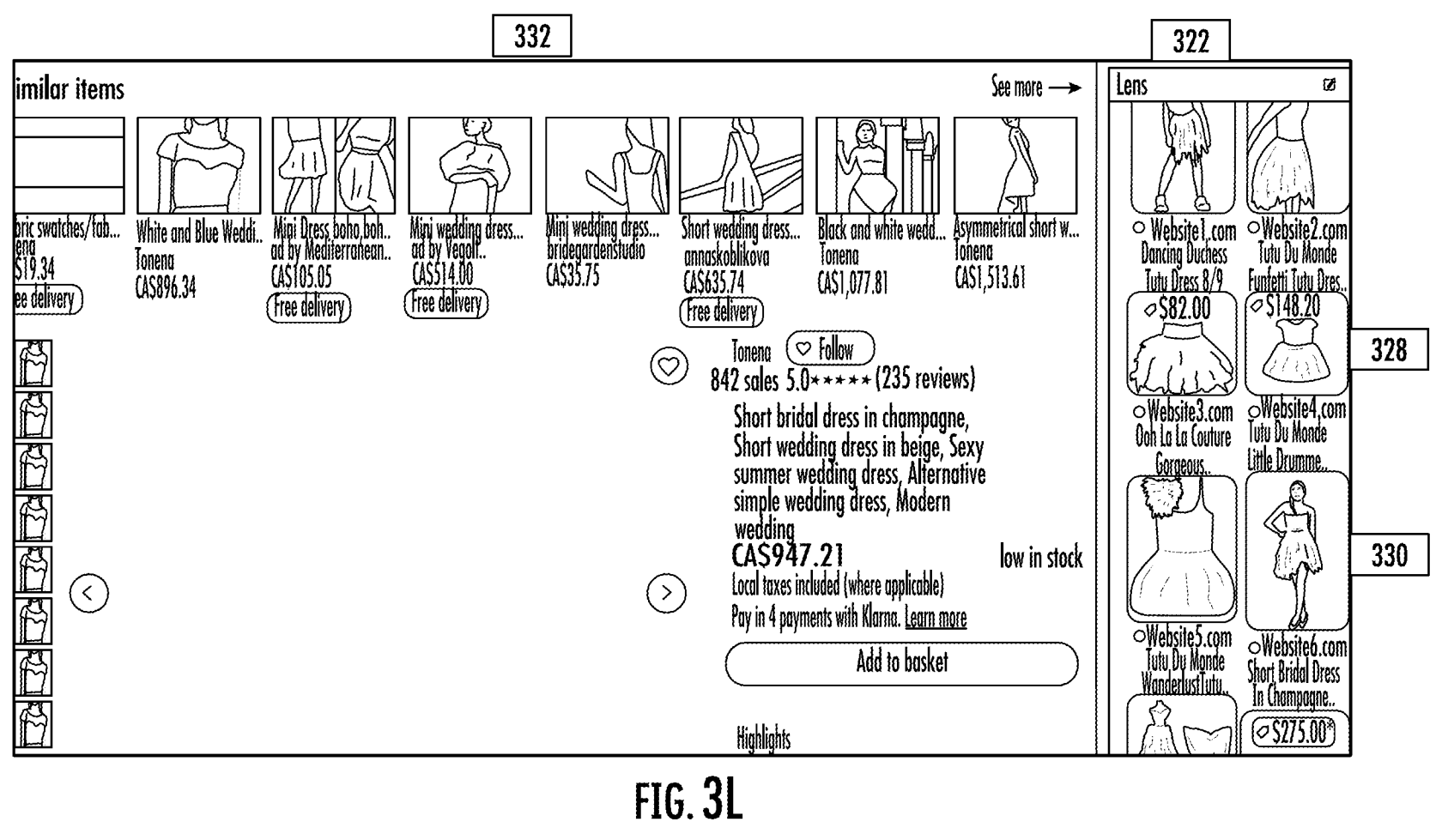
Figure 3M:
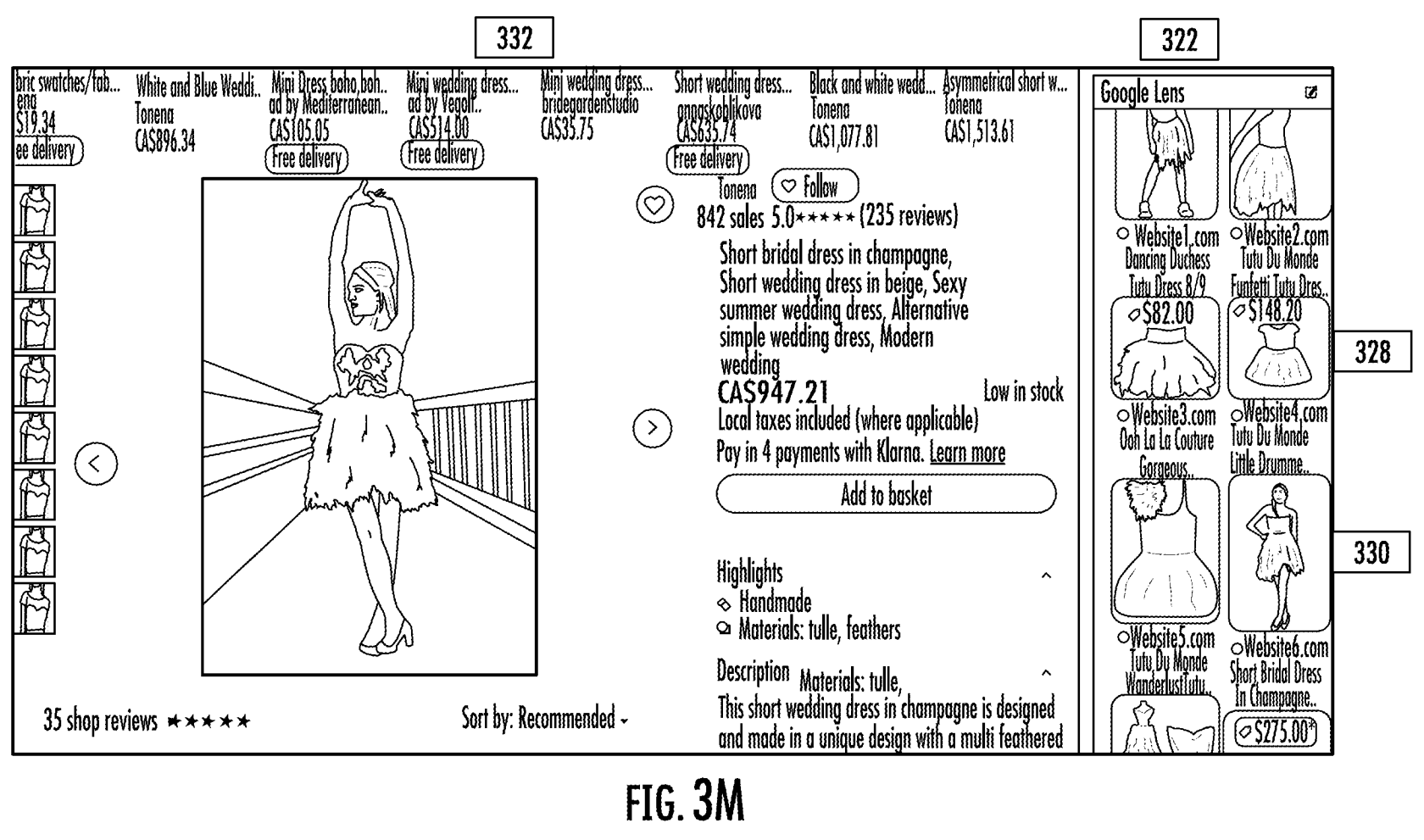

A user can scroll through the plurality of search results 328 in the search results panel 322 to determine a specific search result 330 of interest (e.g., as shown in FIG. 3K). A selection input can be received that is descriptive of a selection of the specific search result 330. The image generation interface can then be replaced with a browser window 332 that displays at least a portion of a resource associated with the specific search result 330 (e.g., as shown in FIG. 3L). A user can then interact with the web resource in the browser window 332 (e.g., as shown in FIG. 3M). For example, a user may purchase a dress in the browser window 332, in which the purchased dress resembles the dress depicted in the selected model-generated image.

Figure 4:
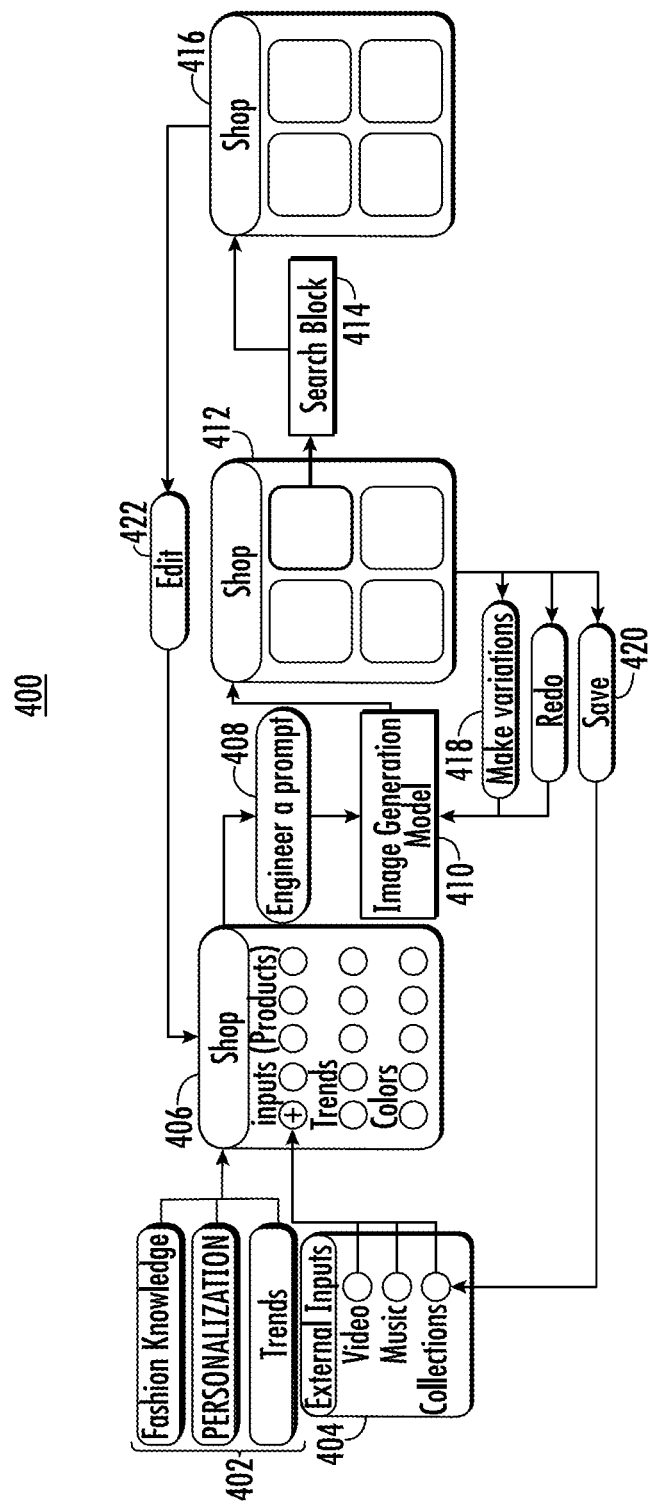
FIG. 4 depicts a block diagram of an example machine-learned model processing and search system according to example embodiments of the present disclosure.

FIG. 4 depicts a block diagram of an example machine-learned model processing and search system 400 according to example embodiments of the present disclosure. In particular, one or more external inputs 404 and/or learned information 402 can be utilized to engineer a prompt 408, which can be processed by an image generation model 410 to generate model generated images, which can then be searched.

For example, stored and/or learned information 402 (e.g., fashion knowledge, personalization (e.g., based on stored data associated with a user), and/or trends (e.g., purchase trends, social media trends, and/or search trends)) can be obtained and utilized to generate a prompt and/or to suggest prompt inputs for selection via selectable user interface elements. One or more external inputs 404 (e.g., a video, an image, music, and/or collections) can be obtained to generate the prompt input. For example, an image, a video, and/or audio data can be provided to be processed to determine a suggested prompt.

The learned information 402 and/or the one or more external inputs 404 can be utilized to generate a palette 406 of data to be selected for prompt generation. For example, the palette 406 can include suggested images, suggested music, suggested videos, and/or suggested terms that can be selected. The selection data can then be utilized to engineer a prompt 408 that can be processed with an image generation model 410 to generate a plurality of model-generated images that can be provided for display in a canvas interface 412. One or more model-generated images can be selected. The one or more selected model-generated images can be processed with a search block 414 which can include object recognition, image matching, image embedding, and/or searching. The search block 414 can include feature recognition and search to determine one or more resources that include similar data. In some implementations, the search block 414 can utilize a multitask unified model (Pandu Nayak, "MUM: A new AI milestone for understanding information," GOOGLE: THE KEYWORD (May 18, 2021) https://blog.google/products/search/introducing-mum/.) for semantic and context-based understanding with the search.

The output of the search block 414 can include a plurality of search results, which can include products for sale. The products search results can be provided for display in a shop interface 416 that can allow a user to purchase products associated with products they "imagined" via the image generation model 410 and prompt generation interface.

In some implementations, one or more of the search results can be utilized to edit 422 the palette 406 for future suggestions and prompt generation. Additionally and/or alternatively, the model-generated images displayed in the canvas interface 412 may be interacted with to modify 418 a model-generated image (e.g., make a variation of a depicted object and/or to redo at least a portion of the image). In some implementations, one or more of the model-generated images may be saved 420 to a collection associated with the user.

Figure 5:
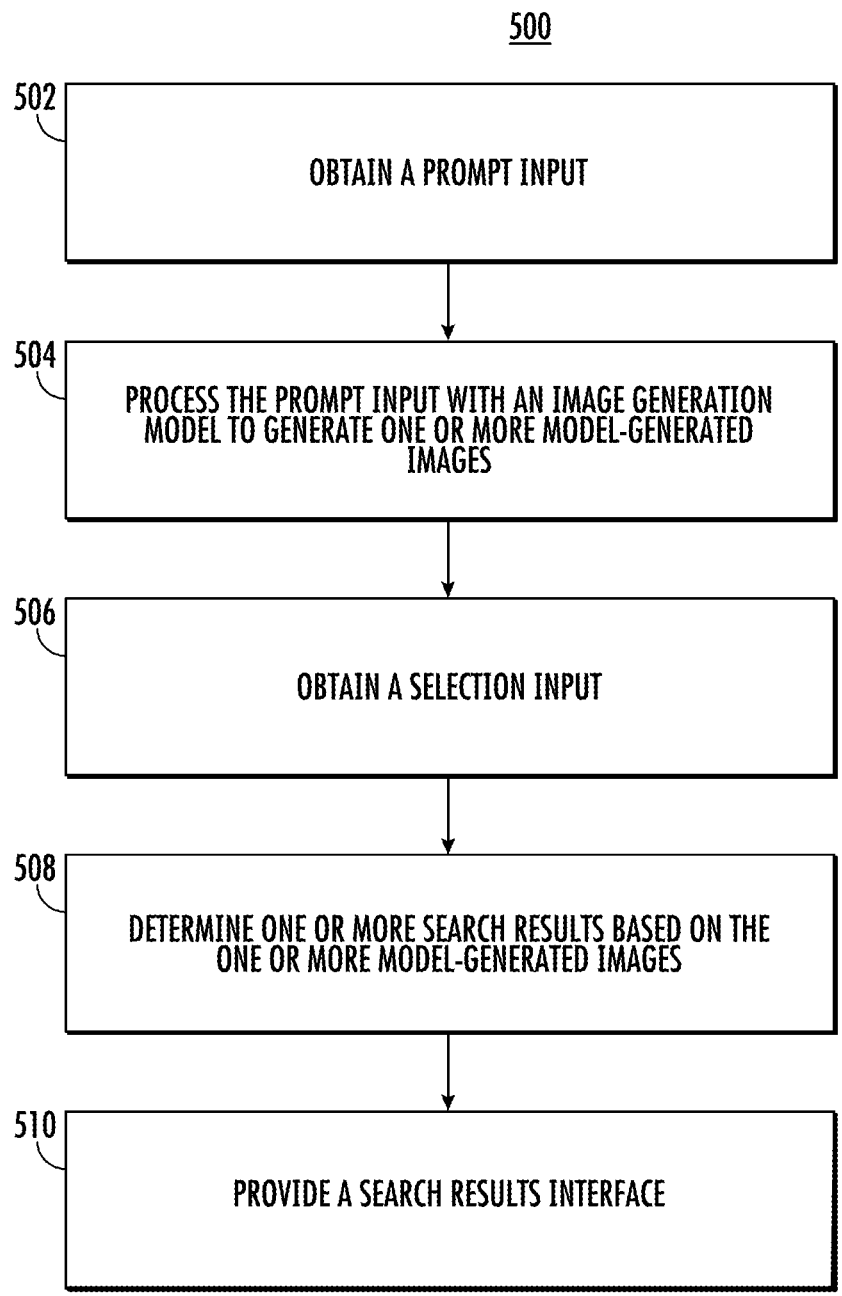
FIG. 5 depicts a flow chart diagram of an example method to perform image generation and search according to example embodiments of the present disclosure.

FIG. 5 depicts a flow chart diagram of an example method to perform according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At 502, a computing system can obtain a prompt input. The prompt input can include one or more terms (e.g., one or more words that can be descriptive of a requested instance interpolation (e.g., "jacket, feathered, brown, regal" to request a view rendering of a brown feathered jacket with a regal aesthetic). In some implementations, the prompt input can include selection data descriptive of one or more selection inputs associated with one or more selectable user-interface elements and/or one or more textual inputs including text input into a text entry box. The prompt input may include one or more terms descriptive of an absence of a particular detail. The one or more terms descriptive of an absence of a particular detail may be associated with a request to generate an image without the particular detail. The particular detail may include an object, a type of material, a color, a style, an attribute, and/or a shape.

In some implementations, obtaining the prompt input can include providing a plurality of selectable user-interface elements for display in graphical user interface. The plurality of selectable user-interface elements can be associated with a plurality of candidate prompt terms (e.g., object types, categories, descriptors for a scene or object, and/or an aesthetic). Selection data can then be obtained. The selection data can be descriptive of a first selectable user-interface element (e.g., a first interactive chip) and a second selectable user-interface element (e.g., a second interactive chip). The first selectable user-interface element can be associated with a first prompt term (e.g., a noun, a verb, an adjective, and/or an adverb associated with a requested concept), and wherein the second selectable user-interface element is associated with a second prompt term (e.g., a noun, a verb, an adjective, and/or an adverb associated with a requested concept). For example, the prompt input can include the first prompt term and the second prompt term associated with the selected first user-interface element and the selected second user-interface element. The prompt terms can be descriptive of a topic (e.g., landscape, amusement park, dress, and/or purse), a quality (e.g., Tron-like, sci-fi, made of plants, a specific video game aesthetic, baroque, cyborg, and/or covered in sequins), and/or an action (e.g., dancing, running, playing football, and/or cheering).

In some implementations, the plurality of selectable user-interface elements can be provided for display in response to obtaining a prompt selection request. The prompt selection request can be descriptive of an input to receive the graphical user interface of selectable user-interface chips. The prompt selection request may be received by a user computing system during the display of an entry point interface that includes a text input box for receiving user input data to generate machine-learned model outputs based on a user provided text prompt. The plurality of candidate prompt terms associated with the plurality of selectable user-interface chips may be predetermined. The first prompt term can be associated with a type of object. The second prompt term can be associated with a particular descriptive feature, and the one or more model-generated images may be descriptive of a particular object of the type of object with the particular descriptive feature.

In some implementations, the prompt input may include a multi-modal prompt input. The multi-modal prompt input can include a prompt image and prompt text. The prompt image can be descriptive of a particular object and/or a particular environment with one or more particular details. In some implementations, the prompt input may be an image search result selected by a user to augment for a refined search. The image search result may be provided with a plurality of other search results in response to obtaining a search query (e.g., a text query, an image query, and/or a multi-modal query). Alternatively and/or additionally, the prompt image may include a user image and/or a previously generated model-generated image. The prompt text can be descriptive of one or more particular details of the prompt image to augment. For example, the prompt text can be descriptive of a request to render the particular object and/or the particular environment without the one or more particular details. The one or more particular details may be replaced with one or more other details and/or replaced with predicted background pixels. In some implementations, the prompt text can be descriptive of a request to include additional details (e.g., additional objects, additional colors, additional shapes, and/or additional materials).

At 504, the computing system can process the prompt input with an image generation model to generate one or more model-generated images. The one or more model-generated images can be generated based at least in part on the one or more terms. The image generation model can be trained on a plurality of training images. The image generation model may be trained on a particular topic and/or a particular object type (e.g., a particular article of clothing). Alternatively and/or additionally, the image generation model can be trained generally. The training may include label training, and the labels can be utilized to determine and/or to generate the selectable user interface elements. For example, a particular label can be associated with a plurality of images (e.g., a "shirt" label can be associated with images for a plurality of different shirts and/or a "furry" label can be associated with a plurality of images associated with a plurality of fur for articles of clothing and/or interiors). The descriptor of the label can then be utilized to generate a selectable user interface element for the descriptor to be utilized as a prompt term. The one or more model-generated images may be descriptive of a generated environment and/or a generated object without the particular detail. For example, the prompt input can include terms descriptive of a request for a particular object (e.g., a dress) without a particular detail (e.g., a ribbon and/or buttons), and the image-generation model can process the prompt input to generate an image of the object without the particular detail (e.g., a dress without ribbons and/or buttons).

In some implementations, the one or more model-generated images can be provided for display with the one or more terms in a graphical user interface. For example, a plurality of model-generated images can be generated and provided for display in an image carousel. The one or more model-generated images can be provided for display for interaction. A user may select a portion of a particular model-generated image to augment. For example, a user may be able to remove features (e.g., remove an object from a scene, remove an accessory, and/or tailor an article of clothing), change features (e.g., change a texture and/or change a color), and/or add features (e.g., add an object, add an ascent, and/or add an accessory) by providing one or more augmentation inputs.

In some multi-modal prompt input implementations, prompt image and the prompt text can be processed with the image generation model to generate a model-generated image. The model-generated image can be descriptive of a model-generated object. The model-generated object can be descriptive of the particular object augmented based on the prompt text. In some implementations, the model-generated image can be descriptive of the particular object without the one or more particular details.

At 506, the computing system can obtain a selection input. The selection input can be descriptive of a selection of the one or more model-generated images. The selection input can be descriptive of a request to query one or more databases for content and/or an item that is similar to the content in and/or an item in the selected model-generated image. The selection input may include one or more selections of one or more portions of the selected model-generated image that are of interest. The one or more portions may be segmented (or cropped) to then be input into a search engine.

At 508, the computing system can determine one or more search results based on the one or more model-generated images. The one or more search results can be associated with one or more objects. In some implementations, the one or more search results can be associated with one or more products. Additionally and/or alternatively, the one or more search results can include one or more action links associated with the one or more products. The one or more action links can be associated with a purchase interface for the one or more products. The one or more search results can be determined based on one or more labels associated with the model-generated image. Alternatively and/or additionally, the model-generated image can be processed with an embedding model to generate an embedding. The embedding can then be utilized to determine similar embeddings, which can be associated with the one or more search results. The one or more prompt terms may be utilized to determine the one or more search results. For example, the one or more search results can be obtained by generating a combined query with the prompt terms and the model-generated image.

In some implementations, determining the one or more search results based on the one or more model-generated images can include providing the one or more model-generated images to a search engine and receiving the one or more search results from the search engine. The search engine can be a general search engine and/or may be a database-specific search engine (e.g., a shopping search engine).

At 510, the computing system can provide a search results interface. The search results interface may include the one or more search results provided for display. The search results interface can be a search results page. The search results interface can include a list of search results, an augmented-reality try-on interface, and/or a viewport for viewing previews of resources associated with one or more search results.

Figure 6B:
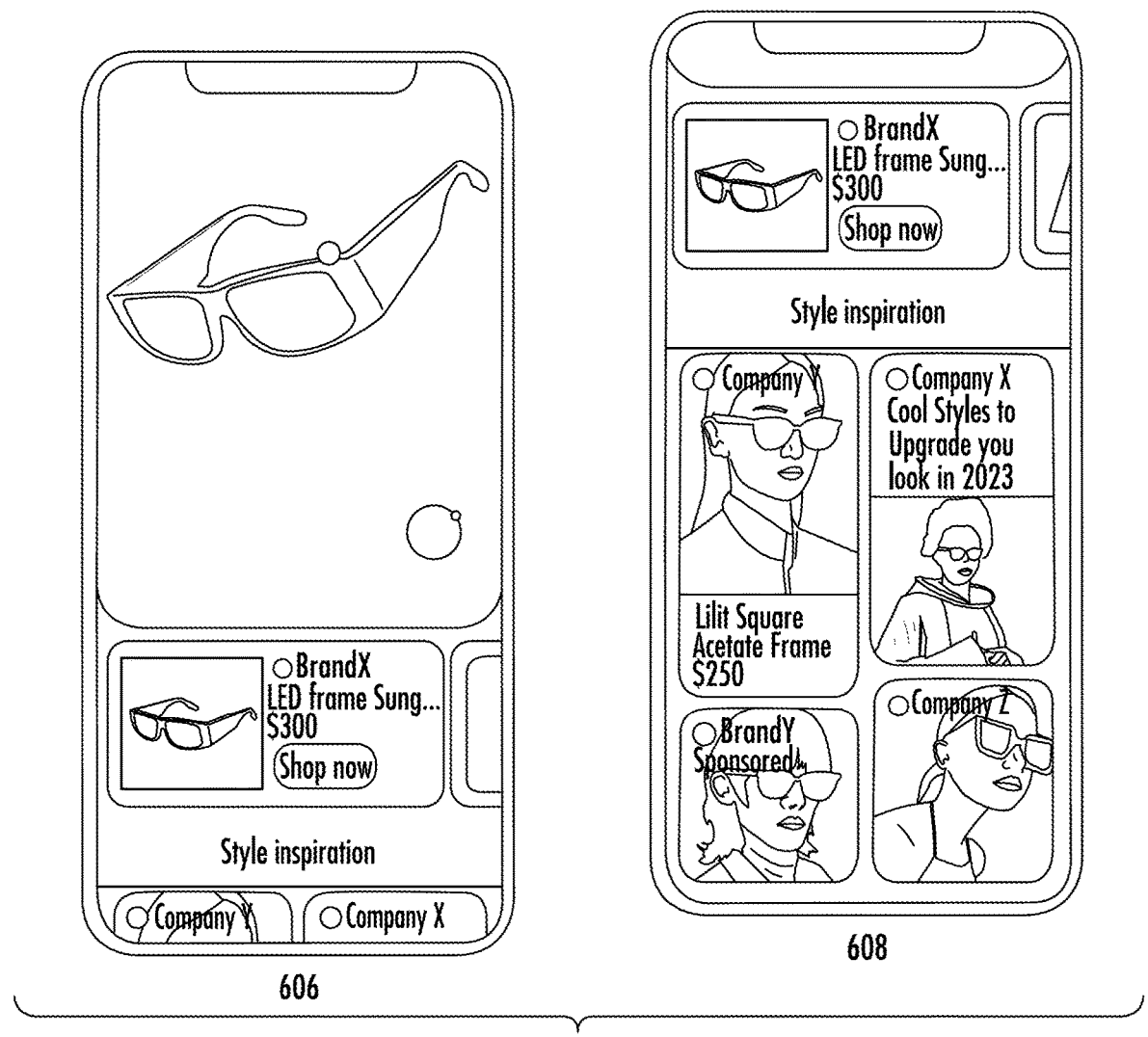

FIGS. 6A-6C depict illustrations of an example viewfinder entry point according to example embodiments of the present disclosure. For example, a user can capture an image 602 (e.g., an image of an individual with a plurality of clothing items) for search (e.g., as shown in FIG. 6A). The viewfinder interface can identify a plurality of objects in the captured image. The viewfinder interface can then provide the image with a plurality of indicators 604 associated with the plurality of recognized objects.

In FIG. 6B, the indicator associated with a recognized sunglasses may have been selected. The selection can be obtained, and the selected object can be segmented and displayed with one or more search results 606 determined to be associated with a product similar to the depicted sunglasses. The user may then scroll to view more search results. The scroll input can be received, and the additional search results 608 can be provided for display.

In FIG. 6C, the indicator associated with a recognized coat may have been selected. The selection can be obtained, and the selected object can be segmented and displayed with one or more search results 610 determined to be associated with a product similar to the depicted coat. The user may then scroll to view more search results. The scroll input can be received, and the additional search results 612 can be provided for display. The additional search results 612 may be provided for display with an entry point for utilizing an image generation model to generate an "imagined" article of clothing.

Figure 7A:
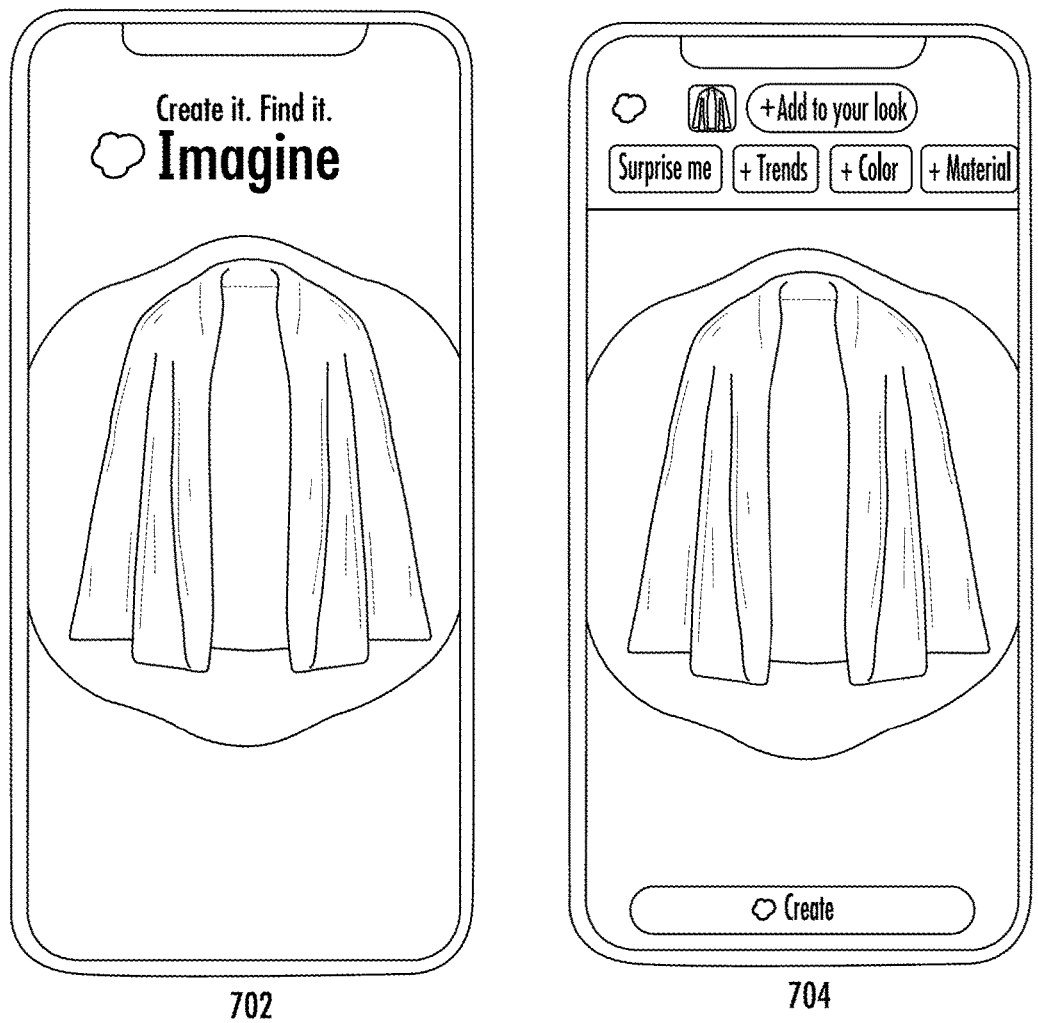

FIGS. 7A-7D depict illustrations of an example image generation and search interface according to example embodiments of the present disclosure. The image generation and search interface may include obtaining a selection of an initial object type to utilize as a starting point. The template object type can then be provided for display (e.g., 702 as shown in FIG. 7A). The image generation and search interface can then provide an initial set of options 704 for prompt generation (e.g., a surprise me option (e.g., for randomized prompt generation), a trends option (e.g., view and select trends for prompt generation), a color option (e.g., to select a color for prompt generation), and/or a materials option (e.g., to select a material for prompt generation)).

In some implementations, a user can provide a prompt that includes a request for the deletion, absence, and/or replacement of one or more elements (e.g., one or more materials, one or more colors, one or more details, and/or one or more attributes). For example, the image generation and search interface can include one or more user interface elements for receiving inputs to generate a prompt to request an absence of an element. The generated model-generated image may then be generated to be descriptive of a particular object that does not include the element requested to be absent. The absence request may be associated with augmenting a current image (e.g., a captured image, a downloaded image, and/or a previously generated model-generated image) and/or may be provided with prompt inputs descriptive of the inclusion of objects and/or details to include with the absence.

Figure 7B:
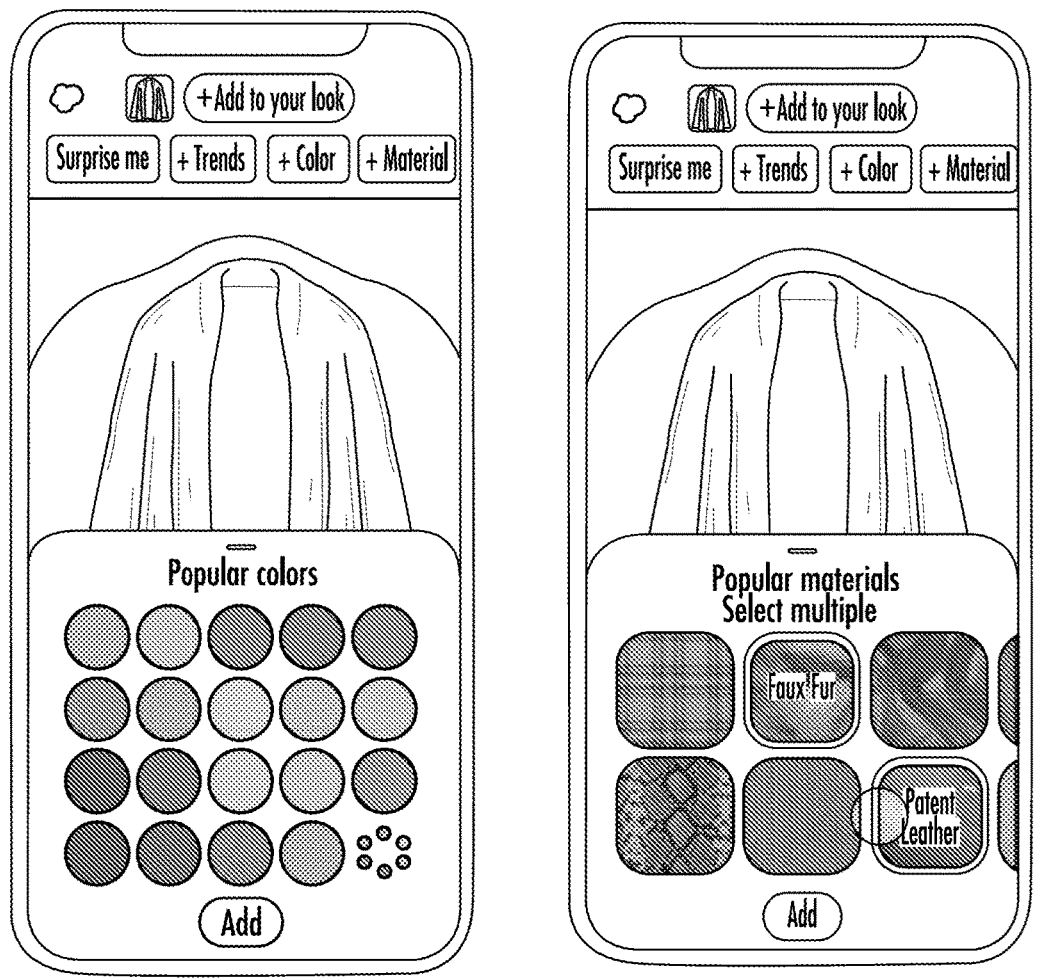

In FIG. 7B, a color palette 706 and a materials palette 708 are provided for display. The user can then select one or more colors and/or one or more materials to be utilized in prompt generation to be provided to an image generation model to "imagine" a product based on the request. In particular, the user selected a light green user interface element from the color palette 706 and two materials (e.g., faux fur and patent leather) from the materials palette 708.

An "imagining" buffering representation 710 can be provided for display as the prompt input is processed (e.g., as shown in FIG. 7C). The model-generated image 712 can then be provided for display. The user can then modify the model-generated image, redo the prompt generation, save the model-generated image, and/or share the model-generated image.

In some implementations, the image generation and search interface may provide the model-generated image in a creations collection 714 with previously generated images (e.g., as shown in FIG. 7D). The model-generated image can then be searched to determine products similar to the depicted object. Links to the resources associated with the one or more search results can then be provided for display in a shop panel 716.

Figure 8A:
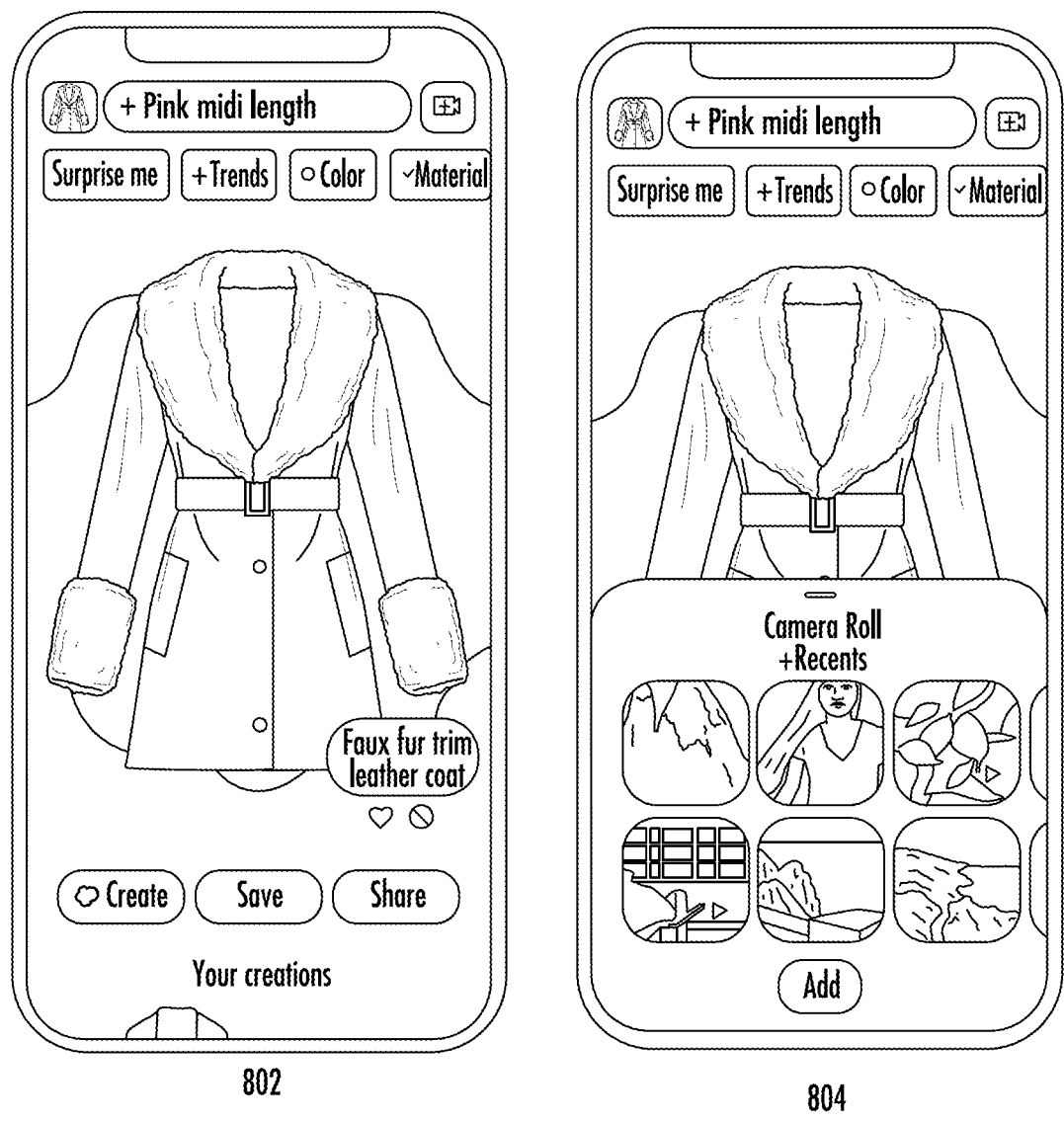
Figure 8B:
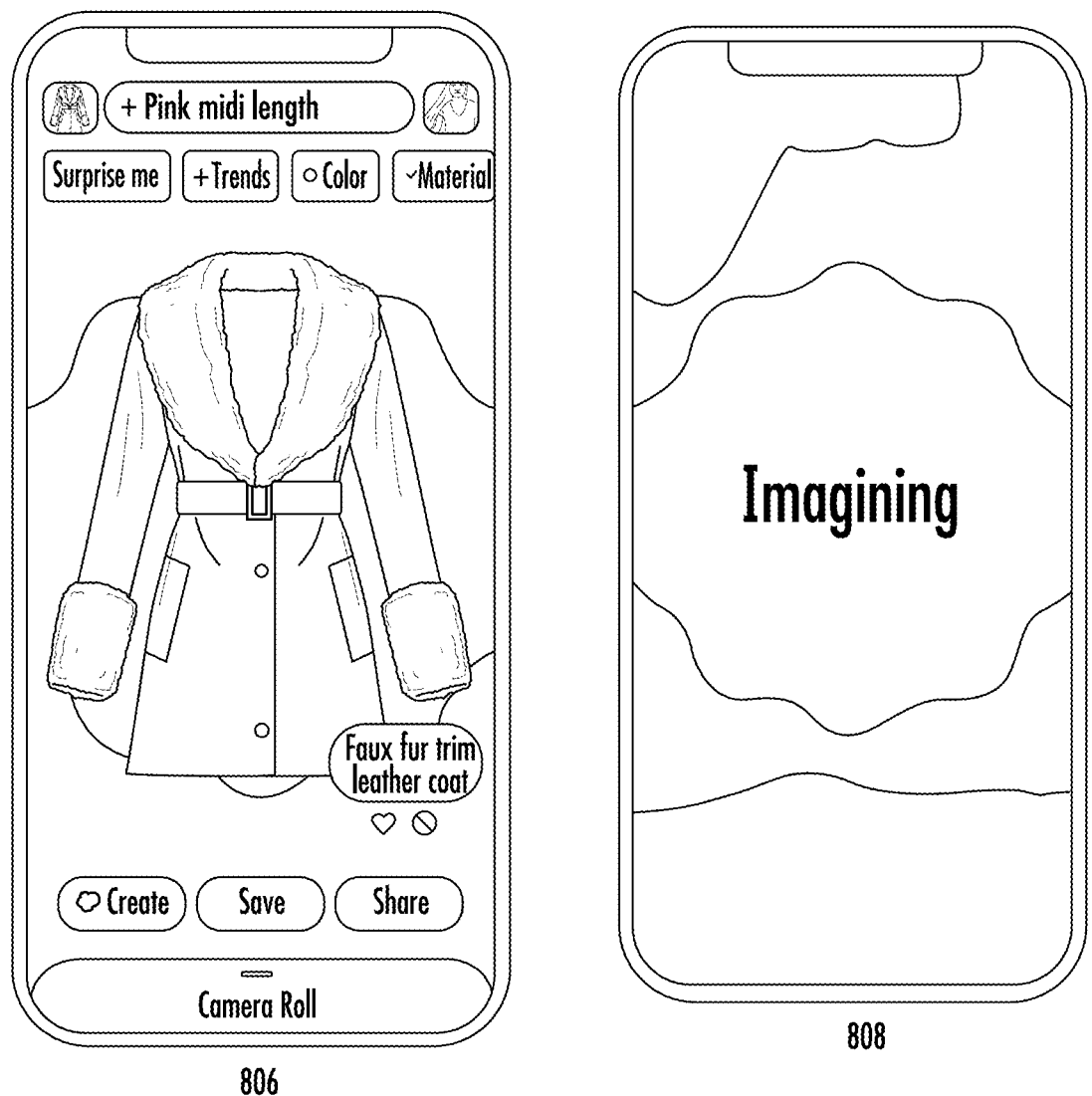

FIGS. 8A-8C depict illustrations of an example refined image generation and search interface according to example embodiments of the present disclosure. For example, the model-generated image including the article of clothing of FIGS. 7A-7D can be modified. In FIG. 8A, the model-generated image 802 is provided for display, and a camera roll pop-up 804 is provided for display in response to a selection of a camera icon.

In FIG. 8B, an image has been selected and provided for display in the interface (e.g., as shown in 806), and the imagining buffer screen 808 is provided for display in response to an input descriptive of a request to reimagine the article of clothing based on the contents of the selected image.

In FIG. 8C, a first updated model-generated image 810 and a second updated model-generated image 812 can be generated and provided for display. The first updated model-generated image 810 can include an updated article of clothing based on the colors of the selected image with an individual replicating a movement of the selected image (e.g., the selected image can be a GIF with a dancing movement). The second updated model-generated image 812 can include an updated article of clothing without an individual. The updated model-generated images can be displayed together in a creations pane 814.

FIGS. 9A-9E depict illustrations of example search interface entry points according to example embodiments of the present disclosure.

Figure 9A:
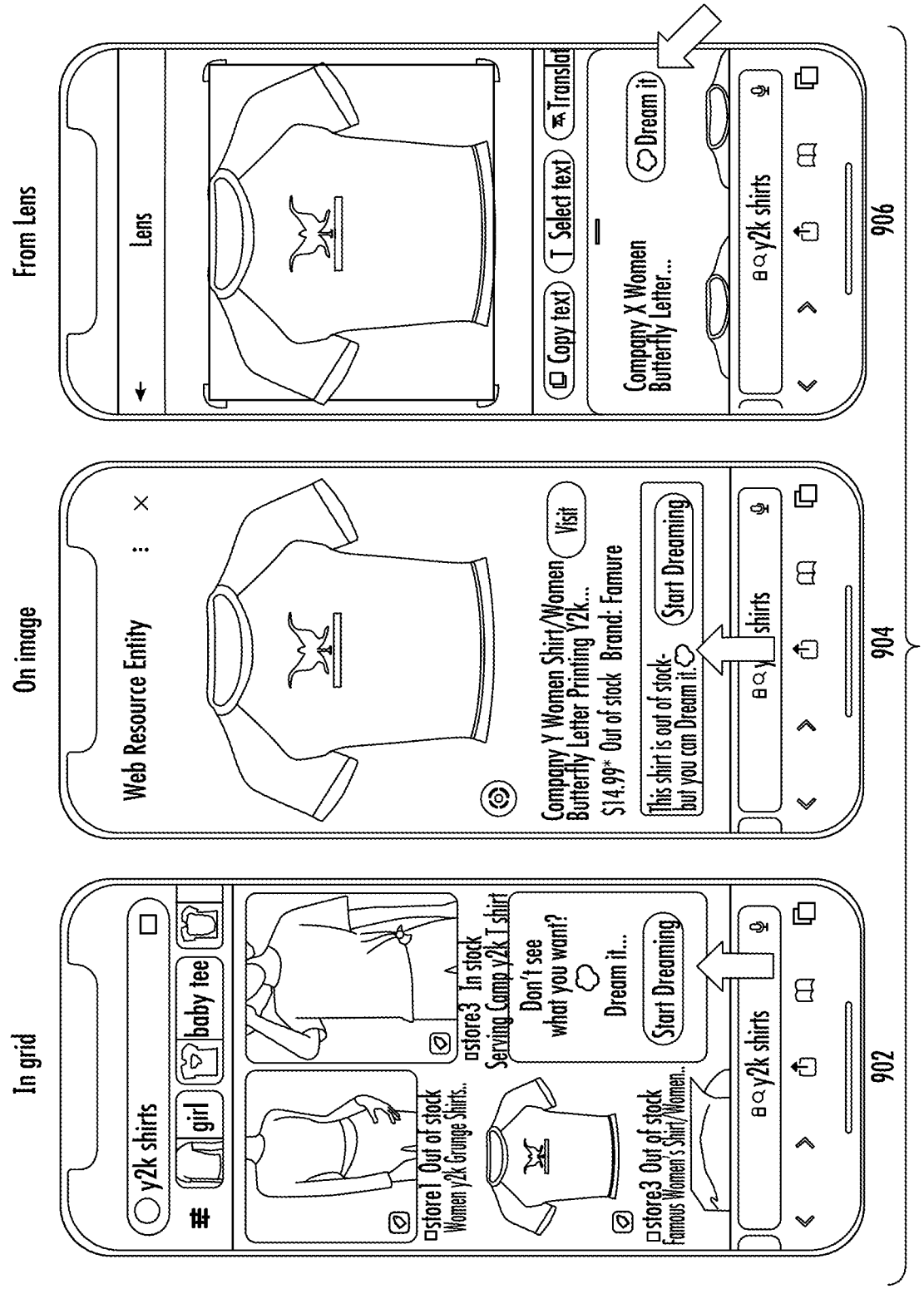

In particular, FIG. 9A includes a plurality of entry points in search interfaces. For example, a "start dreaming" tile can be provided for display adjacent to image search results in a grid 902. A "start dreaming" chip may be provided for display below an image search result in an enlarged image viewer 904. Additionally and/or alternatively, a "dream it" chip interface element can be provided in a search results pane of an image recognition interface 906. The "start dreaming" tile, the "start dreaming" chip, and/or the "dream it" chip interface element can be interacted with to begin the prompt generation and image generation process.

Figure 9B:
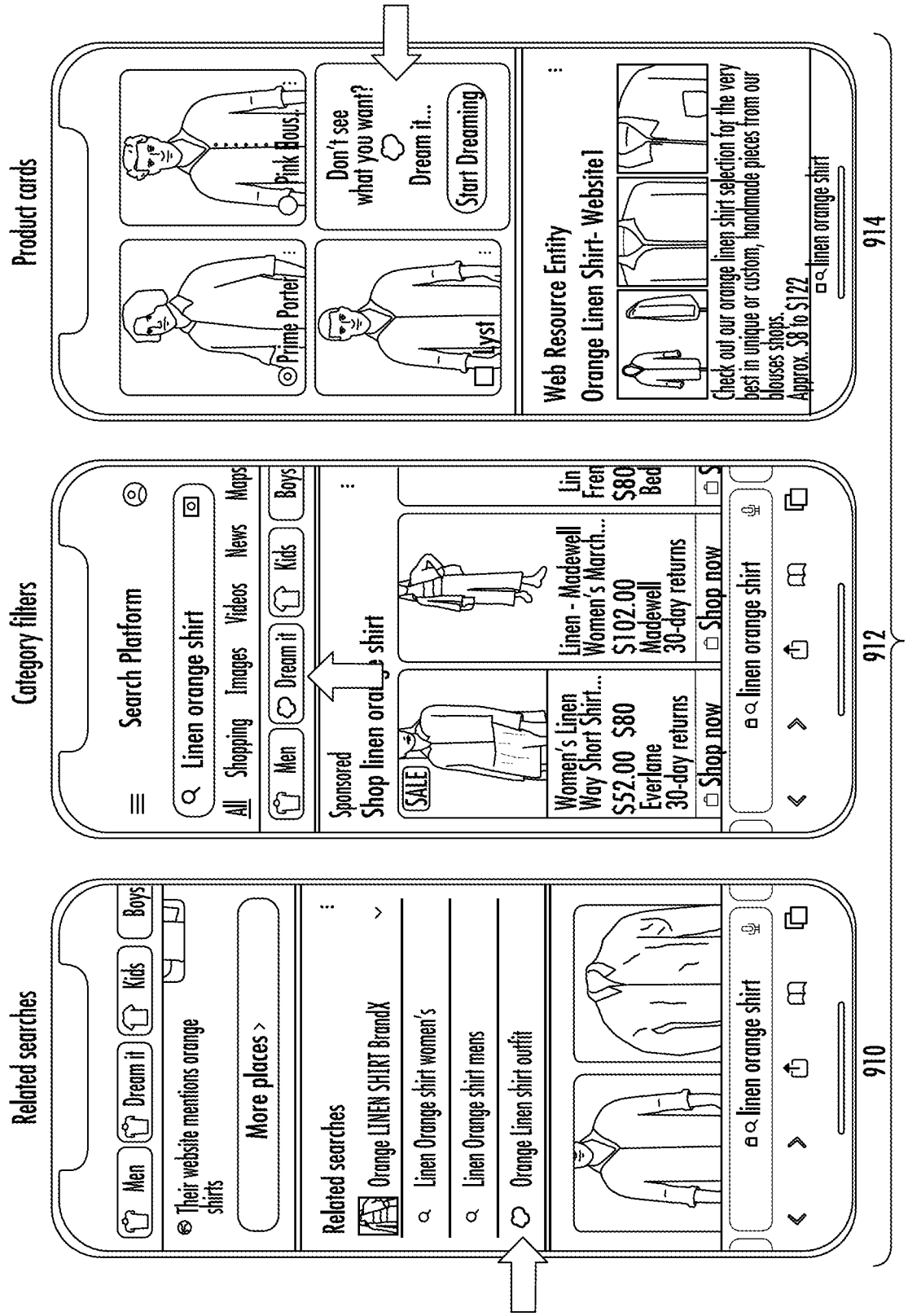

FIG. 9B depicts example entry points for prompt generation and image generation displayed in general search results pages. For example, the entry point interface element can be provided in a related searches section 910, in a refined search tile carousel 912, and/or in a tile of an image search results panel 914.

Figure 9C:
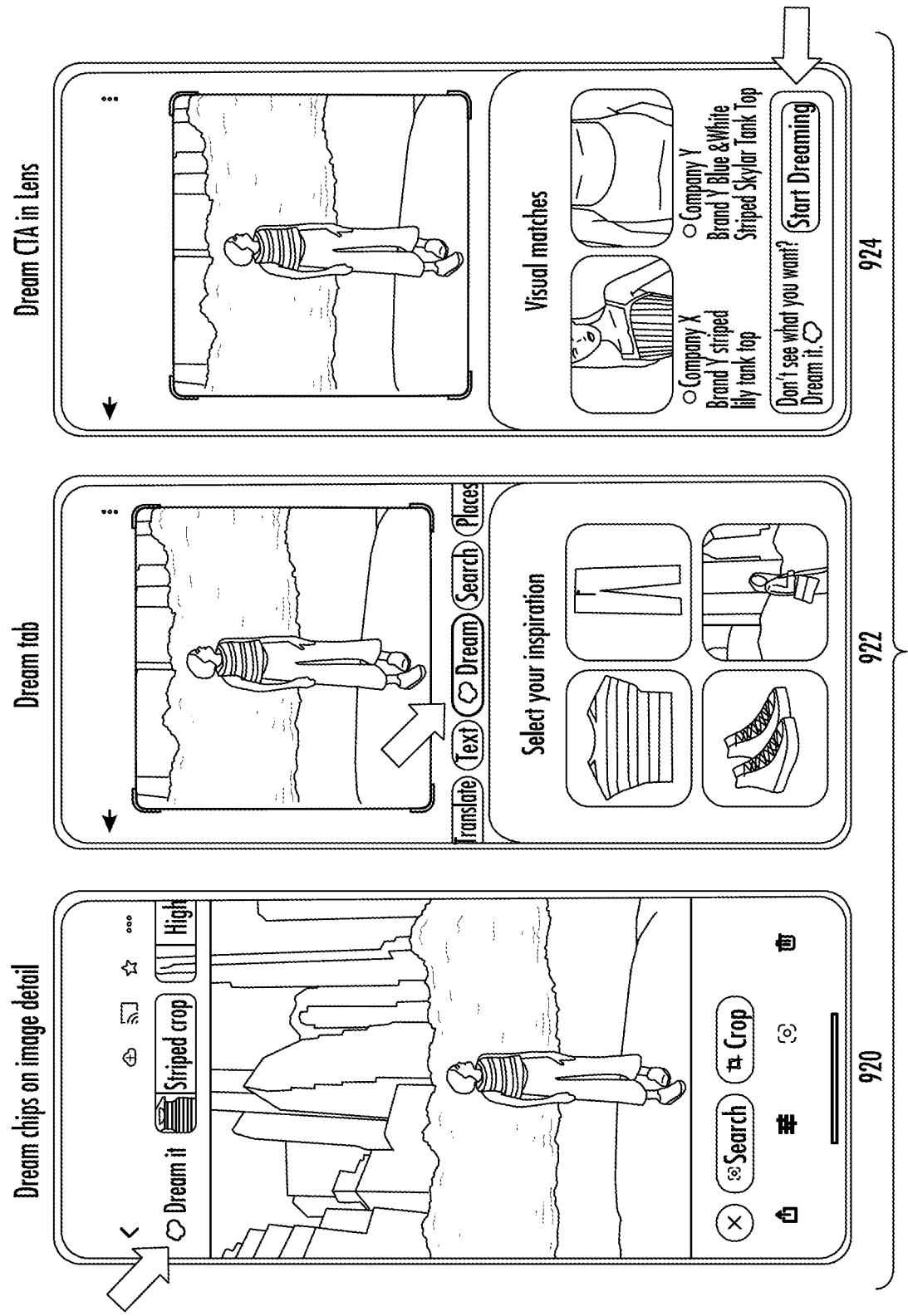

FIG. 9C depicts example entry points for prompt generation and image generation displayed in viewfinder and recognition application. For example, the entry point interface element can be provided in a chips carousel adjacent to recognized object chips 920, in a category functions tab carousel 922, and/or in a search results pop-up 924.

Figure 9D:
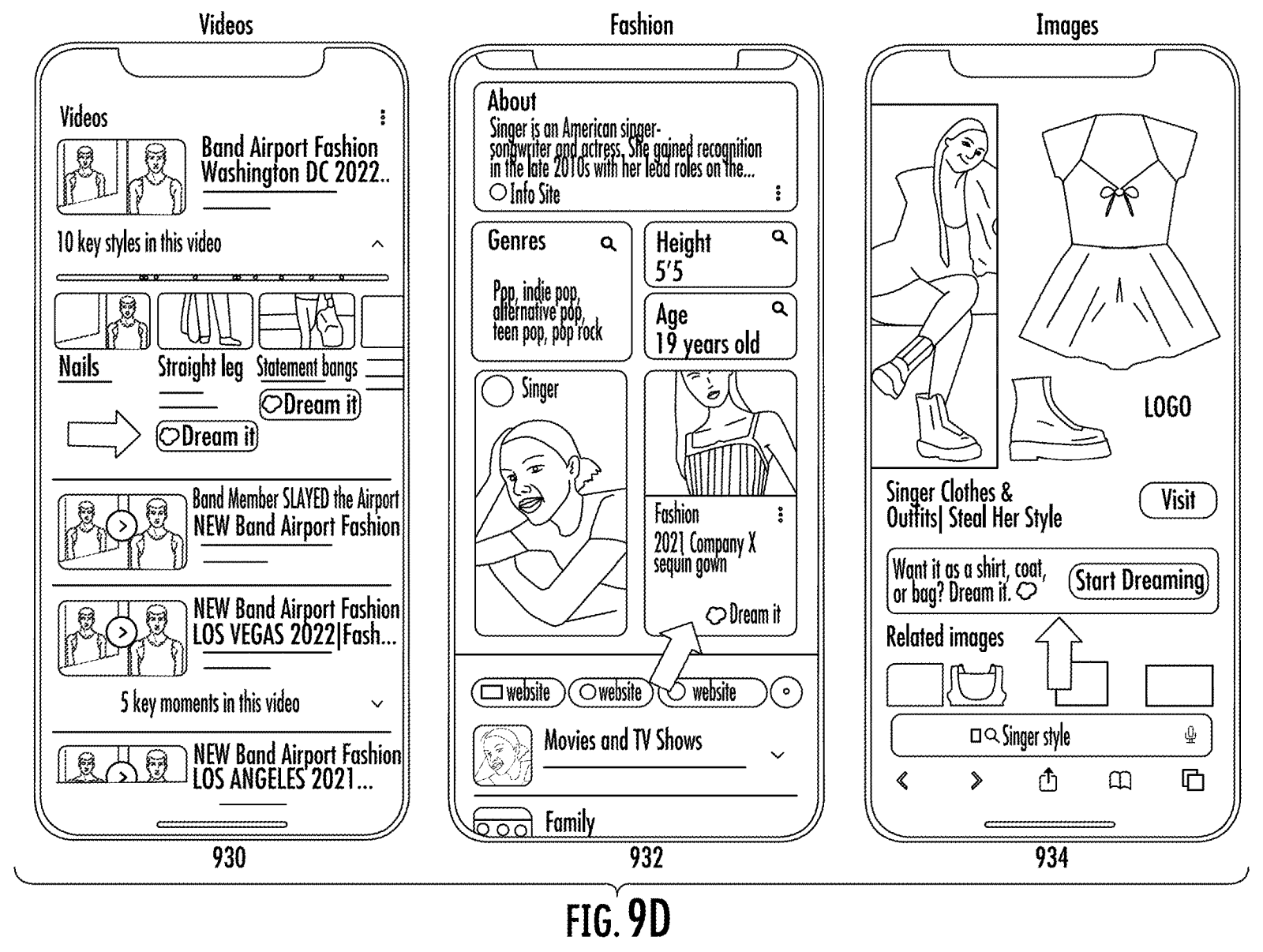

FIG. 9D depicts example entry points for prompt generation and image generation displayed in varying search result types. For example, in a video search results page 930, the entry point interface element may be provided below segment identifiers of a video search result. In a fashion search results page 932, the entry point interface element can be provided with a specific search result to utilize the specific search result in the prompt generation. Additionally and/or alternatively, in an image search results page 934, the entry point interface element can be provided with a specific search result to utilize the specific search result in the prompt generation.

FIG. 9E depicts example entry points for prompt generation and image generation displayed in a video player application. The entry point interface element can be provided below a playing video with a randomized model-generated image 940, below a search result based on a recognized object in the video 942, and/or in a chip carousel adjacent to recognized object chips 944.

Figure 10:
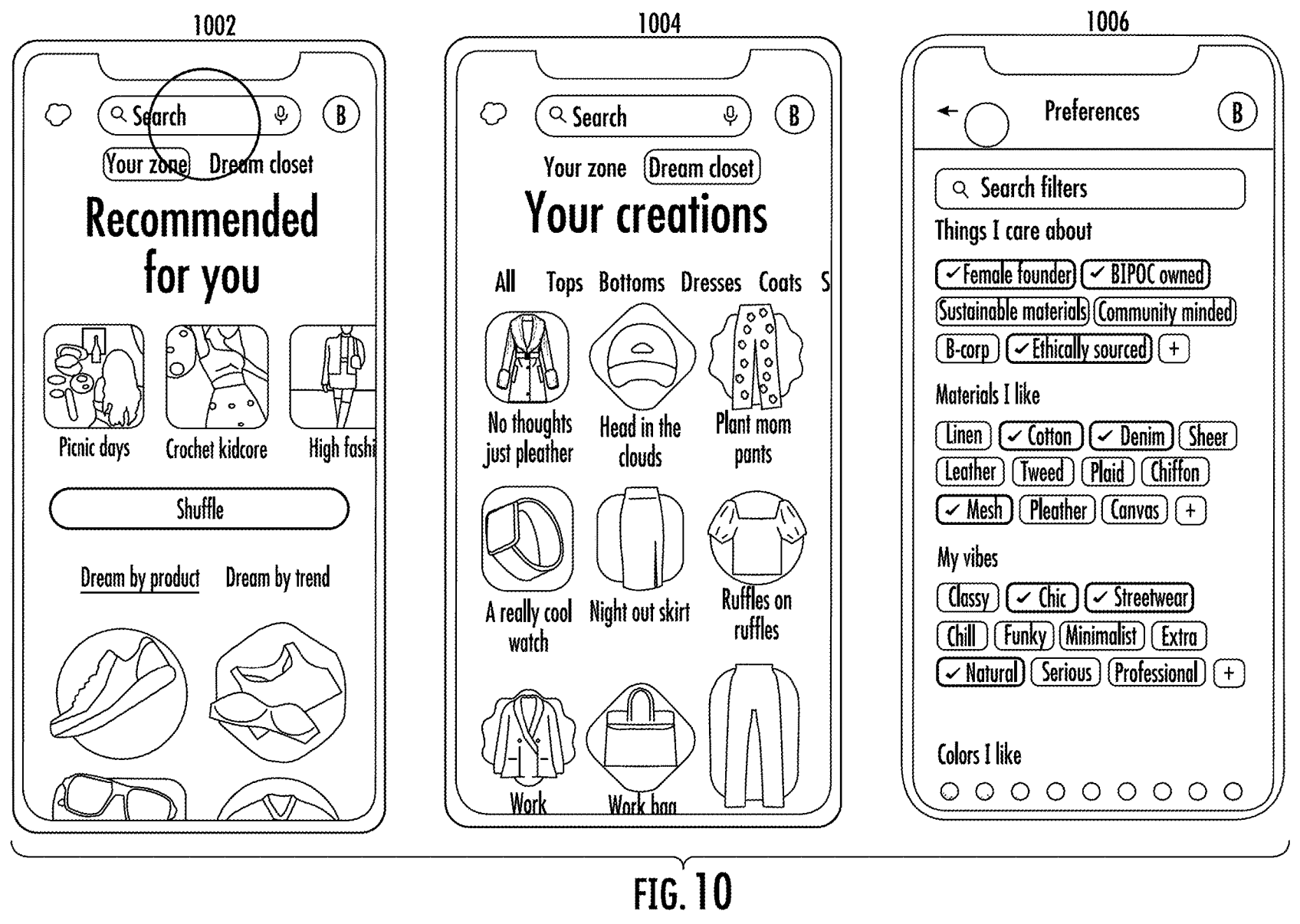

FIG. 10 depicts an illustration of an example user collection interface according to example embodiments of the present disclosure. For example, the user collection interface can provide a landing experience that provides various inspiration bucket and personalization methods. In particular, a "recommended for you" panel 1002 can be provided in the interface that may be determined based on previous creations, based on preferences, and/or based on historical data (e.g., purchase history, search history, and/or browsing history). The user collection interface can include a dream closet 1004 that displays a plurality of previous model-generated datasets. The user may interact with a preferences interface 1006 to select varying preferences that can be utilized for further "recommended for you" suggestions, which can include automated prompt generation and processing for automatically generated model-generated datasets.

Figure 11A:
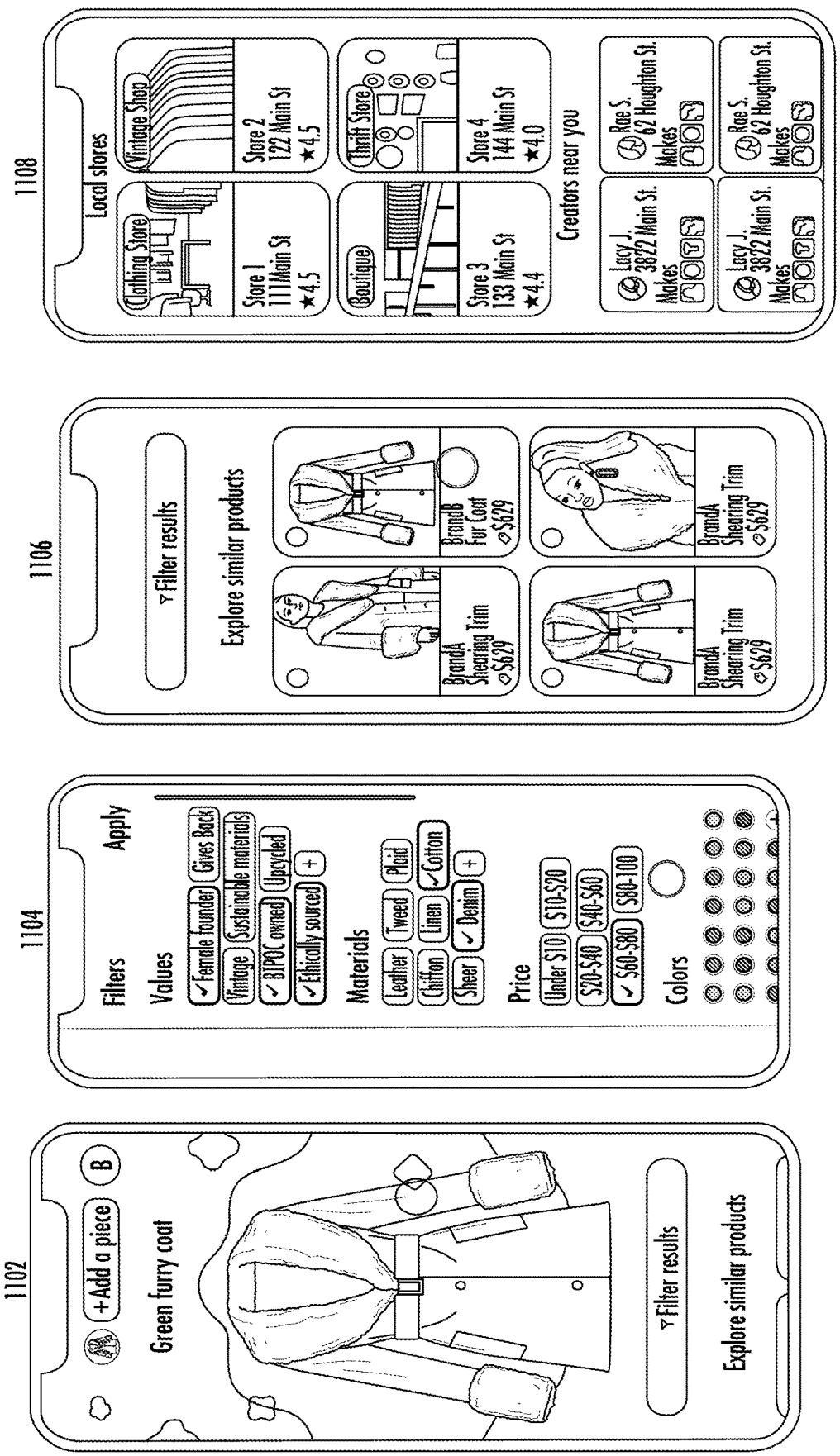
FIGS. 11A-11B depict illustrations of example image search system according to example embodiments of the present disclosure.
Figure 11B:
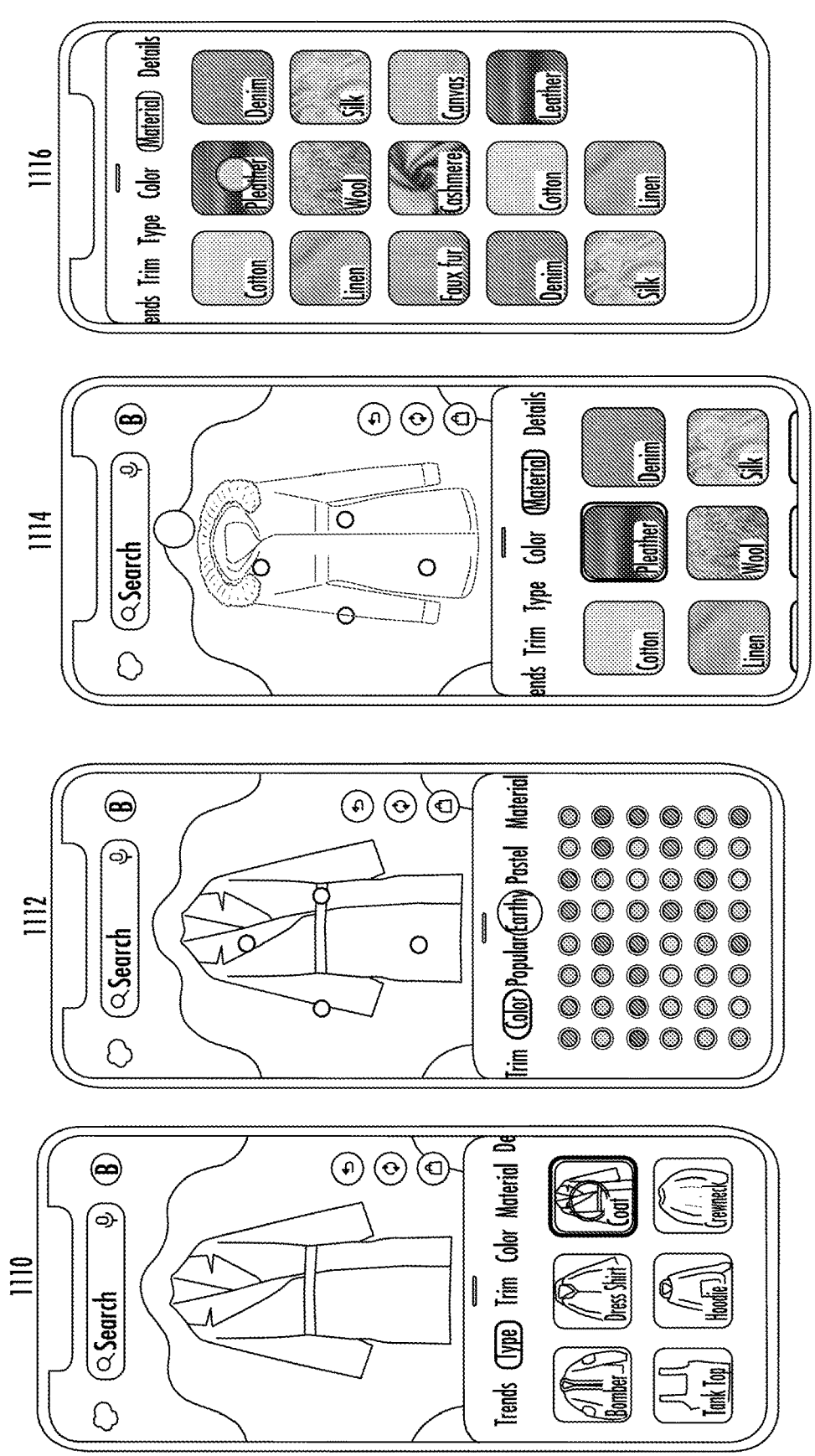

FIGS. 11A-11B depict illustrations of example image search system according to example embodiments of the present disclosure.

In FIG. 11A, an example image search system can include displaying a model-generated image 1102, and a user can open a refined search parameters interface 1104, which can allow a user to select various search refinement parameters (e.g., a brand, a source of manufacturing, a price range, a location, and/or quality). The search results can then be determined and provided for display. For example, product search results 1106 may be provided with an image, one or more descriptors, and/or a link. Location search results 1108 can be provided for display to provide locations in which similar products can be purchased. The location search results 1108 can be provided with an image, one or more descriptors, an address, a rating, and/or a link.

In FIG. 11B, an article of clothing is "imagined" to be utilized for searching. A particular article of clothing can be selected (e.g., a jacket can be selected). A customization interface can then be provided. The customization interface can include a trends tab, a type tab 1110, a color tab 1112, a material tab 1114, and/or a details tab. An updated rendering preview can be provided in response to each selection. The trends tab can include trending styles provided for display. The type tab 1110 can provide selectable options for different types of jackets. The color tab 1112 can provide selectable options for different colors to apply to the jacket, which may include color sub-tabs (e.g., earthy, popular, and/or pastel). The material tab 1114 can provide selectable options for different materials to apply to the jacket (e.g., linen, wool, satin, cotton, and/or polyester). A user may pull-up on the pop-up to enlarge the pop-up 1116. The user can perform their various selections that can then be processed to generate a model-generated image that can then be searched (e.g., similar to FIG. 11A).

Figure 12:
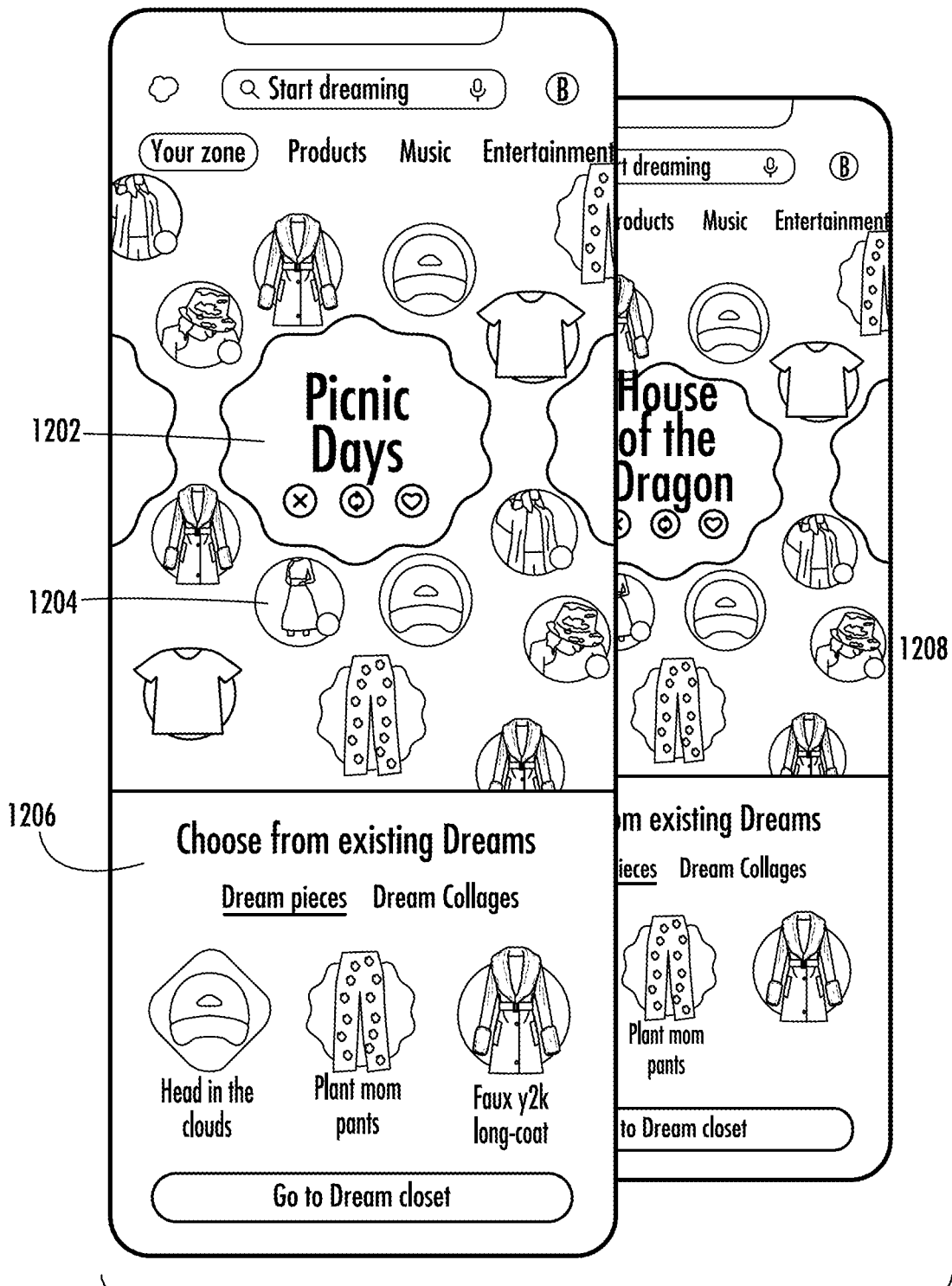
FIG. 12 depicts an illustration of an example collections interface according to example embodiments of the present disclosure.

FIG. 12 depicts an illustration of an example collections interface according to example embodiments of the present disclosure. In particular, a user may generate and label collections. For example, a user can generate a "Picnic Days" collection, which can include a title label 1202, a plurality of saved images 1204 (e.g., a plurality of model-generated images), and a panel for selecting additional datasets (e.g., suggested model-generated datasets) to add to the collection. In some implementations, a collection may be automatically generated. For example, a collection associated with a determined liked content item can be generated 1208.

Figure 13:
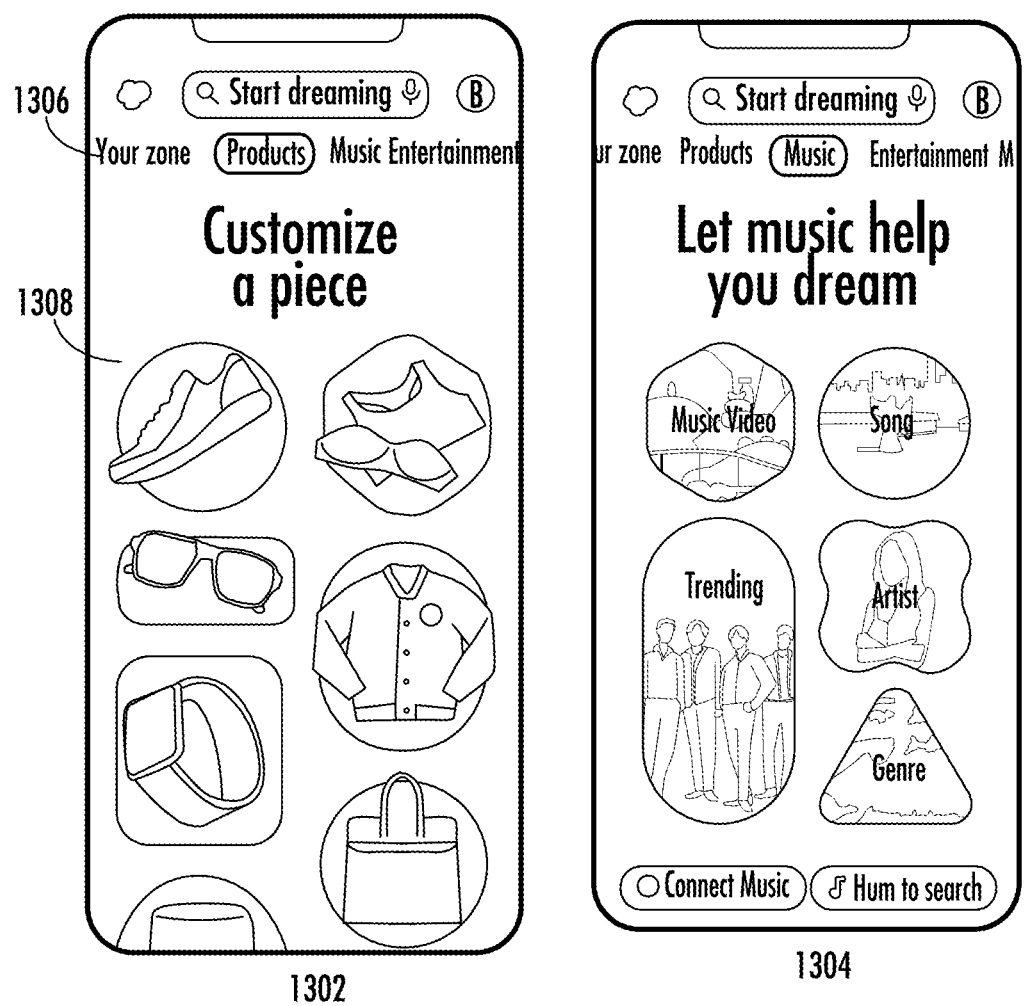
FIG. 13 depicts an illustration of an example collections interface according to example embodiments of the present disclosure.

FIG. 13 depicts an illustration of an example collections interface according to example embodiments of the present disclosure. A collections interface can include a plurality of tabs 1306 (e.g., a "your zone" tab, a products tab 1302, a music tab 1304, and/or an entertainment tab). The products tab 1302 can include a plurality of products 1308 (e.g., suggested products and/or products associated with one or more model-generated datasets) to customize, which can include generating a new model-generated product and/or can include modifying an existing model-generated product. The music tab 1304 can include suggested music and/or saved music. The suggested music and/or the saved music may be discovered based on generating audio data with a dataset generation model that processed a prompt input. The generated audio data may have been searched to determine music similar to the generated audio data.

Figure 14:
FIG. 14 depicts an illustration of an example collections interface according to example embodiments of the present disclosure.

FIG. 14 depicts an illustration of an example collections interface according to example embodiments of the present disclosure. The collections interface can include an entertainment tab 1402, which can include saved entertainment collections and/or suggested entertainment collections. A user can scroll through the entertainment tab to a lower portion 1404, which may include social media platform specific collections and/or show specific collections 1406.

Figure 15:
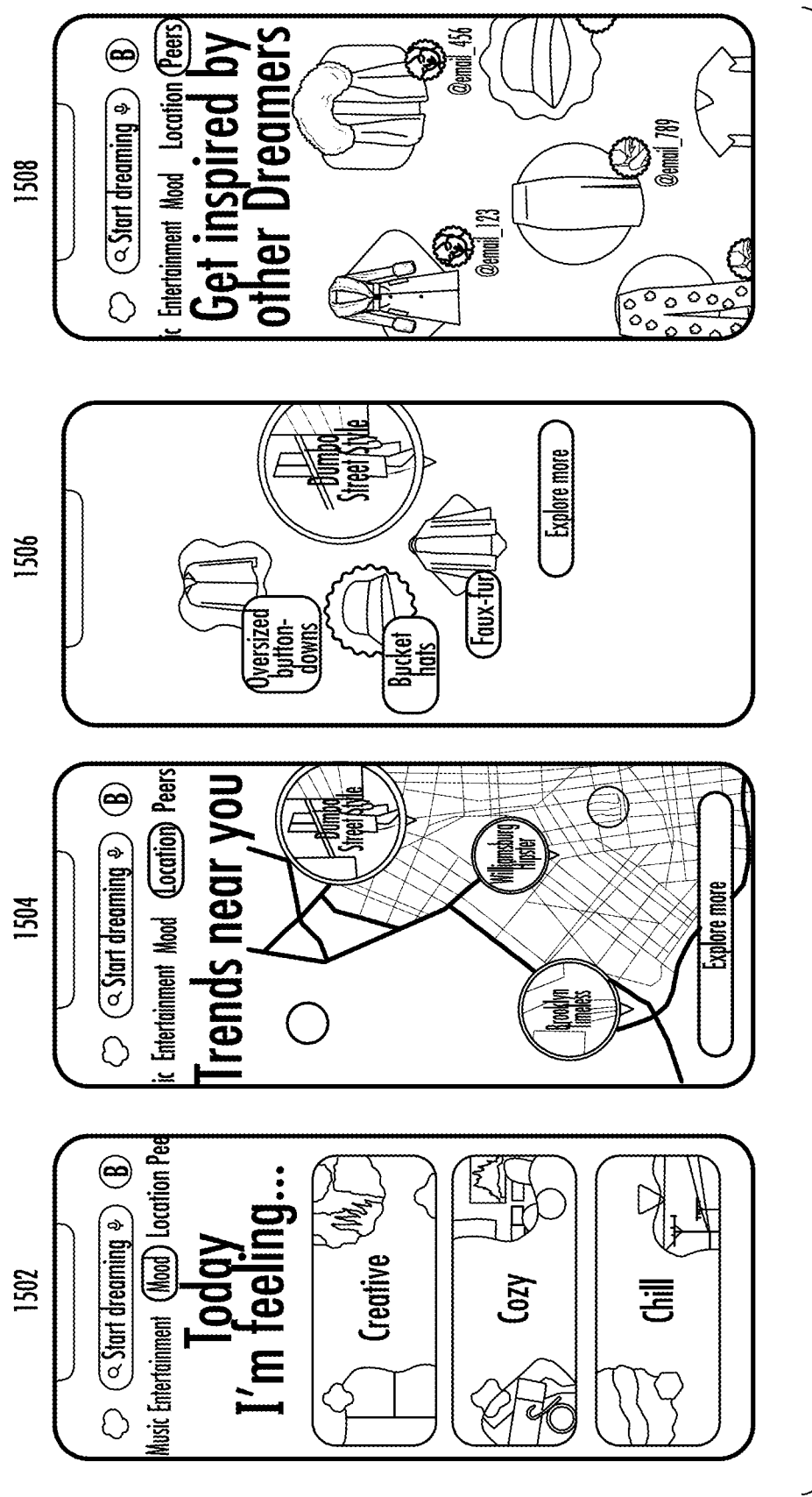
FIG. 15 depicts illustrations of example suggestion interfaces according to example embodiments of the present disclosure.

FIG. 15 depicts illustrations of example suggestion interfaces according to example embodiments of the present disclosure. In particular, in 1502, a mood tab is provided for display in which a user can receive suggestions based on a mood, which can include "creative," "cozy," and "chill." The suggestions may be tailored based on user data and the selected mood. In 1504, a location tab is provided for display with a plurality of indicators associated with different locations, which can include an initial aesthetic image associated with the location. At 1506, a user may have selected the dumbo street style indicator, and a plurality of suggested clothing items are provided for display. The suggested clothing items can be model-generated images of articles of clothing that are based on the aesthetic and/or clothing style of the location with one or more user-specific preferences, which may be manually input preferences and/or machine-learned preferences based on a user's purchases, closet, browsing history, and/or search history. At 1508, a peers tab is provided for display, which can include products, objects, and/or model-generated images that a "peer" (e.g., a social media friend and/or a person with similar profile data (e.g., similar location, similar clothing taste, and/or similar hobbies) has added to their specific virtual collection).

Figure 16A:
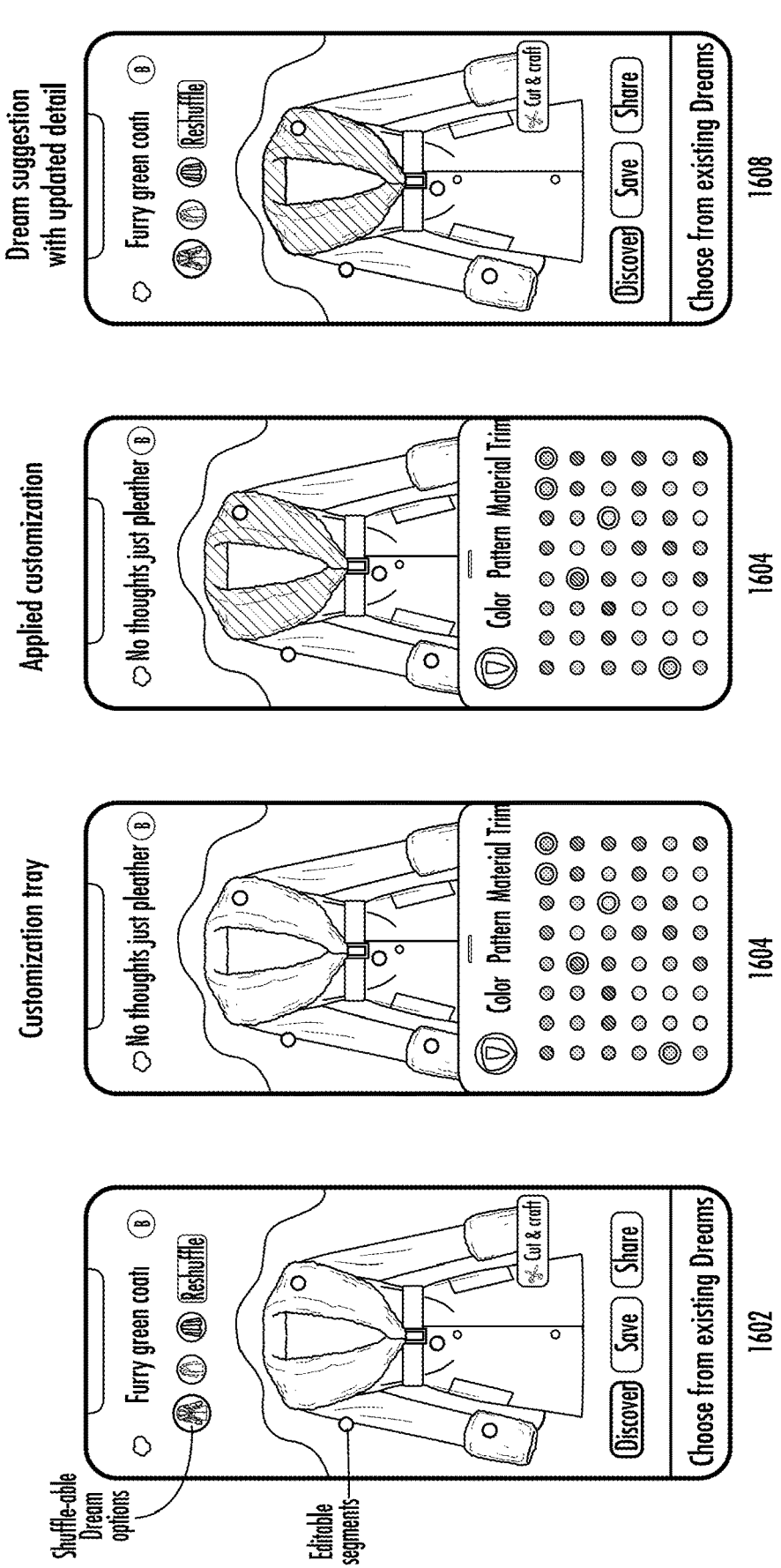
FIGS. 16A-16B depict illustrations of example modification interfaces according to example embodiments of the present disclosure.
Figure 16B:
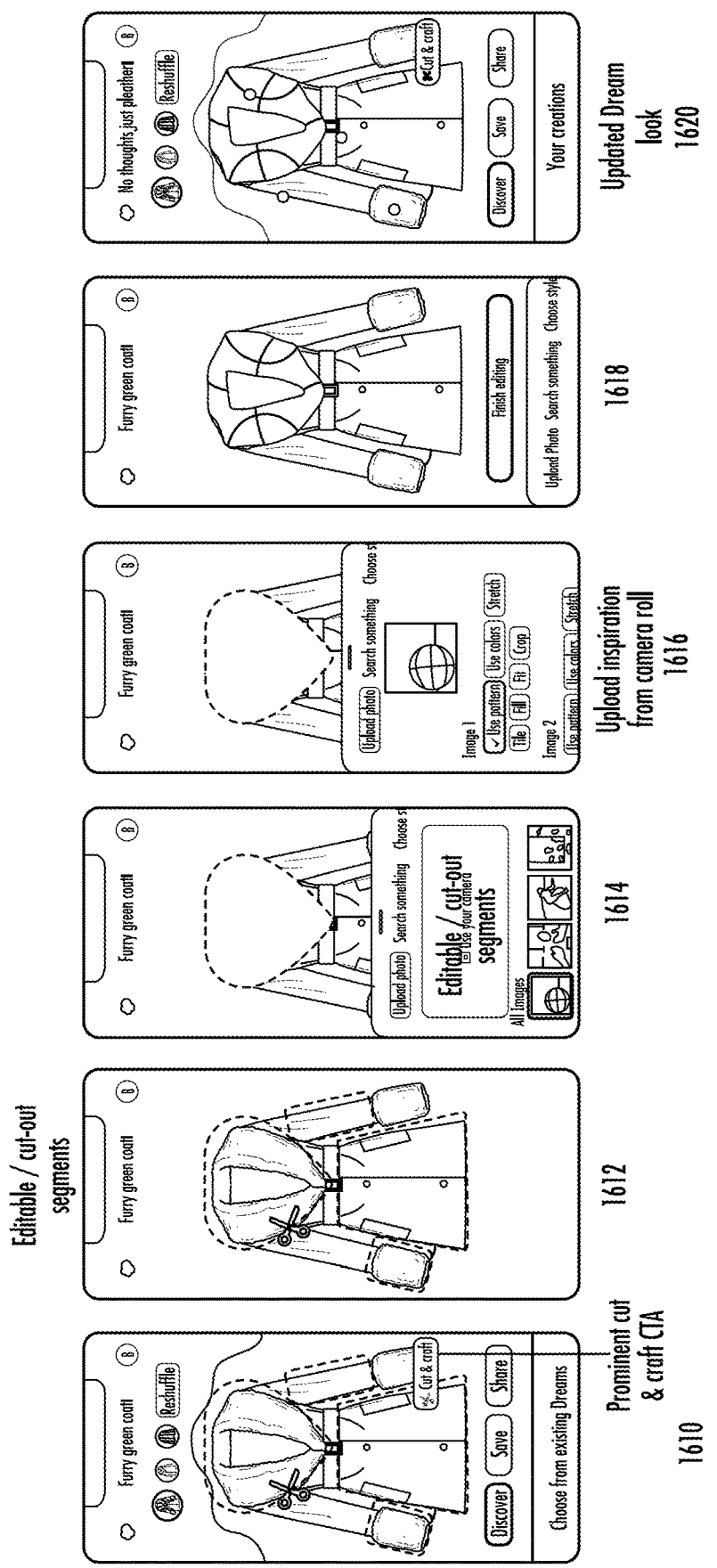

FIGS. 16A-16B depict illustrations of example modification interfaces according to example embodiments of the present disclosure. In particular, a user can modify a model-generated image after generation of the image. For example, FIG. 16A depicts a collar modification of a model-generated dress. The user can select a modification element, which can provide a plurality of options for display, which can include indicators for different portions of the jacket that can be modified. In 1602, a collar, a cuff, and a mid-section are indicated as being customizable. At 1604, the collar has been selected, and a color palette is provided for display. At 1606, a new color for the color has been selected and has been applied to the model-generated image rendering. At 1606, the full updated image of the jacket is provided for display.

FIG. 16B depicts a collar modification of a model-generated dress in which the color is augmented based on a design in an image. In 1610, a collar, a cuff, and a mid-section are indicated as being customizable. At 1612, the user has selected a cut and craft interface element, and the modification interface is updated to indicate portions of the jacket that can be cut. At 1614, the collar has been cut, and the user is provided with the options to select a pre-existing image and/or to upload a new image via image capture. At 1616, an image with a basketball is selected, and additional customization options are provided for display. At 1618, a modification preview is provided for display that depicts the basketball print on the collar of the jacket. At 1620, the modification is finalized, and the modified jacket can be added to a collection.

Figure 17B:
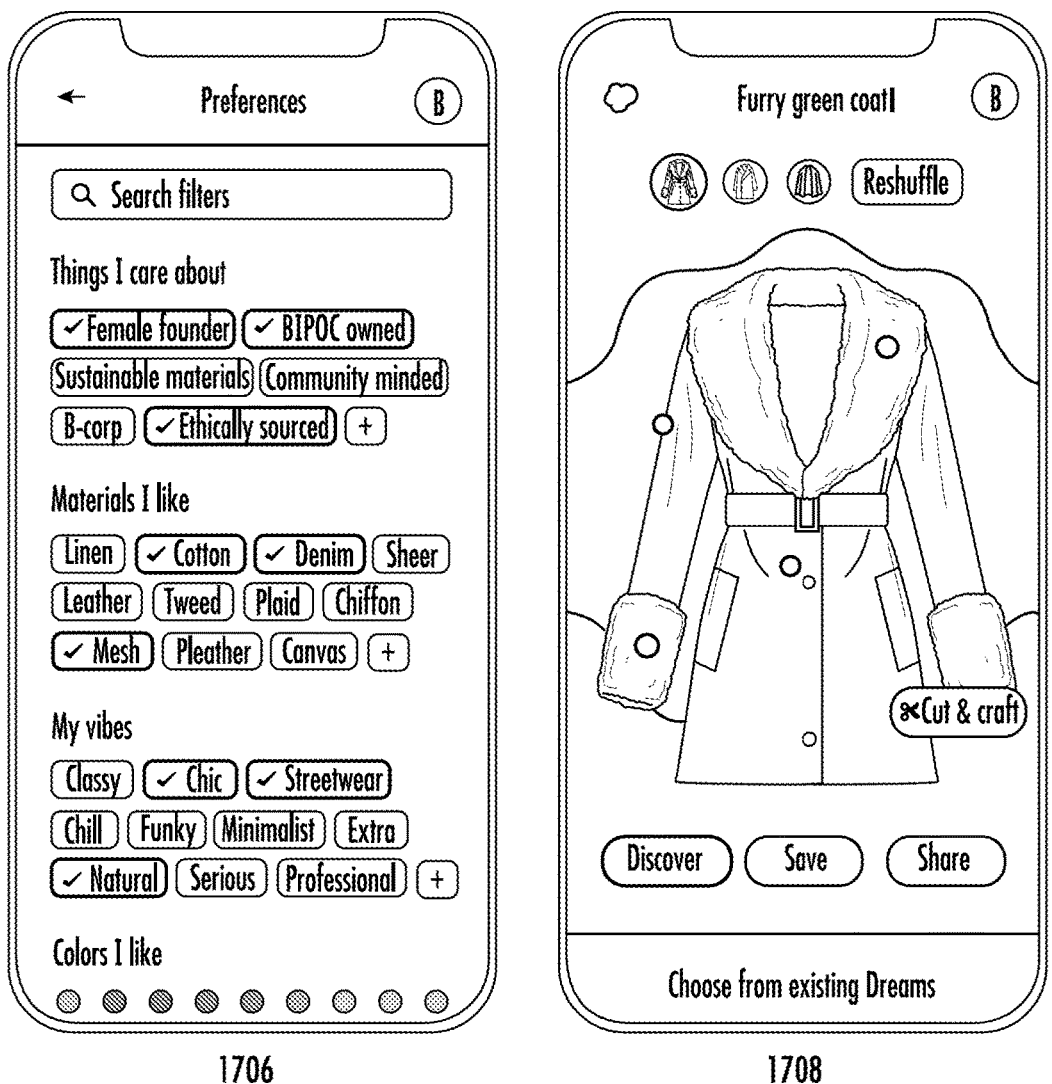

FIGS. 17A-17C depict illustrations of an example product suggestion interface according to example embodiments of the present disclosure.

For example, FIG. 17A depicts a shared creations interface 1702 and vibe/type customization interface 1704. In particular, the product suggestion interface can include a shared creations interface 1702 that can allow users to share their model-generated images (e.g., model-generated articles of clothing), view other user's model-generated images, and interact with the other user's model-generated images (e.g., like the post, save post, and/or share the post). Additionally and/or alternatively, the vibe/type customization interface 1704 can enable a user to select example images of a style, aesthetic, and/or vibe, which can be utilized to generate a model-generated image that is associated with the specific style, aesthetic, and/or vibe.

In FIG. 17B, a chip selection interface 1706 is provided for display to provide chip interface elements for display that can be selected to generate the prompt input. In particular, the chip selection interface 1706 is associated with selecting preferences that can be saved in associated with a user profile to be utilized to condition generations and suggestions. Additionally and/or alternatively, a cut and craft interface 1708 can be provided to provide an interface for modifying generated images.

In FIG. 17C, places to find similar products to the "imagined" product are provided as suggestions in a location-based interface 1710 that additionally includes a creators near you suggestions pane. Additionally and/or alternatively, a mood board interface 1712 can provide an interface for users to save their creations and other's creations in a collection for future viewing.

Figure 18:
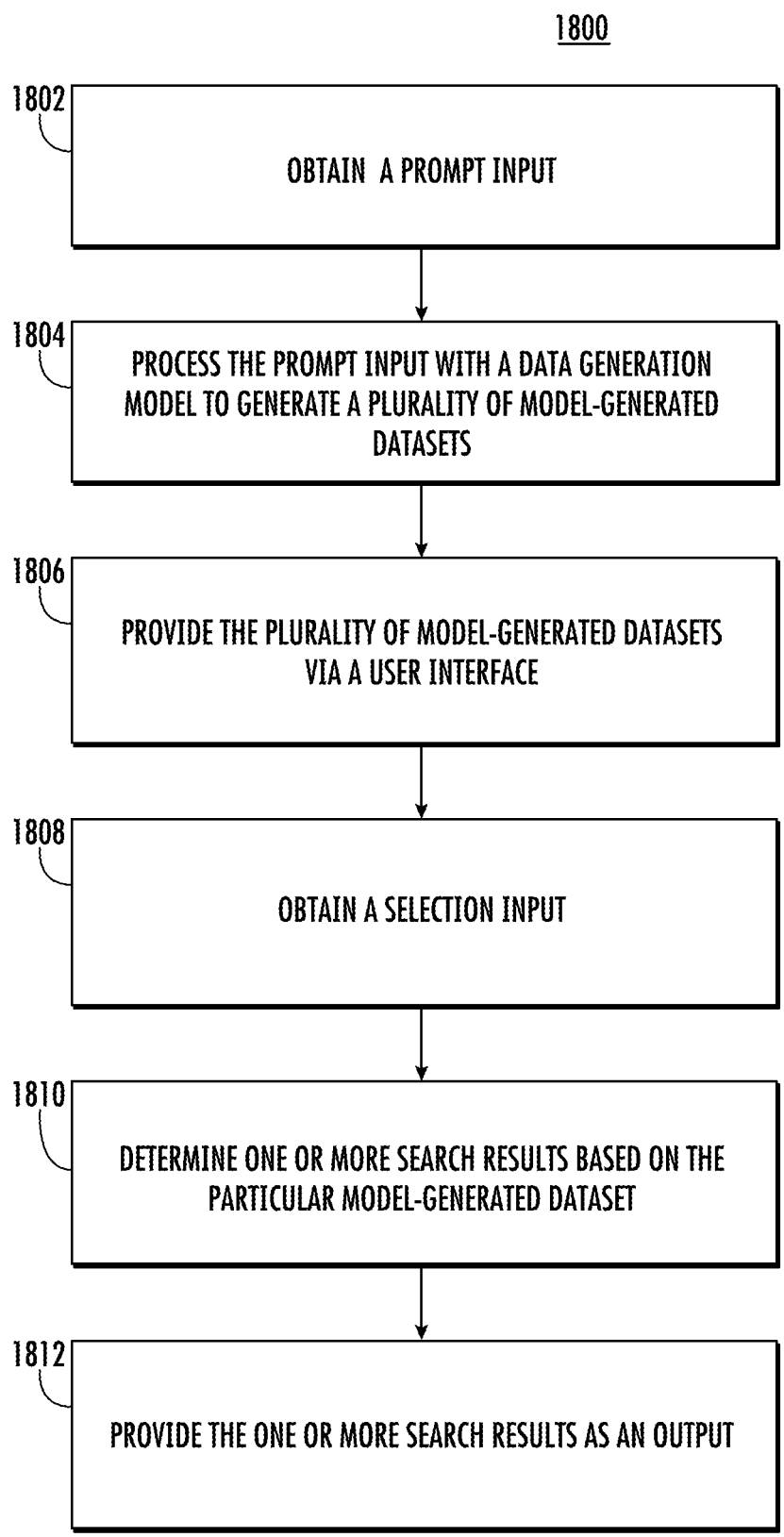
FIG. 18 depicts a flow chart diagram of an example method to perform machine-learned model output generation and search according to example embodiments of the present disclosure.

FIG. 18 depicts a flow chart diagram of an example method to perform according to example embodiments of the present disclosure. Although FIG. 18 depicts steps performed in a particular order for purposes of illustration and discussion, the methods of the present disclosure are not limited to the particularly illustrated order or arrangement. The various steps of the method 1800 can be omitted, rearranged, combined, and/or adapted in various ways without deviating from the scope of the present disclosure.

At 1802, a computing system can obtain a prompt input. The prompt input can include one or more terms. The prompt input can be generated based on one or more selections of one or more user interface chips that can include text characters and/or icons associated with terms to utilize to prompt a data generation model. In some implementations, the prompt input can include one or more images, one or more audio clips, and/or latent encoding data.

At 1804, the computing system can process the prompt input with a data generation model to generate a plurality of model-generated datasets. The plurality of model-generated datasets can be generated based at least in part on the one or more terms. In some implementations, each of the plurality of model-generated datasets may differ. The data generation model can be trained to generate one or more datasets based on a plurality of learned parameters and conditioned based on the prompt input. The model-generated dataset can include image data, audio data, multimodal data, text data, latent encoding data, and/or sensor data. For example, the plurality of model-generated datasets can include a plurality of images (e.g., a plurality of predicted depictions descriptive of the prompt input), a plurality of audio clips (e.g., a plurality of generated song clips predicted to be descriptive of the prompt input), and/or a plurality of video datasets (e.g., a plurality of predicted video clips generated based on the prompt input).

At 1806, the computing system can provide the plurality of model-generated datasets via a user interface. Providing the plurality of model-generated datasets via the user interface can include providing a plurality of model-generated images in an image carousel. The plurality of model-generated datasets can be provided as a list of links to preview the model-generated datasets. Alternatively and/or additionally, the plurality of model-generated datasets can be transmitted for local download.

At 1808, the computing system can obtain a selection input. The selection input can be descriptive of a selection of a particular model-generated dataset of the plurality of model-generated datasets. For example, the user may navigate through a carousel of model-generated datasets, can determine a specific model-generated dataset of interest, and the user can then select the specific model-generated dataset to be utilized to query a database.

In some implementations, obtaining the selection input can include obtaining the selection of the particular model-generated dataset of the plurality of model-generated datasets and obtaining a cropping input. The cropping input can be descriptive of a portion of the particular model-generated dataset. The portion of the particular model-generated dataset can be segmented to generate a cropped model-generated dataset. In some implementations, the one or more search results can be determined based on the cropped model-generated dataset.

At 1810, the computing system can determine one or more search results based on the particular model-generated dataset. The one or more search results can be determined based on an association with a resource dataset that is determined to be similar to the selected model-generated dataset. For example, a resource dataset can be a song determined to be similar to the model-generated audio clip.

At 1812, the computing system can provide the one or more search results as an output. The one or more search results can be provided in a search results page. In some implementations, the one or more search results can be provided adjacent to one or more model-generated datasets. For example, the one or more search results can be provided in a panel of the user interface, and the one or more model-generated datasets can be provided in a same panel and/or a different panel.

Figure 19:
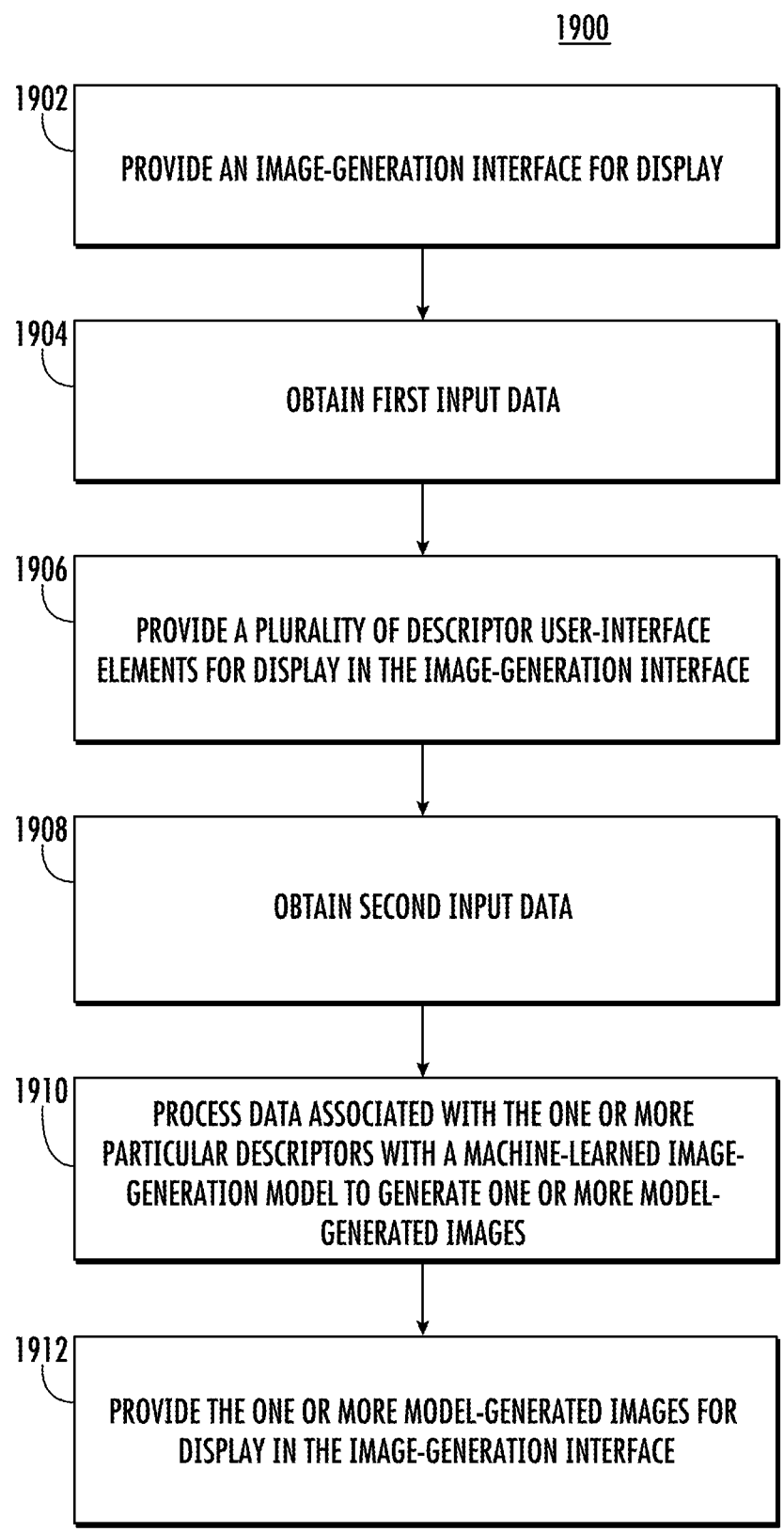
FIG. 19 depicts a flow chart diagram of an example method to perform prompt input generation according to example embodiments of the present disclosure.

FIG. 19 depicts a flow chart diagram of an example method to perform according to example embodiments of the present disclosure. Although FIG. 19 depicts steps performed in a particular order for purposes of illustration and discussion, the methods of the present disclosure are not limited to the particularly illustrated order or arrangement. The various steps of the method 1900 can be omitted, rearranged, combined, and/or adapted in various ways without deviating from the scope of the present disclosure.

At 1902, a computing system can provide an image-generation interface for display. The image-generation interface can include a plurality of category user-interface elements. In some implementations, each category user-interface element (e.g., a chip, tile, and/or a drop-down element) can be associated with a different generation category (e.g., a scene, a mural, an article of clothing, and/or a video game).

At 1904, the computing system can obtain first input data. The first input data can be associated with a selection of a particular category user-interface element of the plurality of category user-interface elements. The particular category user-interface element can be associated with a particular category. In some implementations, the particular category can be associated with clothing. Additionally and/or alternatively, the one or more particular descriptors can be associated with one or more clothing terms descriptive of a clothing item.

At 1906, the computing system can provide a plurality of descriptor user-interface elements for display in the image-generation interface. Each descriptor user-interface element can be associated with a different descriptor (e.g., an adjective and/or a complementary noun or verb associated with the particular category). The descriptors may be general descriptors for a plurality of different categories. Alternatively and/or additionally the plurality of descriptors may be determined and/or provided based on the selected category (e.g., a clothing material and/or a brand may be provided based on a clothing category being selected).

At 1908, the computing system can obtain second input data. The second input data can be associated with a selection of one or more particular descriptor user-interface elements of the plurality of descriptor user-interface elements. The one or more particular descriptor user-interface elements can be associated with one or more particular descriptors. Additionally and/or alternatively, a freeform text input can be obtained. For example, a text input box may be provided for display and can be utilized to receive freeform text associated with one or more additional descriptors.

At 1910, the computing system can process data associated with the one or more particular descriptors with a machine-learned image-generation model to generate one or more model-generated images. In some implementations, a prompt can be generated based on the category selection and the descriptor selection(s). Additionally and/or alternatively, a specific machine-learned image-generation model can be obtained based on the selected category. The prompt may be a structured prompt based on a selection hierarchy (e.g., a category the descriptors and/or based on the time of selection).

At 1912, the computing system can provide the one or more model-generated images for display in the image-generation interface. The one or more model-generated images can be provided in a carousel interface, in a list, in a grid, and/or a slideshow interface.

In some implementations, the computing system can obtain third input data. The third input data can be descriptive of a selection of the one or more model-generated images. The systems and methods can then determine one or more search results based on the one or more model-generated images. The one or more search results can be associated with one or more objects. A search results interface can then be provided for display. The search results interface can provide the one or more search results for display.

Additionally and/or alternatively, edit input data can be obtained. The edit input data can be descriptive of a request to replace one or more first features of the one or more model-generated images with one or more second features. One or more updated model-generated images can then be generated based on the edit input data. The edit input data can be associated with a color change. In some implementations, the edit input data can be associated with a texture change.

Figure 20:
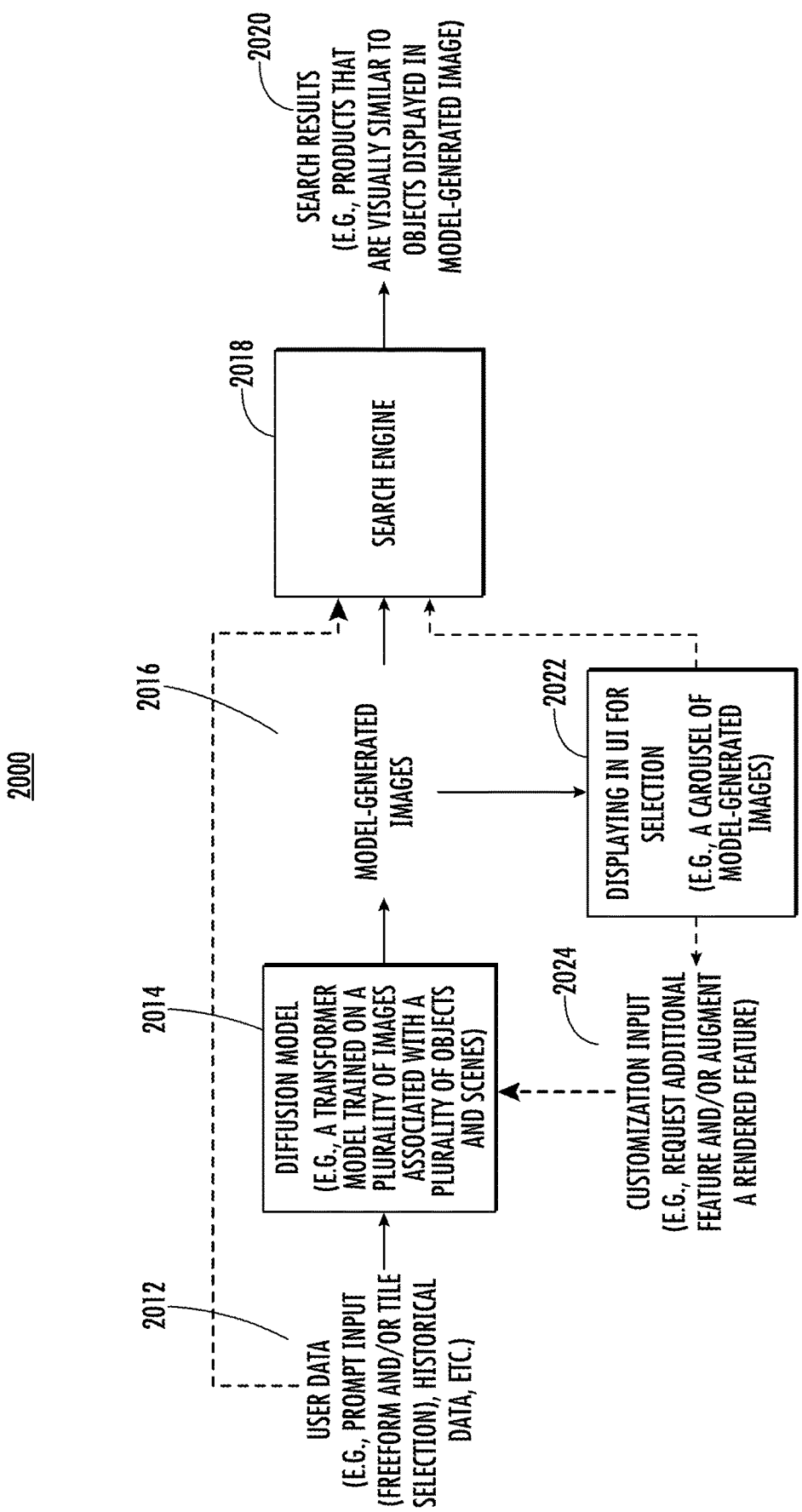
FIG. 20 depicts a block diagram of an example model-generated image search and customization system according to example embodiments of the present disclosure.

FIG. 20 depicts a block diagram of an example model-generated image search and customization system 2000 according to example embodiments of the present disclosure. In particular, the model-generated image search and customization system 2000 can include obtaining user data 2012, generating one or more model-generated images 2016, and determining one or more search results 2020 based on the one or more model-generated images 2016.

For example, user data 2012 can be obtained from a user computing system. The user data can include a prompt input, historical data (e.g., data descriptive of user search history, user purchase history, user browsing history, etc.), profile data, and/or preference data. The prompt input can include a freeform prompt input and/or a generated prompt input generated based on one or more tile selections of a user interface. The prompt input can be descriptive of one or more attributes a user is requesting to be rendered in a generated image. The prompt input can include a subject of the image (e.g., an environment and/or one or more objects) and one or more details for the subject (e.g., a color, a style, a material, etc.).

The user data 2012 can be processed with a diffusion model 2014 to generate one or more model-generated images 2016. The diffusion model 2014 can be a machine-learned image generation model and may be trained to process text data and/or image data to generate one or more images. The one or more model-generated images 2016 can include a subject with one or more attributes and may be associated with the subject and one or more details of the prompt input.

The one or more model-generated images 2016 can then be provided to a search engine 2018 to determine one or more search results 2020. The one or more model-generated images 2016 may be provided to the search engine 2018 automatically upon generation and/or may be provided in response to one or more user inputs (e.g., a selection of a search option and/or a selection of a particular image). In some implementations, the search engine 2018 may additionally process the user data 2012 with the one or more model-generated images 2016 to determine the one or more search results 2020. The one or more search results 2020 may be determined based on one or more visual similarities between the one or more model-generated images 2016 and one or more images associated with the one or more search results 2020. The search results 2020 can include image search results, website search results, and/or marketplace search results. For example, the search results 2020 may include products determined to be visually similar to one or more objects depicted in the one or more model-generated images 2016.

In particular, the model-generated image search and customization system 2000 can obtain user data 2012 descriptive of an item that may be of interest to a user (e.g., based on explicit inputs, learned preferences, and/or availability). The model-generated image search and customization system 2000 may generate a visualization of the item (e.g., the one or more model-generated images 2016). A user may select a specific image that is of interest to them. The model-generated image can then be provided to a search engine 2018 to determine real world products that are visually similar to the "imagined" item.

The model-generated images 2016 may be provided for display in a user interface for selection 2022. The one or more model-generated images 2016 may be provided via a carousel interface, a thumbnail interface, a slideshow interface, and/or a collage interface. A user may select a particular model-generated image to search. Alternatively and/or additionally, a user may input a customization input 2024 to generate a new set of model-generated images. The customization input 2024 can include adding one or more features to a generated model-generated image, replacing one or more existing features, deleting one or more features, and/or augmenting the prompt input to include one or more additional prompt terms and/or prompt images. For example, a user may request a model-generated image of a dress be augmented based on an input image of a particular pattern. The model-generated image and the input image may be processed by the diffusion model 2014 to generate an augmented image that may then be provided for display and/or searched.

Figure 21:
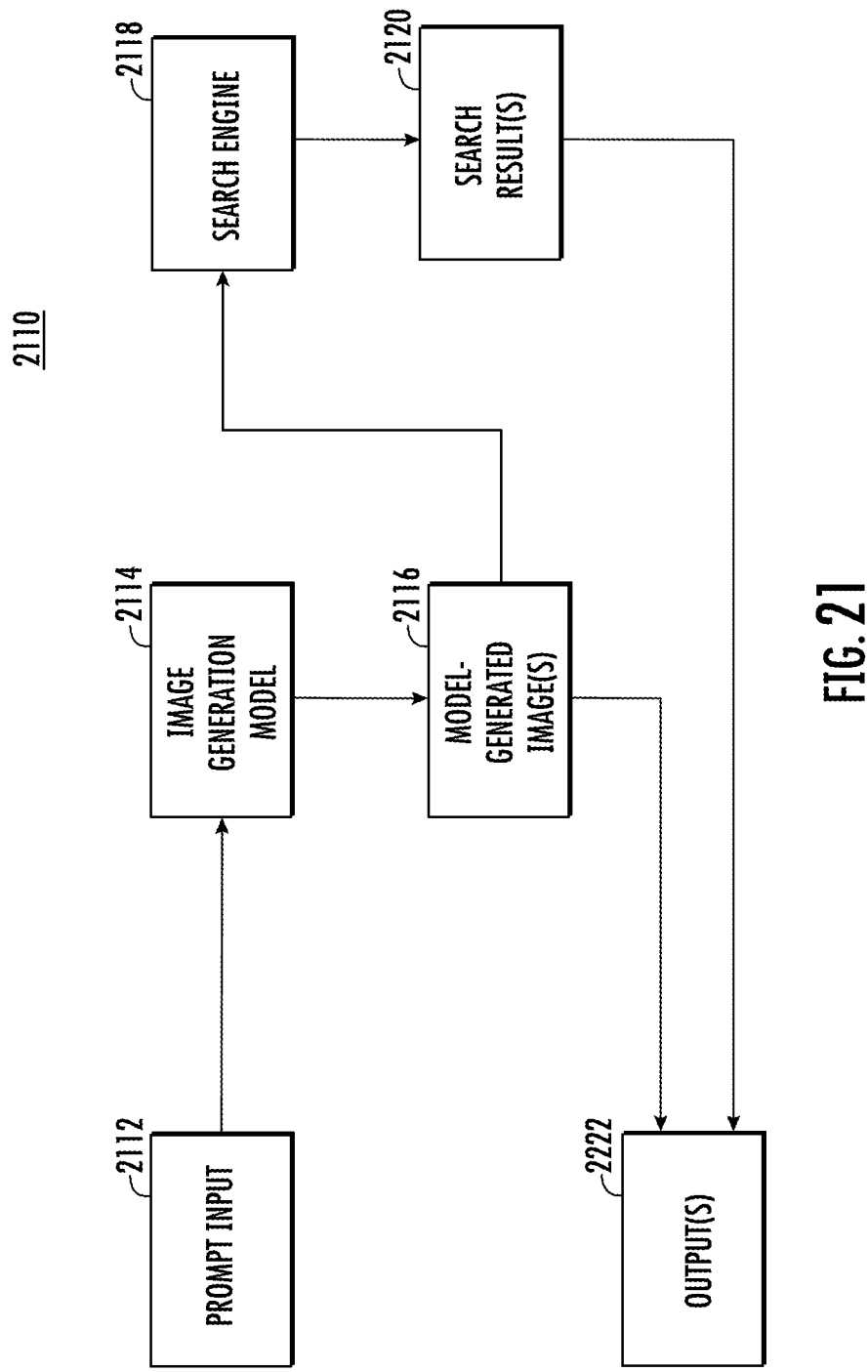
FIG. 21 depicts a block diagram of an example model-generated image search system according to example embodiments of the present disclosure.

FIG. 21 depicts a block diagram of an example model-generated image search system 2110 according to example embodiments of the present disclosure. In particular, FIG. 21 depicts a model-generated image search system 2110 that obtains a prompt input 2112, generates one or more model-generated images 2116 with an image generation model 2114 based on the prompt input 2112, and performs a search based on one or more of the model-generated images 2116.

For example, a prompt input 2112 can be obtained from a user computing device. The prompt input 2112 can be descriptive of one or more terms and/or one or more images. The prompt input 2112 may be generated based on freeform text entry, file upload, and/or based on a plurality of user interface chip selections. The prompt input 2112 may be processed with a prompt generation block to generate an input for a specific machine-learned model. Alternatively and/or additionally, the prompt input 2112 may be processed by an embedding model to generate a text embedding to be provided to a transformer model trained to generate images based on text embeddings.

The prompt input 2112 can be processed with an image generation model 2114 to generate one or more model-generated images 2116. The one or more model-generated images 2116 can be generated based on the prompt input 2112. For example, the one or more model-generated images 2116 can depict one or more features associated with one or more prompt terms (e.g., feathers on a dress can be depicted in response to the selection of a "dress" descriptor user interface element and a "with feathers" descriptor user interface element).

A user can then select one or more of the one or more model-generated images 2116 to be utilized as an image query. The selected image(s) can be provided to a search engine 18. One or more search results 2120 can then be received from the search engine 2118. The one or more search results 2120 can be descriptive of preexisting data that is similar to the model-generated data.

The one or more model-generated images 2116 and/or the one or more search results 2120 can be provided to a user as an output 2122. The user can then store the output(s) 2122 can be stored in a collection and/or shared with one or more other users.

The model-generated image search system 2110 can provide an interface for imagining and finding clothing, art, travel locations, videos, music, and/or other objects or content items.

In some implementations, the systems and methods can include utilizing the model-generated data (e.g., one or more model-generated images) to generate an augmented-reality rendering asset and/or a virtual-reality experience. For example, the generative model (e.g., the image generation model) may process a prompt to generate an augmented-reality rendering asset and/or a virtual-reality experience. In some implementations, a prompt may be processed by an image generation model to generate one or more model-generated images that can then be utilized to generate an augmented-reality rendering asset and/or a virtual-reality rendering experience. The augmented-reality rendering asset can be utilized to render the model-generated object into a user's environment. For example, a user can utilize the augmented-reality rendering asset to render the model-generated object into their room and/or onto their body. The rendering can be performed on still images and/or a live camera feed. Additionally and/or alternatively, the virtual-reality experience can be utilized for viewing the one or more objects in a three-dimensional virtual space.

Figure 22A:
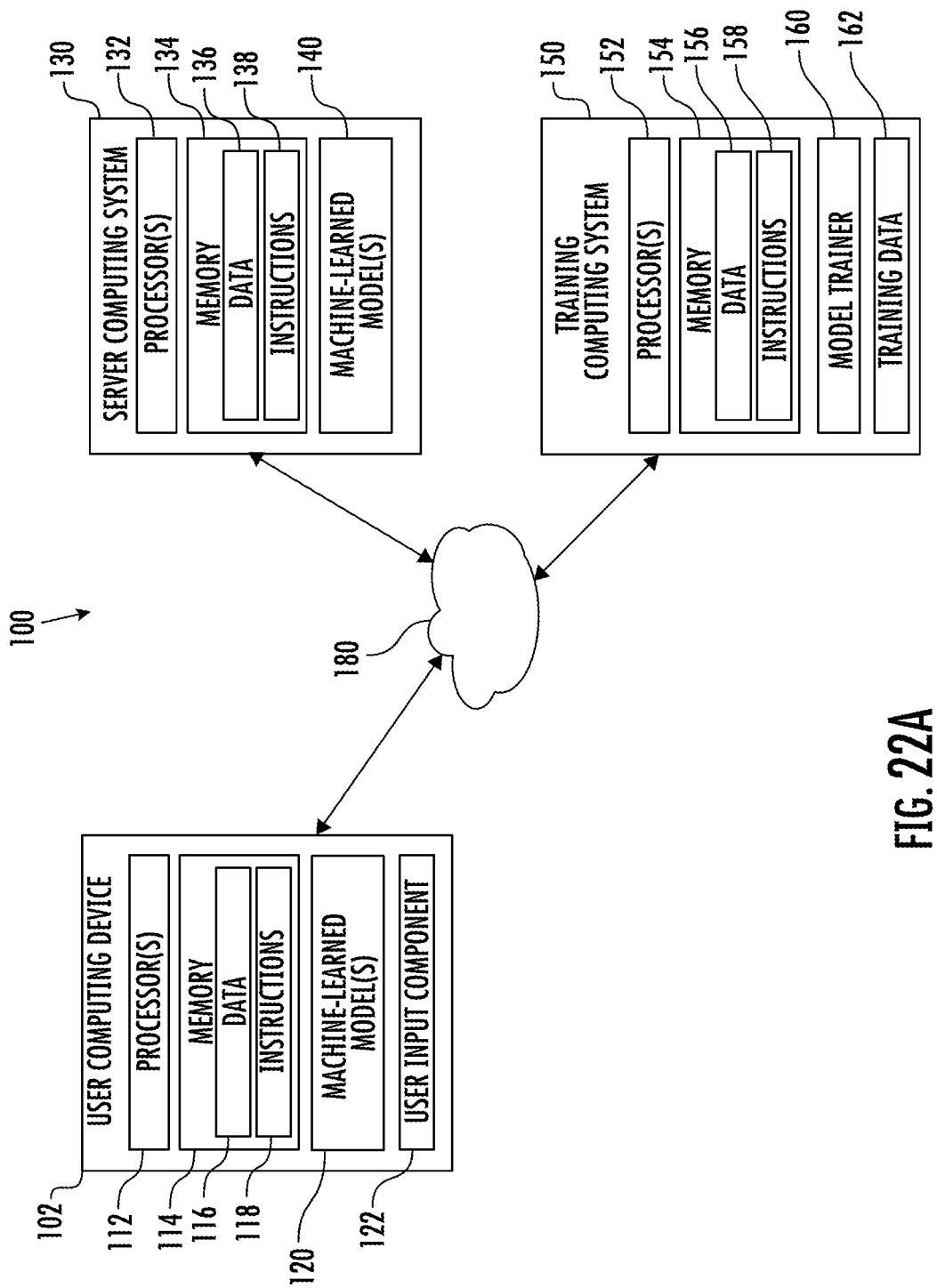
FIG. 22A depicts a block diagram of an example computing system that performs machine-learned model output generation and search according to example embodiments of the present disclosure.

FIG. 22A depicts a block diagram of an example computing system 100 that performs machine-learned model output generation and search according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more computer-readable storage mediums, for example non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more dataset generation models 120. For example, the dataset generation models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example dataset generation models 120 are discussed with reference to FIGS. 2 & 4.

In some implementations, the one or more dataset generation models 120 can be received from the server computing system 130 over network 180, stored in the user computing device memory 114, and then used or otherwise implemented by the one or more processors 112. In some implementations, the user computing device 102 can implement multiple parallel instances of a single dataset generation model 120 (e.g., to perform parallel dataset generation across multiple instances of prompt inputs).

More particularly, one or more selections can be received to generate a prompt input, which can then be processed by a dataset generation model 120 to generate a plurality of model-generated datasets. A selection of a particular model-generated dataset can be received. The particular model-generated dataset can be input into a search engine to receive one or more search results.

Additionally or alternatively, one or more dataset generation models 140 can be included in or otherwise stored and implemented by the server computing system 130 that communicates with the user computing device 102 according to a client-server relationship. For example, the dataset generation models 140 can be implemented by the server computing system 140 as a portion of a web service (e.g., a search service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more computer-readable storage mediums, for example non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned dataset generation models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2 & 4.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more computer-readable storage mediums, for example non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the dataset generation models 120 and/or 140 based on a set of training data 162. The training data 162 can include, for example, training dataset examples (e.g., training images), training prompts, training labels, and/or training segmentation.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be audio compression task. The input may include audio data and the output may comprise compressed audio data. In another example, the input includes visual data (e.g., one or more images or videos), the output comprises compressed visual data, and the task is a visual data compression task. In another example, the task may comprise generating an embedding for input data (e.g., input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

FIG. 22A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 22B:
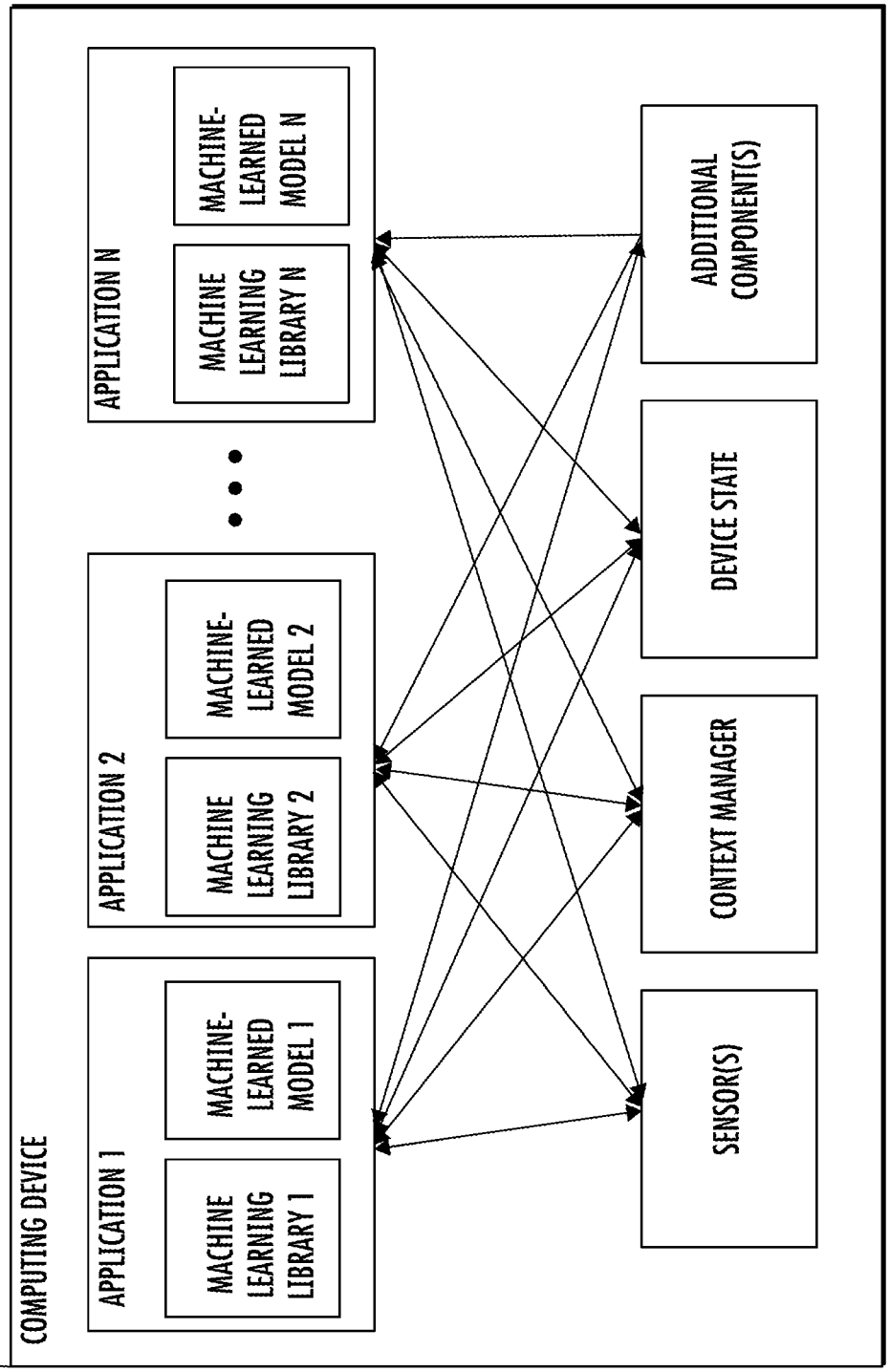
FIG. 22B depicts a block diagram of an example computing device that performs machine-learned model output generation and search according to example embodiments of the present disclosure.

FIG. 22B depicts a block diagram of an example computing device 40 that performs according to example embodiments of the present disclosure. The computing device 40 can be a user computing device or a server computing device.

The computing device 40 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 22B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 22C:
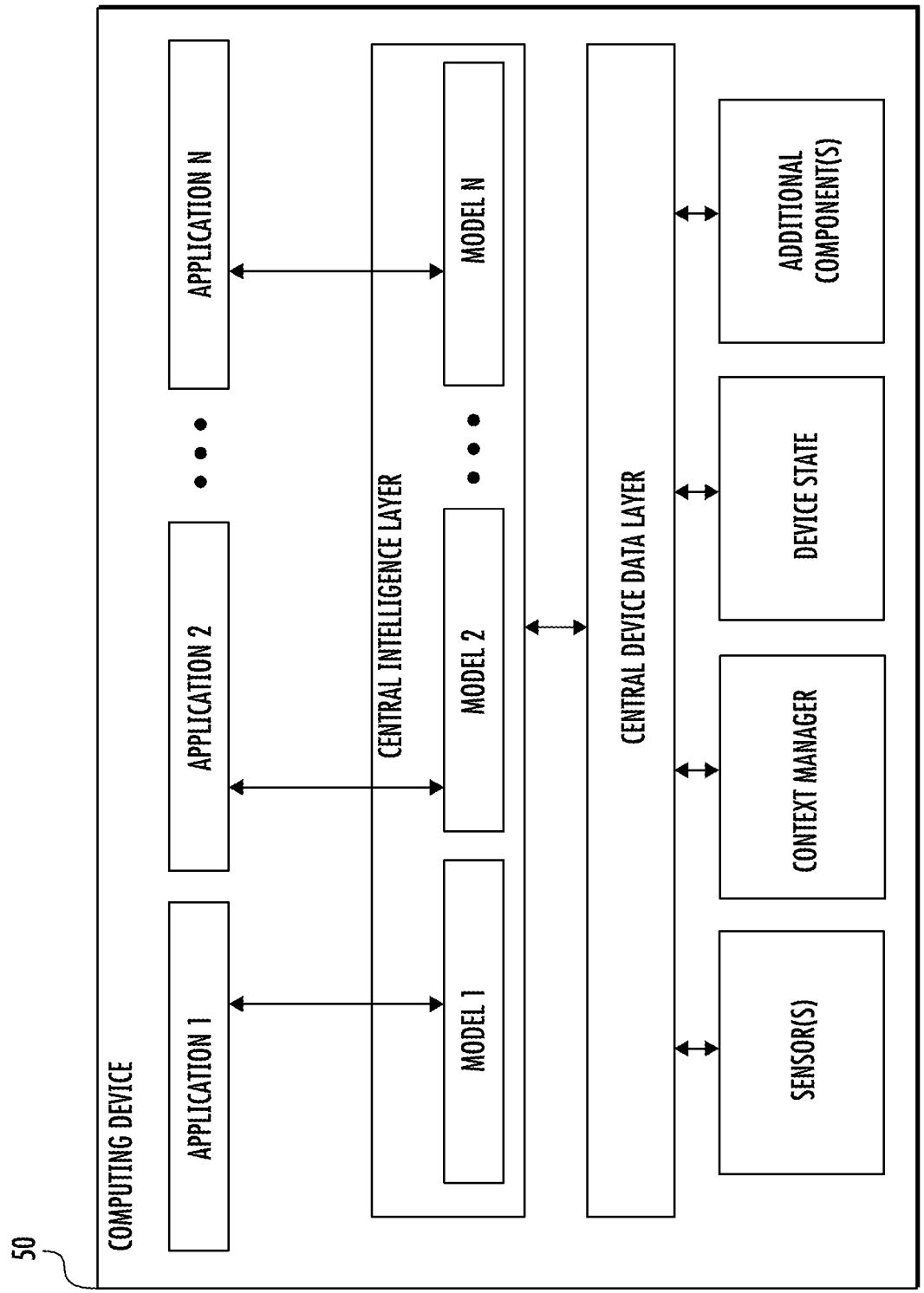
FIG. 22C depicts a block diagram of an example computing device that performs machine-learned model output generation and search according to example embodiments of the present disclosure.

FIG. 22C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 22C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 22C, the central device data layer can communicate with a number of other components of the computing device, such as, for example, one or more sensors, a context manager, a device state component, and/or additional components. In some implementations, the central device data layer can communicate with each device component using an API (e.g., a private API).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A system comprising:
one or more processors; and
a memory storing instructions that when executed by the one or more processors cause the system to perform operations comprising:
obtaining a prompt input, wherein the prompt input comprises one or more terms descriptive of an absence of a particular detail, and wherein the prompt input comprises a prompt image descriptive of an object with the particular detail;
processing the prompt input with an image generation model to generate one or more model-generated images, wherein the image generation model comprises a diffusion model, wherein the diffusion model comprises one or more transformer models, wherein the one or more model-generated images are generated based at least in part on the one or more terms, and wherein the one or more model-generated images are descriptive of a generated object without the particular detail, wherein generating the one or more model-generated images with the image generation model comprises:

processing the one or more terms with an embedding model to generate a text embedding; and processing the text embedding and the prompt image with the diffusion model to generate predicted replacement pixels for a region of the prompt image that comprises at least a portion of the object, wherein the predicted replacement pixels are descriptive of the generated object without the particular detail;

determining one or more search results based on processing the one or more model-generated images with a search engine, wherein the one or more search results are associated with one or more objects without the particular detail; and providing a search results interface, wherein the search results interface provides the one or more search results for display.

2. The system of claim 1, wherein obtaining the prompt input comprises:

obtaining a first search query;

processing the first search query to determine a plurality of first search results responsive to the first search query;

providing the plurality of first search results for display;

obtaining a text input and a selection of an image search result of the plurality of first search results, wherein the image search result is descriptive of a particular object comprising the particular detail; and generating a multi-modal prompt input, wherein the multi-modal prompt input comprises the prompt image and prompt text.

3. The system of claim 1, wherein the operations further comprise:

providing the one or more model-generated images for display with the one or more terms in an interactive graphical user interface.

4. The system of claim 1, wherein the one or more search results are associated with one or more products, wherein the one or more search results comprise one or more action links associated with the one or more products, and wherein the one or more action links are associated with a purchase interface for the one or more products.

5. The system of claim 1, wherein determining the one or more search results based on the one or more model-generated images comprises:

providing the one or more model-generated images to the search engine; and receiving the one or more search results from the search engine.

6. The system of claim 1, wherein obtaining the prompt input comprises:

providing a plurality of selectable user-interface elements for display in graphical user interface, wherein the plurality of selectable user-interface elements are associated with a plurality of candidate prompt terms;

obtaining selection data, wherein the selection data is descriptive of a first selectable user-interface element and a second selectable user-interface element, wherein the first selectable user-interface element is associated with a first prompt term, and wherein the second selectable user-interface element is associated with a second prompt term; and wherein the prompt input comprises the first prompt term and the second prompt term.

7. The system of claim 1, wherein the generated object comprises a clothing item without a particular detail.

8. The system of claim 7, wherein the particular detail comprises a particular pattern.

9. The system of claim 1, wherein the particular detail comprises a particular type of material.

10. The system of claim 1, wherein the particular detail comprises a particular attribute.

11. The system of claim 1, wherein the prompt input comprises the prompt image, wherein the prompt image comprises a particular object, and wherein the generated object without the particular detail is descriptive of the particular object without the particular detail.

12. A computer-implemented method, the method comprising:

obtaining, by a computing system comprising one or more processors, a prompt input, wherein the prompt input comprises one or more terms descriptive of an absence of one or more particular details, and wherein the prompt input comprises a prompt image descriptive of a particular object with the one or more particular details;

processing, by the computing system, the prompt input with an image generation model to generate one or more model-generated images, wherein the image generation model comprises a diffusion model, wherein the diffusion model comprises one or more transformer models, wherein the one or more model-generated images are generated based at least in part on the one or more terms, and wherein the one or more model-generated images are descriptive of a generated object without the one or more particular details, wherein generating the one or more model-generated images with the image generation model comprises:

processing the one or more terms with an embedding model to generate a text embedding; and processing the text embedding and the prompt image with the diffusion model to generate predicted replacement pixels for a region of the prompt image that comprises at least a portion of the particular object, wherein the predicted replacement pixels are descriptive of the generated object without the one or more particular details;

determining, by the computing system, one or more search results based on processing the one or more model-generated images with a search engine, wherein the one or more search results are associated with one or more objects without the one or more particular details; and providing, by the computing system and via a search results interface, wherein the search results interface provides the one or more search results for display.

13. The computer-implemented method of claim 12, wherein the prompt image is associated with a web resource, and wherein the prompt image is obtained based on one or more user inputs associated with the web resource.

14. The computer-implemented method of claim 12, wherein the one or more particular details are associated with one or more accessories, wherein the particular object comprises the one or more accessories, and wherein the model-generated object is descriptive of the particular object without the one or more accessories.

15. The computer-implemented method of claim 12, wherein the prompt image comprises a previously generated image, wherein the previously generated image was generated based on a previous prompt being processed with the image generation model.

16. The computer-implemented method of claim 12, wherein the one or more particular details comprises at least one of an object feature, a type of material, a color, a style, an attribute, or a shape.

17. The computer-implemented method of claim 12, wherein a prompt text comprising the one or more terms is descriptive of a request to generate an image without the one or more particular details, and wherein the model-generated image is descriptive of the prompt image without the one or more particular details.

18. One or more non-transitory computer-readable media comprising instructions that when executed by one or more computing devices cause the one or more computing devices to perform operations comprising:
  obtaining a prompt input, wherein the prompt input comprises one or more terms descriptive of an absence of a particular detail, and wherein the prompt input comprises a prompt image descriptive of an object with the particular detail;
  processing the prompt input with an image generation model to generate one or more model-generated images, wherein the image generation model comprises a diffusion model, wherein the diffusion model comprises one or more transformer models, wherein the one or more model-generated images are generated based at least in part on the one or more terms, and wherein the one or more model-generated images are descriptive of a generated object without the particular detail, wherein generating the one or more model-generated images with the image generation model comprises:
    processing the one or more terms with an embedding model to generate a text embedding; and
    processing the text embedding and the prompt image with the diffusion model to generate predicted replacement pixels for a region of the prompt image that comprises at least a portion of the object, wherein the predicted replacement pixels are descriptive of the generated object without the particular detail;
  determining one or more search results based on processing the one or more model-generated images with a search engine, wherein the one or more search results are associated with one or more objects without the particular detail; and
  providing a search results interface, wherein the search results interface provides the one or more search results for display.

19. The one or more non-transitory computer-readable media of claim 18, wherein the object comprises a clothing item, and wherein the particular detail comprises a particular descriptor associated with one or more clothing terms.

20. The one or more non-transitory computer-readable media of claim 18, wherein determining the one or more search results comprises:
  processing the model-generated image with an image embedding model to generate image embedding; and
  determining the one or more search results based on the image embedding.

* * * * *